US012585719B2

(12) United States Patent
Mallin et al.

(10) Patent No.: US 12,585,719 B2
(45) Date of Patent: Mar. 24, 2026

(54) COMMENTING ON A SEARCH RESULT

(71) Applicant: Equals 3, Inc., Minneapolis, MN (US)

(72) Inventors: Daniel Mallin, Minneapolis, MN (US);
Scott Litman, Minneapolis, MN (US);
Marcello Dispensa, Cranford, NJ (US);
Steven James Frederickson,
Minneapolis, MN (US)

(73) Assignee: Equals 3, Inc., Minneapolis, MN (US)

( * ) Notice: Subject to any disclaimer, the term of this
patent is extended or adjusted under 35
U.S.C. 154(b) by 0 days.

(21) Appl. No.: 18/916,179

(22) Filed: Oct. 15, 2024

(65) Prior Publication Data

US 2025/0036698 A1     Jan. 30, 2025

Related U.S. Application Data

(63) Continuation of application No. 17/328,664, filed on
May 24, 2021, now Pat. No. 12,135,752, which is a
(Continued)

(51) Int. Cl.
G06F 17/30          (2006.01)
G06F 3/048          (2013.01)
(Continued)

(52) U.S. Cl.
CPC .......... G06F 16/9535 (2019.01); G06F 3/048
(2013.01); G06F 16/9532 (2019.01);
(Continued)

(58) Field of Classification Search
CPC ........ G06F 16/13; G06F 16/24; G06F 16/156;
G06F 3/1297; G06N 3/00; G06N 5/00;
(Continued)

(56) References Cited

U.S. PATENT DOCUMENTS 6,292,796 B1     9/2001   Drucker et al.
6,487,553 B1     11/2002  Emens et al.
(Continued)

OTHER PUBLICATIONS

Extended European Search Report in European Application No.
20209185.6, dated Mar. 18, 2021, 11 pages.
(Continued)

*Primary Examiner* — Hung D Le
(74) *Attorney, Agent, or Firm* — Fish & Richardson P.C.

(57)          ABSTRACT
In general, the subject matter described in this disclosure can
be embodied in methods, systems, and program products for
linking to a search result. A computing system receives a
query and provides, to a first computing device, multiple
results that are responsive to the query. The computing
system provides, to the first computing device, information
that identifies a web address of a user selected result of
multiple results that are responsive to query. The computing
system receives a request from a second computing device
for content responsive to the web address of the user selected
result. The computing system provides, to the second com-
puting device, information to cause the second computing
device to present the multiple results that are responsive to
the query in distinction to the user selected result, responsive
to the second computing device not being authorized to
access the user selected result.

18 Claims, 63 Drawing Sheets

Related U.S. Application Data continuation-in-part of application No. 15/592,842, filed on May 11, 2017, now Pat. No. 11,016,981.

(60) Provisional application No. 62/335,812, filed on May 13, 2016.

(51) Int. Cl.

| | |
|---|---|
| *G06F 16/9532* | (2019.01) |
| *G06F 16/9535* | (2019.01) |
| *G06F 16/957* | (2019.01) |
| *G06F 21/10* | (2013.01) |
| *G06F 21/62* | (2013.01) |

(52) U.S. Cl.
CPC .......... *G06F 16/9577* (2019.01); *G06F 21/10* (2013.01); *G06F 21/6218* (2013.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 8,095,534 B1 | 1/2012 | Alexander | |
| 8,423,541 B1 | 4/2013 | Baluja et al. | |
| 8,487,553 B2 | 7/2013 | Saito | |
| 8,700,610 B1 | 4/2014 | Kataru | |
| 8,862,571 B2 | 10/2014 | Baluja et al. | |
| 8,949,250 B1 | 2/2015 | Garg et al. | |
| 9,013,945 B2 | 4/2015 | Won et al. | |
| 9,043,942 B1 | 5/2015 | Birdwell et al. | |
| 9,760,586 B1 | 9/2017 | Cook | |
| 10,445,329 B2 | 10/2019 | Dispensa et al. | |
| 10,482,092 B2 | 11/2019 | Dispensa et al. | |
| 10,776,367 B2 | 9/2020 | Dispensa et al. | |
| 10,817,584 B2 | 10/2020 | Singh et al. | |
| 11,016,981 B2 | 5/2021 | Dispensa et al. | |
| 11,354,900 B1 | 6/2022 | Li et al. | |
| 11,604,799 B1* | 3/2023 | Bigdelu | G06F 3/0484 |
| 11,636,128 B1* | 4/2023 | Bigdelu | G06F 16/2428 |
| | | | 707/722 |
| 11,644,955 B1* | 5/2023 | Singamneni | G06F 3/0481 |
| | | | 707/722 |
| 12,038,958 B1* | 7/2024 | Soubbotin | G06F 16/335 |
| 2001/0014910 A1 | 8/2001 | Bobo, II | |
| 2004/0193673 A1 | 9/2004 | Samji et al. | |
| 2005/0216443 A1 | 9/2005 | Morton et al. | |
| 2005/0289144 A1 | 12/2005 | Dettinger et al. | |
| 2007/0022111 A1 | 1/2007 | Salam et al. | |
| 2007/0022125 A1 | 1/2007 | Salam et al. | |
| 2007/0050386 A1 | 3/2007 | Busey | |
| 2007/0198340 A1 | 8/2007 | Lucovsky et al. | |
| 2007/0198500 A1 | 8/2007 | Lucovsky et al. | |
| 2008/0021880 A1* | 1/2008 | Ren | G06F 40/169 |
| 2008/0133495 A1 | 6/2008 | Fischer | |
| 2008/0140779 A1 | 6/2008 | Ahn et al. | |
| 2008/0243799 A1 | 10/2008 | Rozich et al. | |
| 2009/0055355 A1 | 2/2009 | Brunner et al. | |
| 2009/0150792 A1 | 6/2009 | Laakso et al. | |
| 2010/0082649 A1 | 4/2010 | Gutt et al. | |
| 2010/0114876 A1 | 5/2010 | Mandel et al. | |
| 2010/0117876 A1 | 5/2010 | Cao et al. | |
| 2011/0040622 A1 | 2/2011 | Lucovsky et al. | |
| 2011/0087648 A1 | 4/2011 | Wang et al. | |
| 2011/0191314 A1 | 8/2011 | Howes et al. | |
| 2011/0191341 A1 | 8/2011 | Meyer et al. | |
| 2011/0264556 A1 | 10/2011 | Ho et al. | |
| 2012/0130978 A1 | 5/2012 | Li et al. | |
| 2012/0185465 A1 | 7/2012 | Lucovsky et al. | |
| 2012/0259930 A1 | 10/2012 | Wu | |
| 2012/0310922 A1 | 12/2012 | Johnson et al. | |
| 2012/0310927 A1 | 12/2012 | Johnson et al. | |
| 2012/0317097 A1 | 12/2012 | Tseng | |
| 2013/0036109 A1* | 2/2013 | Kulick | G06F 16/9536 |
| | | | 707/E17.014 |
| 2013/0054624 A1 | 2/2013 | Arnold et al. | |
| 2013/0054642 A1 | 2/2013 | Morin | |
| 2013/0151574 A1 | 6/2013 | Li et al. | |
| 2013/0238609 A1 | 9/2013 | Marantz et al. | |
| 2013/0268532 A1 | 10/2013 | Doshi | |
| 2013/0275860 A1 | 10/2013 | Tran | |
| 2013/0282683 A1 | 10/2013 | Kohavi et al. | |
| 2013/0311872 A1* | 11/2013 | Jokl, III | G06F 40/10 |
| | | | 715/234 |
| 2014/0040244 A1 | 2/2014 | Rubinstein et al. | |
| 2014/0136505 A1 | 5/2014 | Satalker et al. | |
| 2014/0195525 A1 | 7/2014 | English | |
| 2014/0207748 A1 | 7/2014 | Sood et al. | |
| 2014/0236649 A1 | 8/2014 | Hamid et al. | |
| 2014/0250147 A1 | 9/2014 | Shapira et al. | |
| 2014/0280038 A1 | 9/2014 | O'Sullivan et al. | |
| 2014/0280087 A1 | 9/2014 | Isensee et al. | |
| 2014/0324829 A1 | 10/2014 | Hanses et al. | |
| 2014/0330809 A1 | 11/2014 | Raina et al. | |
| 2014/0358904 A1 | 12/2014 | Nayak et al. | |
| 2015/0066902 A1 | 3/2015 | Kim | |
| 2015/0095319 A1 | 4/2015 | Ormont et al. | |
| 2015/0120710 A1 | 4/2015 | Zhang et al. | |
| 2015/0142778 A1 | 5/2015 | Bilinski et al. | |
| 2015/0161202 A1 | 6/2015 | Shapira et al. | |
| 2015/0169700 A1 | 6/2015 | Wald et al. | |
| 2015/0186381 A1 | 7/2015 | Yan et al. | |
| 2015/0193506 A1 | 7/2015 | Bastide et al. | |
| 2015/0193638 A1 | 7/2015 | Cook | |
| 2015/0242495 A1 | 8/2015 | Goldstein et al. | |
| 2015/0302096 A1 | 10/2015 | Iwasaki | |
| 2015/0310005 A1 | 10/2015 | Ryger et al. | |
| 2015/0379134 A1 | 12/2015 | Bax et al. | |
| 2016/0044480 A1 | 2/2016 | Hong et al. | |
| 2016/0078101 A1 | 3/2016 | Somaiya et al. | |
| 2016/0085761 A1 | 3/2016 | Ellis et al. | |
| 2016/0162502 A1 | 6/2016 | Zhou et al. | |
| 2016/0188742 A1 | 6/2016 | Ingvoldstad et al. | |
| 2016/0196360 A1 | 7/2016 | Best et al. | |
| 2016/0203238 A1 | 7/2016 | Cherniavskii et al. | |
| 2016/0253600 A1* | 9/2016 | Hang | G06Q 10/02 |
| | | | 705/5 |
| 2016/0267569 A1 | 9/2016 | Hampson et al. | |
| 2016/0294895 A1 | 10/2016 | Yang | |
| 2017/0024657 A1 | 1/2017 | Sahu et al. | |
| 2017/0060823 A1* | 3/2017 | Zheng | G06F 3/0482 |
| 2017/0060995 A1 | 3/2017 | Boule et al. | |
| 2017/0083606 A1 | 3/2017 | Mohan | |
| 2017/0132252 A1 | 5/2017 | Koch et al. | |
| 2017/0132425 A1 | 5/2017 | Koch et al. | |
| 2017/0171292 A1 | 6/2017 | Mark et al. | |
| 2017/0185653 A1 | 6/2017 | Huang et al. | |
| 2017/0222871 A1 | 8/2017 | Yu et al. | |
| 2017/0228471 A1 | 8/2017 | Tomkins et al. | |
| 2017/0235732 A1 | 8/2017 | Williams et al. | |
| 2017/0308583 A1* | 10/2017 | Husain | G06F 16/9024 |
| 2017/0329784 A1 | 11/2017 | Dispensa et al. | |
| 2017/0329827 A1 | 11/2017 | Dispensa et al. | |
| 2017/0329829 A1 | 11/2017 | Dispensa et al. | |
| 2017/0329872 A1 | 11/2017 | Dispensa et al. | |
| 2017/0337209 A1 | 11/2017 | Schaer et al. | |
| 2018/0060326 A1 | 3/2018 | Kuo et al. | |
| 2018/0246983 A1* | 8/2018 | Rathod | G06F 16/972 |
| 2022/0067795 A1* | 3/2022 | Ken-Dror | G06F 16/9536 |
| 2022/0317978 A1* | 10/2022 | Barik | G06F 8/34 |
| 2022/0317979 A1* | 10/2022 | Araujo Soares | G06F 16/9024 |
| 2023/0031327 A1* | 2/2023 | Bourbie | G06F 16/90324 |

OTHER PUBLICATIONS

Frank et al., "Question answering from structured knowledge sources," Journal of Applied Logic, Jan. 17, 2007, 5(1):20-48.
International Preliminary Report on Patentability in Application No. PCT/US2017/017839, dated Nov. 13, 2018, 12 pages.

(56)                    References Cited

OTHER PUBLICATIONS

International Search Report and Written Opinion for International Application No. PCT/US2017/017839, Apr. 19, 2017, 14 pages.
International Search Report and Written Opinion in International Appln. No. PCT/US2022/030574, mailed on Sep. 21, 2022, 15 pages.
Neumann et al., "A cross-language question/answering-system for german and english," Network and Parallel Computing, Jan. 1, 2004, 3237:559-571.
Wikipedia.com [online], "Access-control list," Dated Apr. 9, 2016, URL <https://en.wikipedia.org/w/index.php?title=Access-control_list&oldid=714412886>, 3 pages.

* cited by examiner

Initial Query Processing

Unstructured Query Processing

Structured Query Processing

Save result to a query

FIG. 13

Suggesting queries based on frequently-used terms

Identifying a publication relevant to a subset of social network users

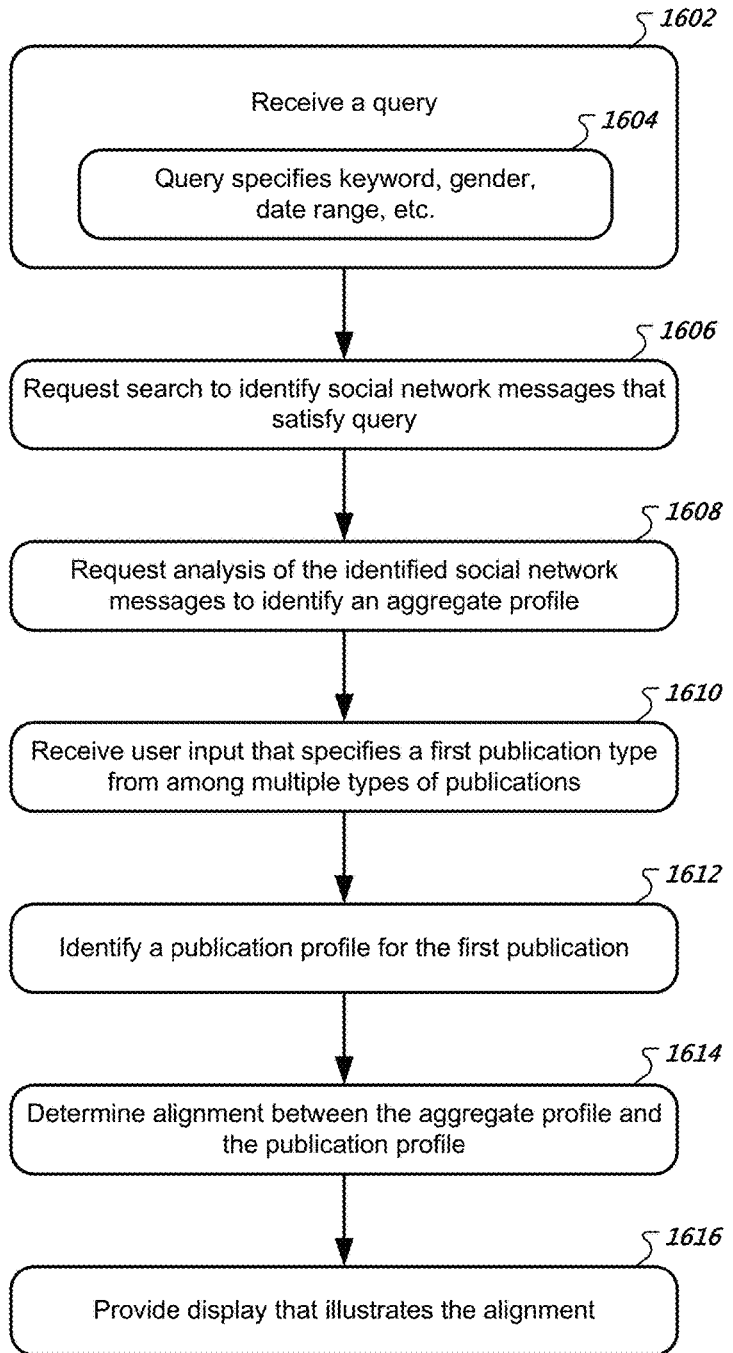

*1602*

Receive a query

*1604*

Query specifies keyword, gender, date range, etc.

*1606*

Request search to identify social network messages that satisfy query

*1608*

Request analysis of the identified social network messages to identify an aggregate profile

*1610*

Receive user input that specifies a first publication type from among multiple types of publications

*1612*

Identify a publication profile for the first publication

*1614*

Determine alignment between the aggregate profile and the publication profile

*1616*

Provide display that illustrates the alignment

Searching System × searchingsystem.com/html/target.jsp?tid=449&name=Good%20Morning%20America%20-%20US Ask Searching System...   Go!

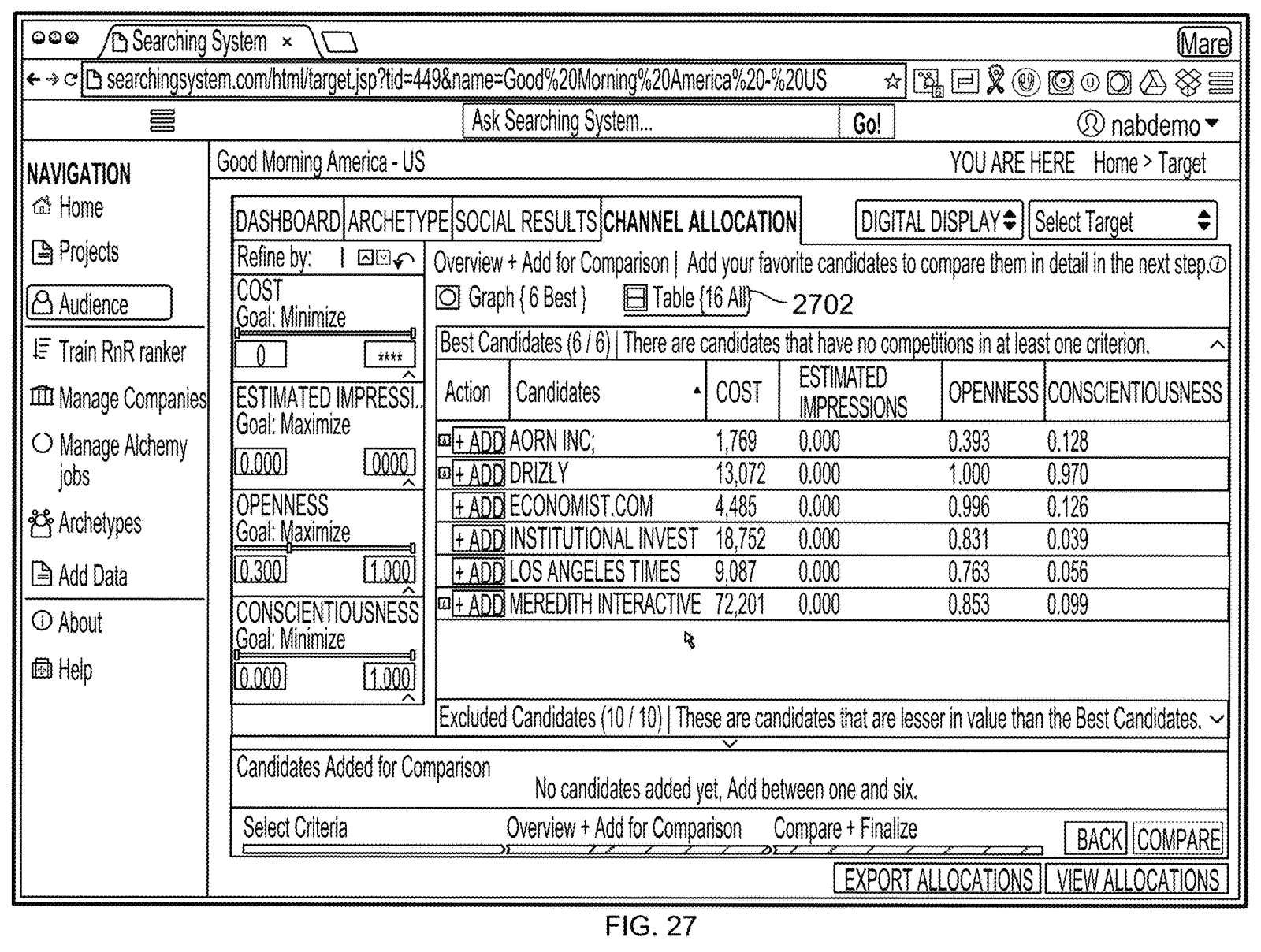

nabdemo ▾

Good Morning America - US

YOU ARE HERE   Home > Target

NAVIGATION
- Home
- Projects
- Audience
- Train RnR ranker
- Manage Companies
- Manage Alchemy jobs
- Archetypes
- Add Data
- About
- Help

DASHBOARD | ARCHETYPE | SOCIAL RESULTS | CHANNEL ALLOCATION

DIGITAL DISPLAY ◆ Select Target ◆

Refine by:

COST
Goal: Minimize
0   ****

ESTIMATED IMPRESSI...
Goal: Maximize
0.000   0.000

OPENNESS
Goal: Maximize
0.000   0.300   1.000

CONSCIENTIOUSNESS
Goal: Minimize
0.000   0.000   1.000

Overview + Add for Comparison | Add your favorite candidates to compare them in detail in the next step.

Graph {6 Best}   Table {16 All}   ~2702

Best Candidates (6 / 6) | There are candidates that have no competitions in at least one criterion.

| Action | Candidates | COST | ESTIMATED IMPRESSIONS | OPENNESS | CONSCIENTIOUSNESS |
|---|---|---|---|---|---|
| + ADD | AORN INC, | 1,769 | 0.000 | 0.393 | 0.128 |
| + ADD | DRIZLY | 13,072 | 0.000 | 1.000 | 0.970 |
| + ADD | ECONOMIST.COM | 4,485 | 0.000 | 0.996 | 0.126 |
| + ADD | INSTITUTIONAL INVEST | 18,752 | 0.000 | 0.831 | 0.039 |
| + ADD | LOS ANGELES TIMES | 9,087 | 0.000 | 0.763 | 0.056 |
| + ADD | MEREDITH INTERACTIVE | 72,201 | 0.000 | 0.853 | 0.099 |

Excluded Candidates (10 / 10) | These are candidates that are lesser in value than the Best Candidates.

Candidates Added for Comparison   No candidates added yet. Add between one and six.

Select Criteria   Overview + Add for Comparison   Compare + Finalize

BACK | COMPARE

EXPORT ALLOCATIONS | VIEW ALLOCATIONS

FIG. 27

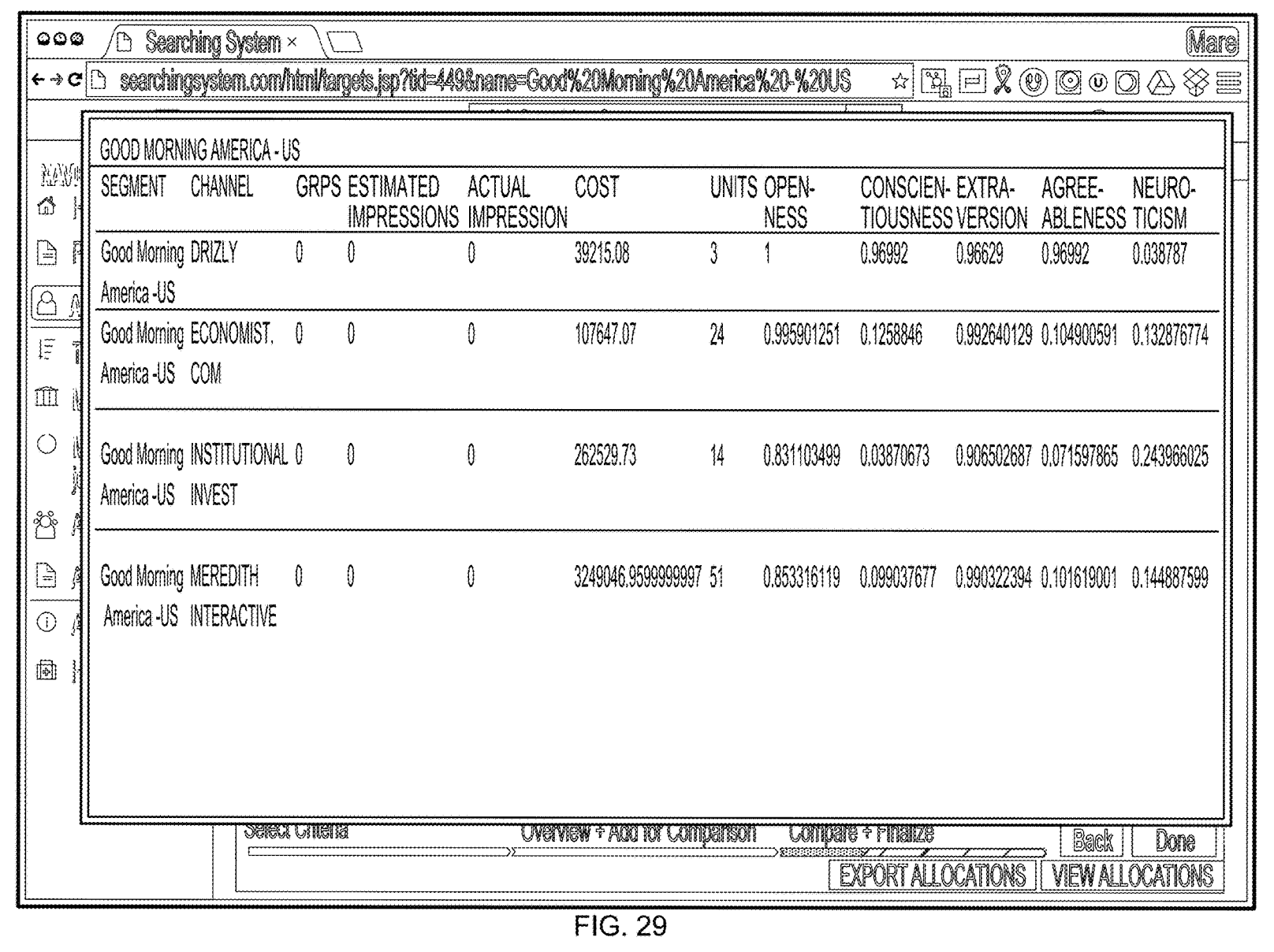

GOOD MORNING AMERICA -US

| SEGMENT | CHANNEL | GRPS | ESTIMATED IMPRESSIONS | ACTUAL IMPRESSION | COST | UNITS | OPEN-NESS | CONSCIEN-TIOUSNESS | EXTRA-VERSION | AGREE-ABLENESS | NEURO-TICISM |
|---------|---------|------|----------------------|-------------------|------|-------|-----------|--------------------|--------------| ---------------|---------------|
| Good Morning America -JS | DRIZLY | 0 | 0 | 0 | 39215.08 | 3 | 1 | 0.96992 | 0.96629 | 0.96992 | 0.038787 |
| Good Morning America -JS | ECONOMIST. COM | 0 | 0 | 0 | 107647.07 | 24 | 0.999901251 | 0.1258846 | 0.992040129 | 0.104900591 | 0.132876774 |
| Good Morning America -JS | INSTITUTIONAL INVEST | 0 | 0 | 0 | 262529.73 | 14 | 0.831103499 | 0.003870673 | 0.906502687 | 0.071597865 | 0.243966025 |
| Good Morning America -JS | MEREDITH INTERACTIVE | 0 | 0 | 0 | 3249046.959999999997 | 51 | 0.853316119 | 0.009037677 | 0.990322394 | 0.101619001 | 0.144887599 |

Overview + Add for Comparison    Compare + Finalize

Back    Done

EXPORT ALLOCATIONS | VIEW ALLOCATIONS

FIG. 29

Linking to a Search Result

FIG. 37A

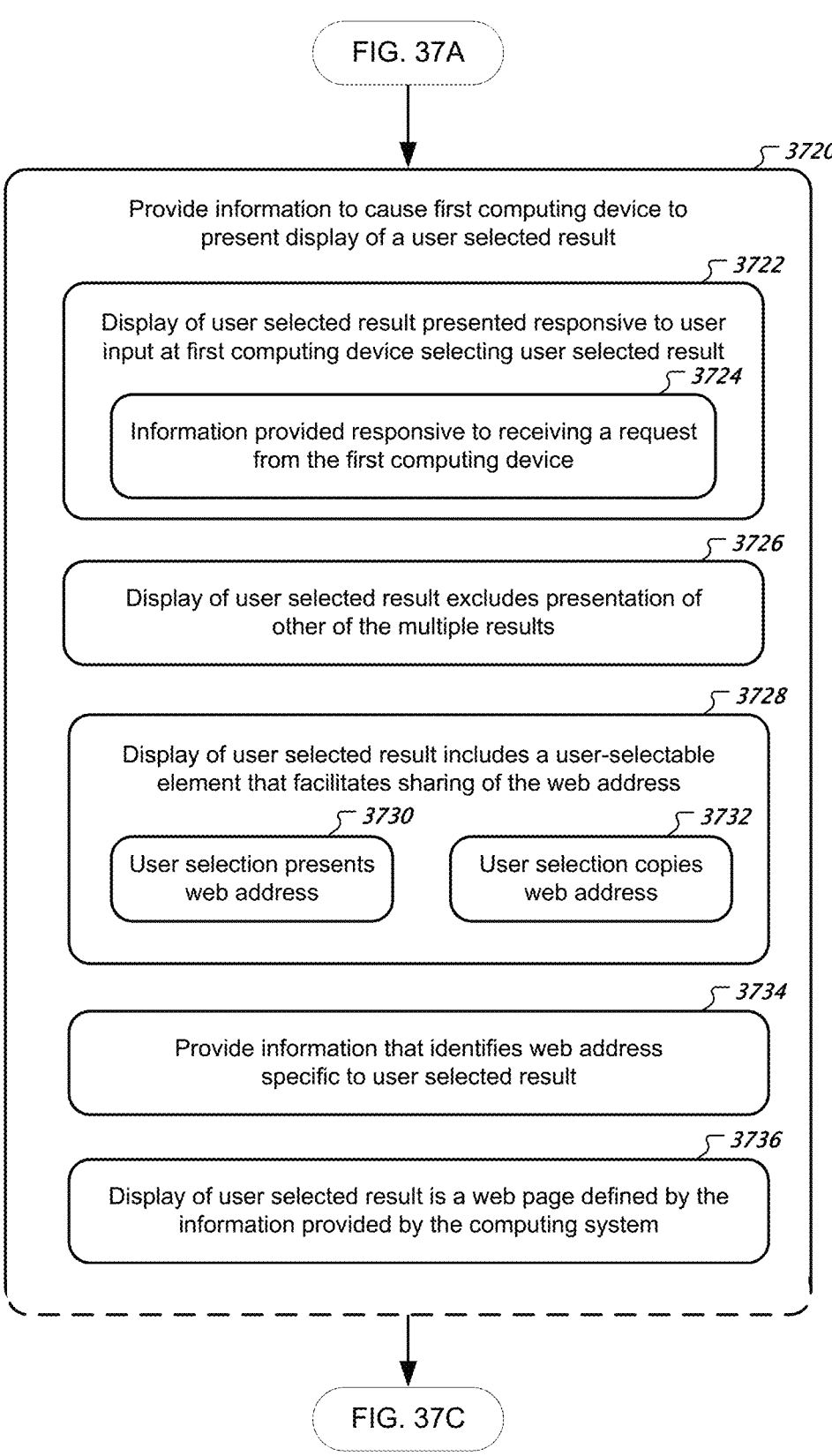

3720

Provide information to cause first computing device to present display of a user selected result

3722

Display of user selected result presented responsive to user input at first computing device selecting user selected result

3724

Information provided responsive to receiving a request from the first computing device

3726

Display of user selected result excludes presentation of other of the multiple results

3728

Display of user selected result includes a user-selectable element that facilitates sharing of the web address

3730

User selection presents web address

3732

User selection copies web address

3734

Provide information that identifies web address specific to user selected result

3736

Display of user selected result is a web page defined by the information provided by the computing system

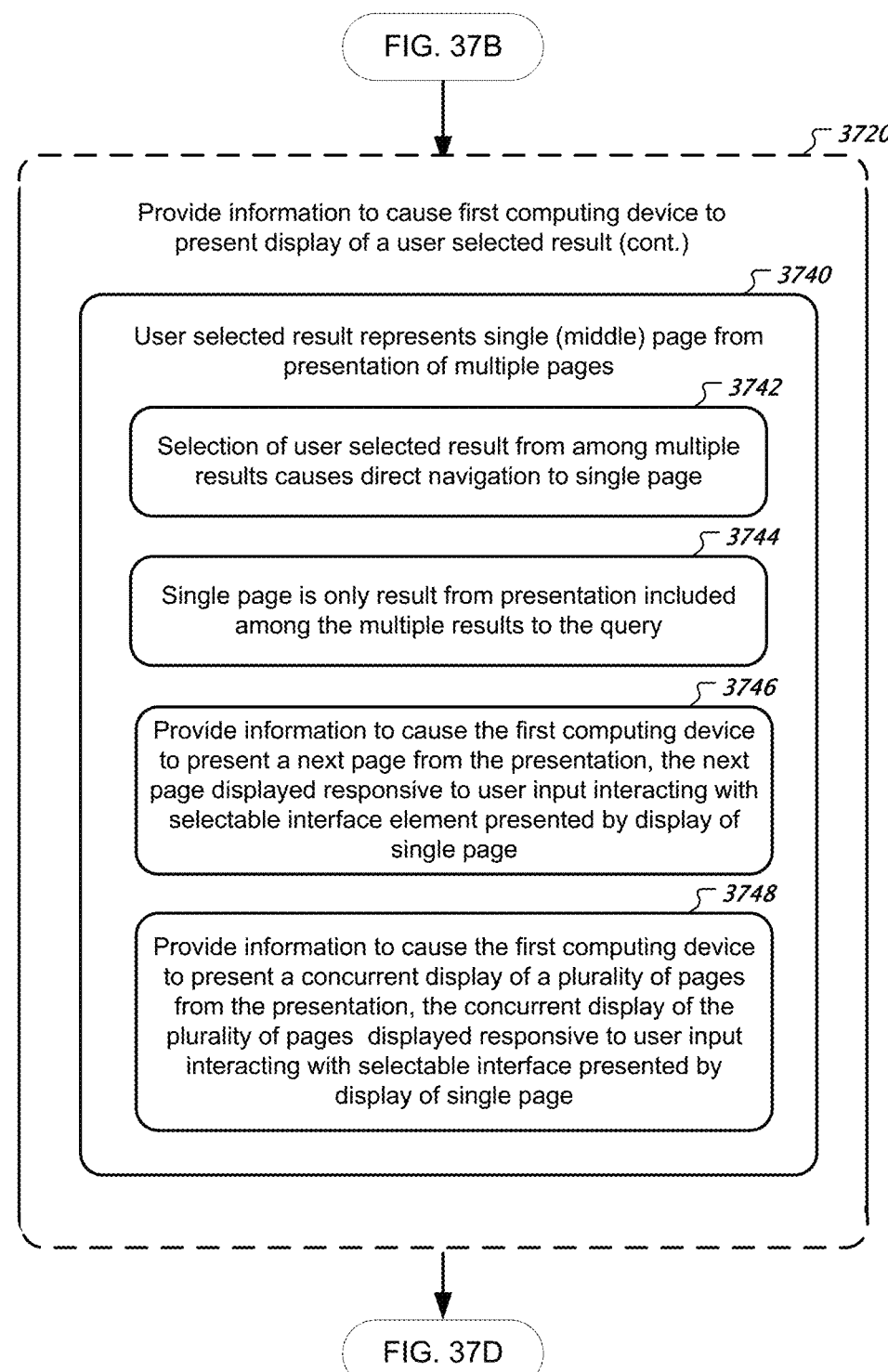

Provide information to cause first computing device to present display of a user selected result (cont.)

3740

User selected result represents single (middle) page from presentation of multiple pages

3742

Selection of user selected result from among multiple results causes direct navigation to single page

3744

Single page is only result from presentation included among the multiple results to the query

3746

Provide information to cause the first computing device to present a next page from the presentation, the next page displayed responsive to user input interacting with selectable interface element presented by display of single page

3748

Provide information to cause the first computing device to present a concurrent display of a plurality of pages from the presentation, the concurrent display of the plurality of pages displayed responsive to user input interacting with selectable interface presented by display of single page

Commenting on a Search Result

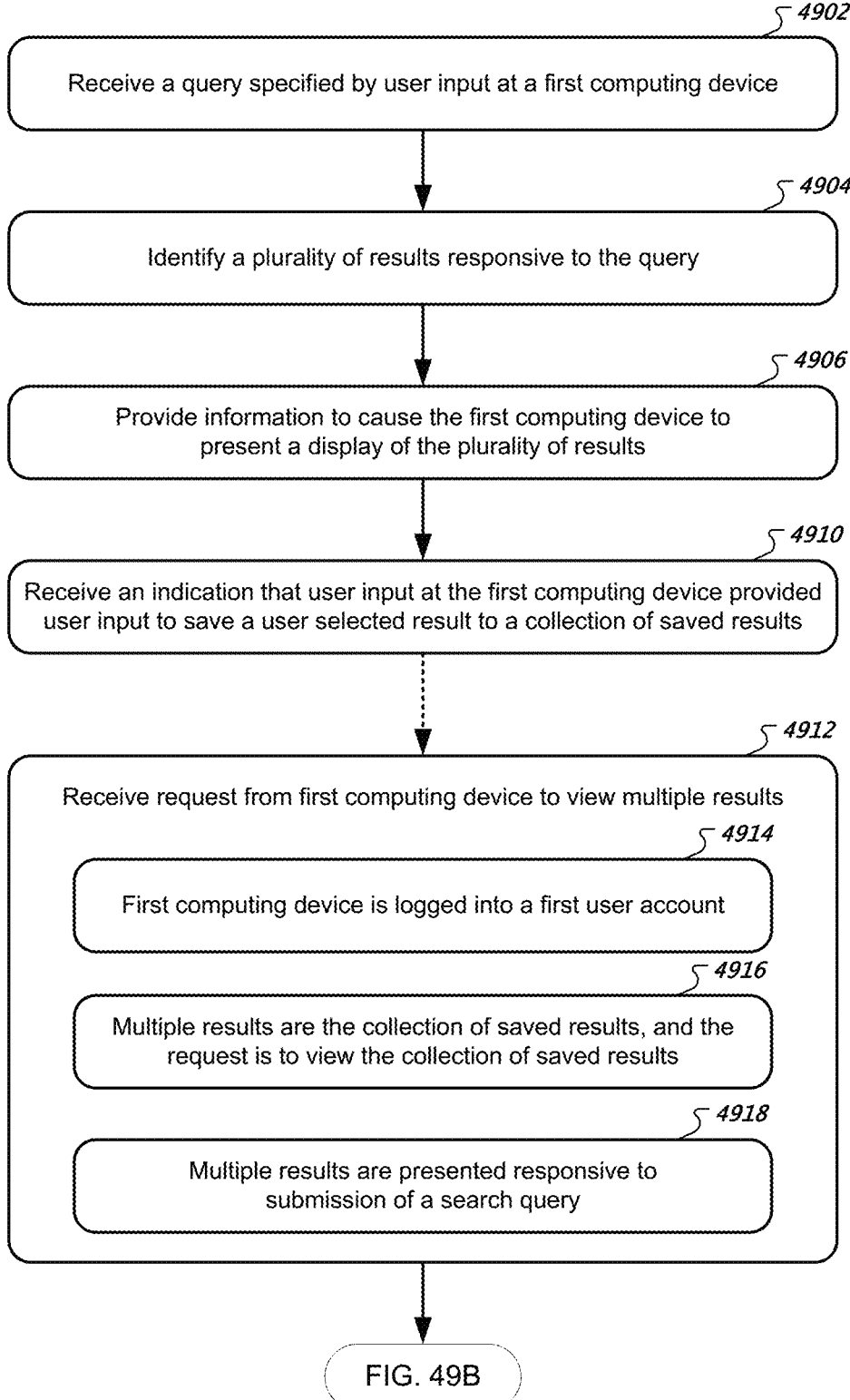

4902

Receive a query specified by user input at a first computing device

4904

Identify a plurality of results responsive to the query

4906

Provide information to cause the first computing device to present a display of the plurality of results

4910

Receive an indication that user input at the first computing device provided user input to save a user selected result to a collection of saved results

4912

Receive request from first computing device to view multiple results

4914

First computing device is logged into a first user account

4916

Multiple results are the collection of saved results, and the request is to view the collection of saved results

4918

Multiple results are presented responsive to submission of a search query

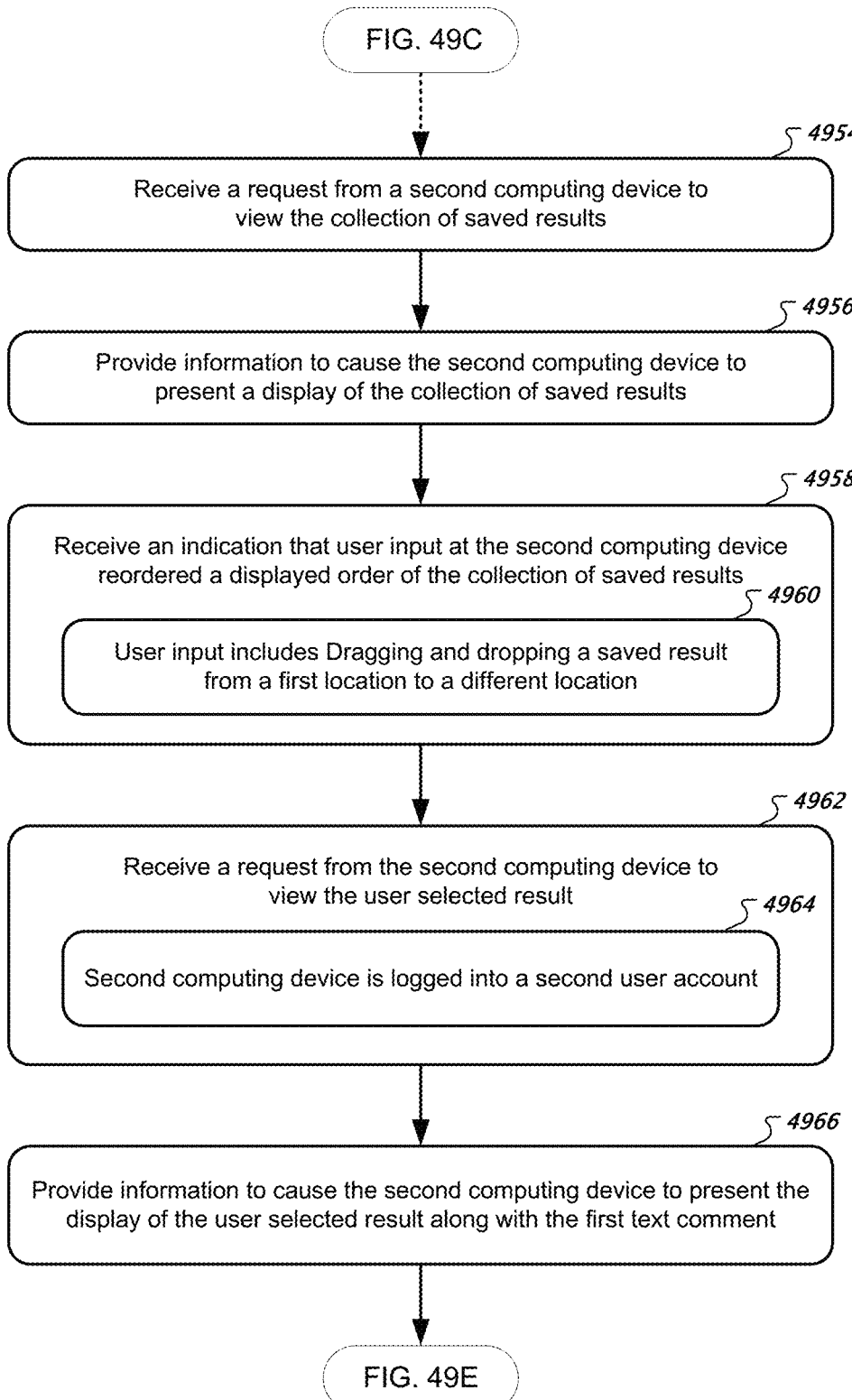

Receive a request from a second computing device to view the collection of saved results

_4956_

Provide information to cause the second computing device to present a display of the collection of saved results

_4958_

Receive an indication that user input at the second computing device reordered a displayed order of the collection of saved results

_4960_

User input includes Dragging and dropping a saved result from a first location to a different location

_4962_

Receive a request from the second computing device to view the user selected result

_4964_

Second computing device is logged into a second user account

_4966_

Provide information to cause the second computing device to present the display of the user selected result along with the first text comment

COMMENTING ON A SEARCH RESULT

CLAIM OF PRIORITY

This application is a continuation of and claims priority to U.S. application Ser. No. 17/328,664 filed May 24, 2021, which is a continuation-in-part of and claims priority to U.S. application Ser. No. 15/592,842, filed on May 11, 2017 (now U.S. Pat. No. 11,016,981), which claims priority to U.S. Provisional Application Ser. No. 62/335,812, filed on May 13, 2016, the entire contents of both these applications being hereby incorporated by reference.

TECHNICAL FIELD

This document generally relates to linking to a search result.

BACKGROUND

Search engines enable users to search for information on the Internet. In response to a user providing a query at a client device, the client device typically sends the query to a search engine, and the search engine identifies a collection of results that are responsive to the search query from a corpus of potential results. The search engine can provide the list of results back to the client device for display.

A user of the client device may view the list of displayed results, and may select one of the results. Selection may cause the client device to present additional information that is relevant to the selected result, for example, another web page that includes data for which the selected result presented a summary.

SUMMARY

This document describes techniques, methods, systems, and other mechanisms for searching structured and unstructured data sets.

Particular implementations can, in certain instances, realize one or more of the following advantages. A computing system can determine whether to respond to a query using one or more structured datasets or one or more unstructured datasets. When querying the structured datasets, the computing system may determine which of the multiple structured datasets to query based on pre-determined preferences, so that a most-relevant result is to be selected. Moreover, the presentation of results that are relevant to the query can be customized based on a type of the result and a confidence score for the result. This customization can include the computing system selectively expanding certain search results and providing alternative queries in response to a search.

The details of one or more implementations are set forth in the accompanying drawings and the description below. Other features, objects, and advantages will be apparent from the description and drawings, and from the claims.

DESCRIPTION OF DRAWINGS

FIG. 13 shows a web page at which a user can select a project for which to view one or more saved results.

FIG. 16 shows a flowchart of a process for identifying a publication that is relevant to a subset of social network users.

FIG. 17 shows a web page that lists multiple targets.

Figure 19:
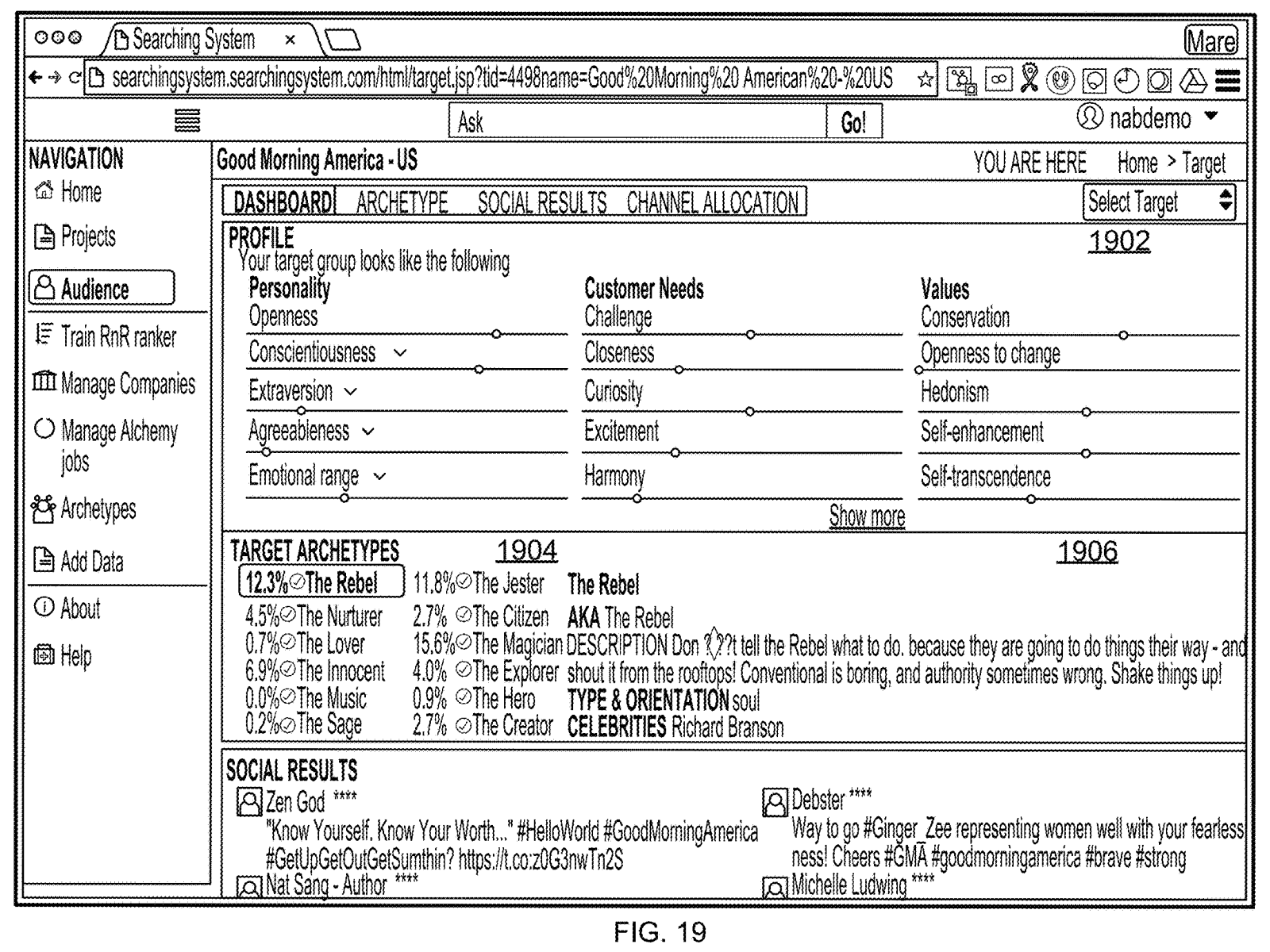

FIG. 19 shows a web page that indicates values for personality characteristics.

FIG. 20 shows a web page at which a user can select an archetype.

FIG. 21 shows a web page at which a user can specify characteristics for an archetype that the user selected.

FIG. 23 shows an Archetype tab for the Audience portion of the web page.

FIG. 24 shows a Social Results tab for the Audience portion of the web page.

FIG. 27 shows a web page that is presented when a user selects a table user interface element.

FIG. 29 shows a popup box that shows values in table format.

FIGS. 37A-E show a flowchart of a process for linking to a search result.

FIGS. 49A-F show a flowchart of a process for commenting on a search result.

Like reference symbols in the various drawings indicate like elements.

DETAILED DESCRIPTION

This document describes searching structured and unstructured data sets.

Users of traditional search systems can have difficulty obtaining results that the user considers helpful and relevant to the query that the user submitted. Some systems may be configured to search data that is stored in a structured manner, such that the searching system can obtain a specific answer for a query (e.g., in database tables that are structured according to administrator preferences, that store the results in fields of the database table, and in which a result is selected based on it being located in a particular field that is responsive to a query, possibly to the exclusion of any consideration of a content of the fields). For example, a query that requests the circumference of the earth may return a single-phrase answer that was stored in a field of a database table (e.g., the answer "24,901 miles"). While these types of search systems are powerful when the user submits a query that has a known answer that is identifiable due to is location in the structured data set, a weakness in such search systems is exposed when a user asks a question for which the structured dataset does not have an answer.

Systems that search unstructured data, on the other hand, can provide one or more results when there is no specifically-identifiable answer. Still, the list of results may not provide the same apparent confidence as a result to a query of a structured dataset, because the list may not present a single answer to the query. The unstructured data may include representations of thousands or millions of documents, and the search may identify multiple of those documents that the searching system determines to be relevant to the query, rather than the content of a field in a database table, as may occur with searches of structured datasets.

The systems described in this document can receive a query and provide one or more answers to the query by searching one or both of these datasets (structured and unstructured). In effect, the system may determine which type of search is more likely to yield the best one or more results, and may execute that determined type of search. The operations of this system and variations thereof are described with reference to various system diagrams, flowcharts, and user interface displays, as follows.

Figure 1:
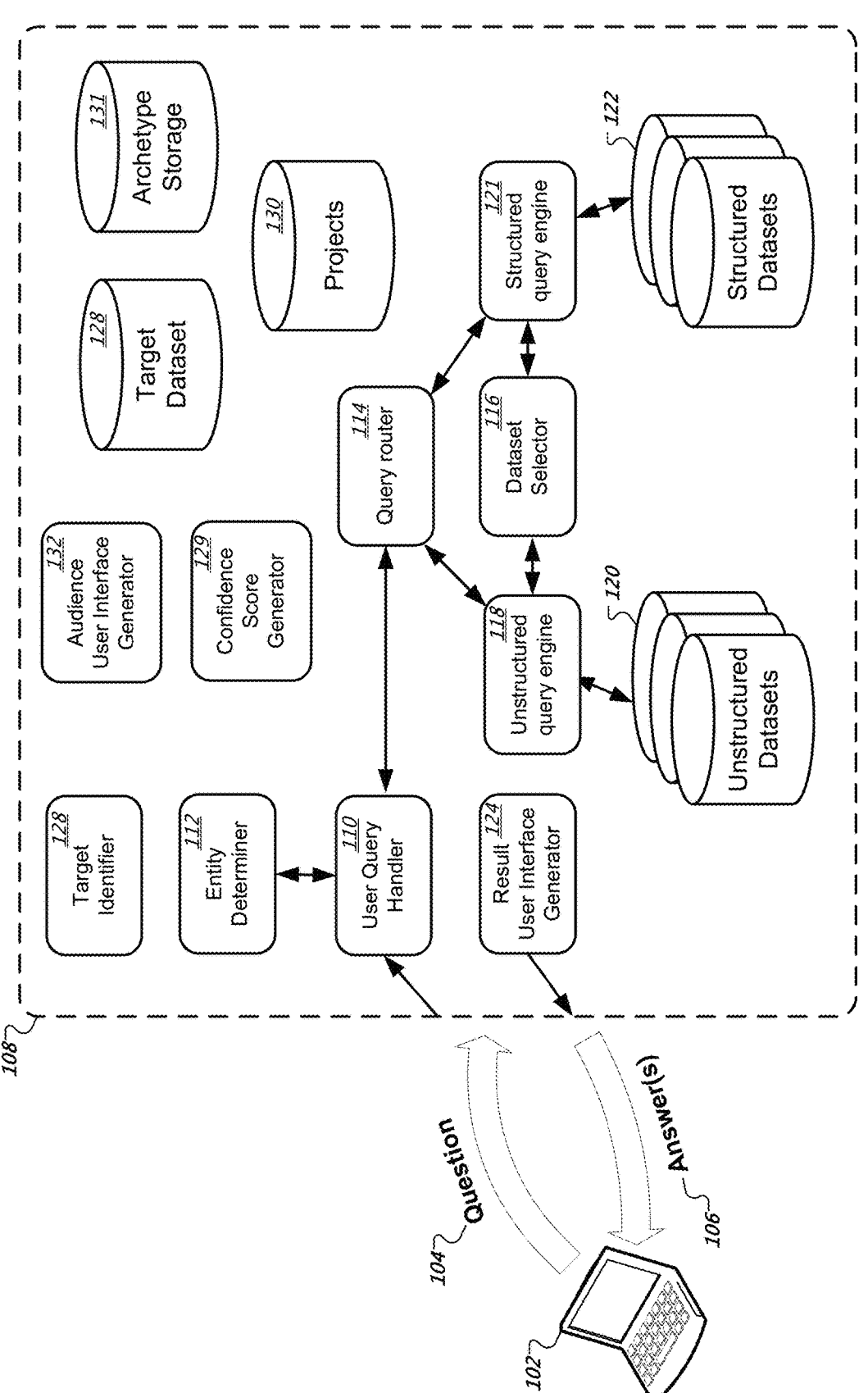
FIG. 1 shows a system for searching structured and unstructured data.

FIG. 1 shows a system for searching structured and unstructured data. The system includes a computing device 102 at which a user specifies a query 104 (also referred to herein as a question 104) that is transmitted to a remote computing system 108. The computing system 108 may include multiple components and data sets that it uses to identify one or more responses 106 to the query (also referred to herein as one or more answers 106). The responses may be provided to the computing device 102 for display. The process for performing this type of a search, and the components that are involved in performing the search, are described in additional detail with reference to the following figures.

Figure 2A:
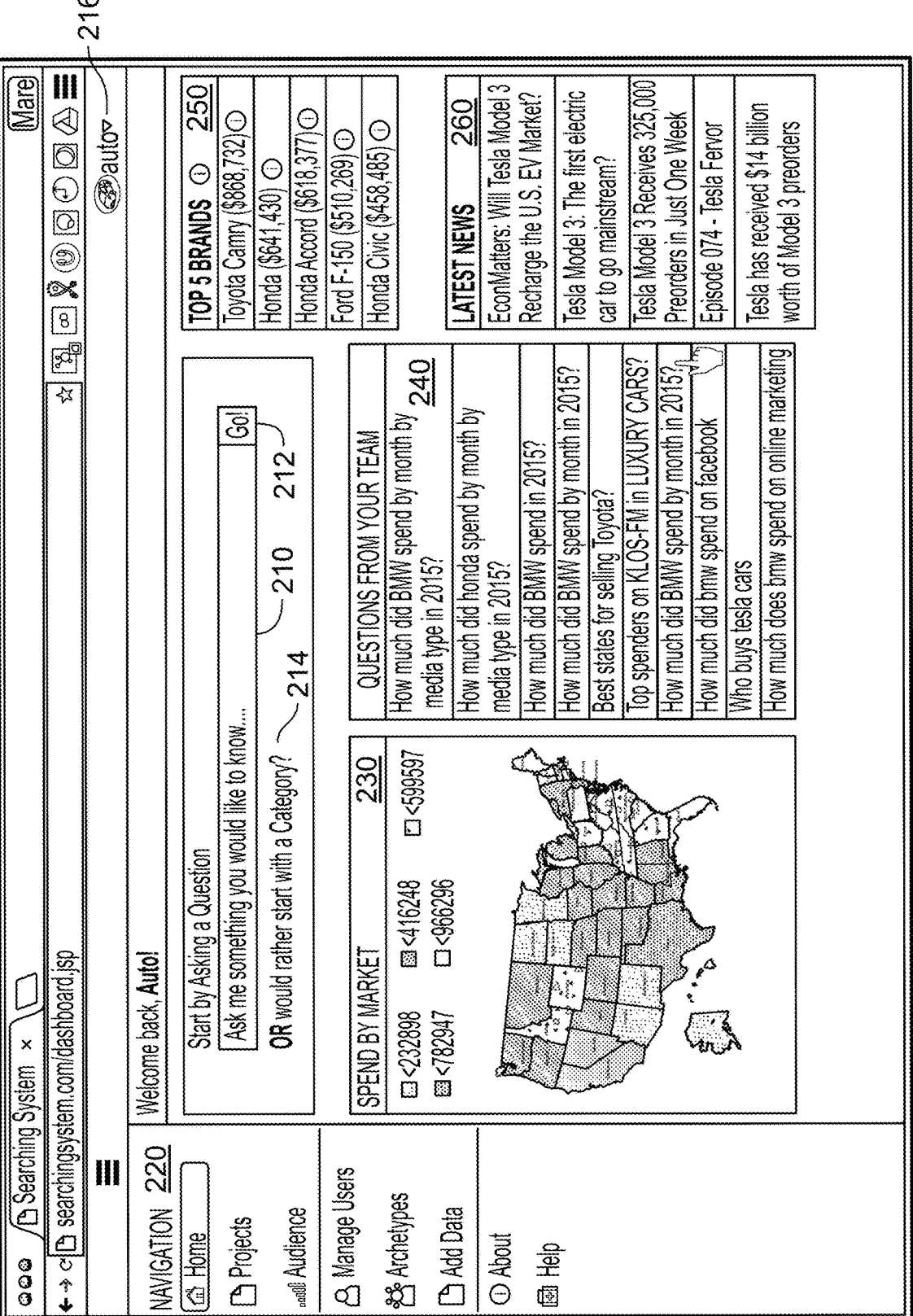
FIGS. 2A-B show a user interface for submitting a query.
Figure 2B:
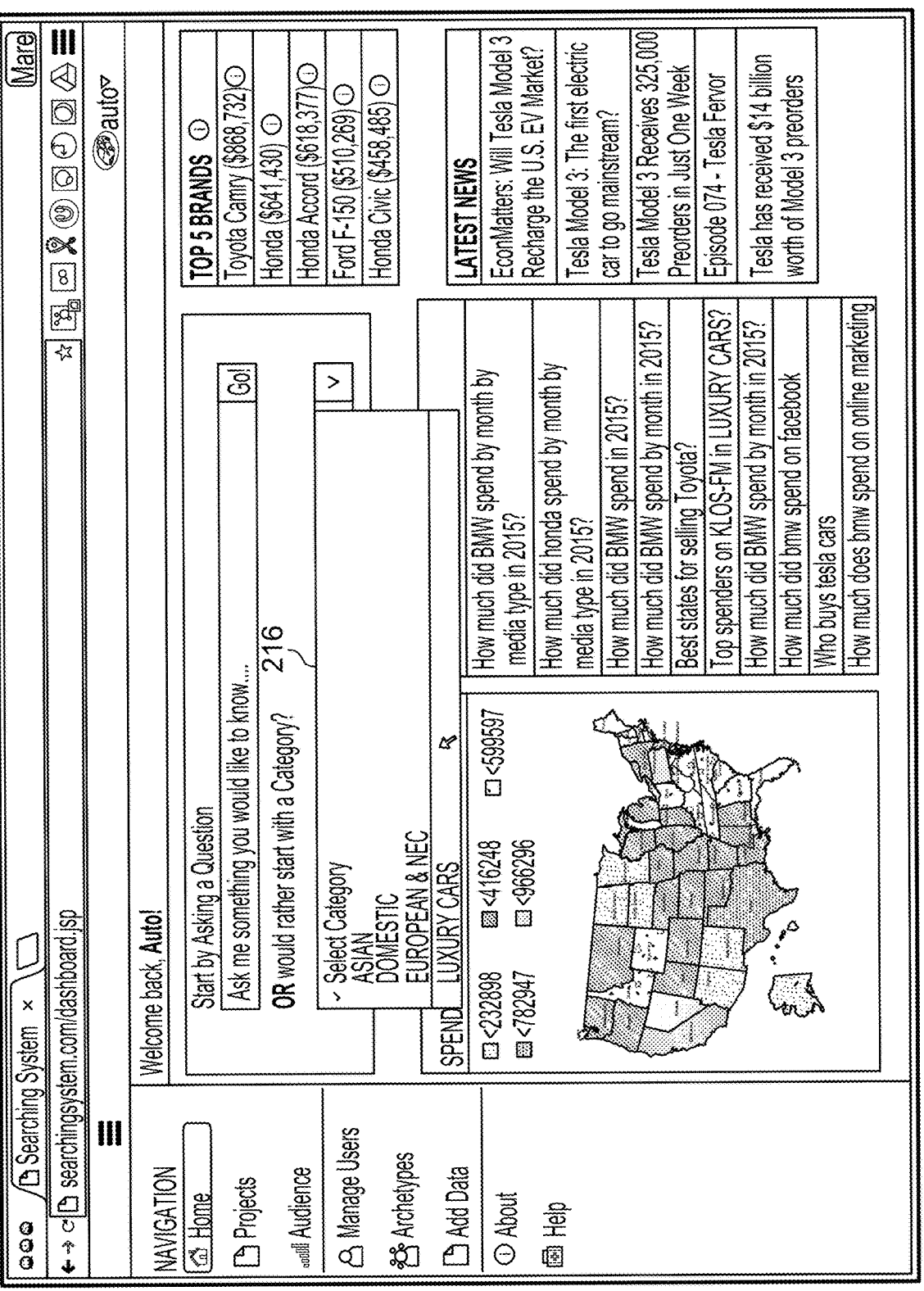

FIGS. 2A-B show a user interface for submitting a query. In this example, the user interface is provided by a web browser as the welcome or "Home" page of a searching website. This web page may include various aspects that allow users to enter queries and search content accessible to the searching website. For example, the page may include a text entry box 210, into which a user can type a search query (e.g., by selecting the text entry box 210 with a mouse cursor or by touchscreen selection, and then typing a query into text entry box 210 with a physical or virtual keyboard). A user may request that the computing system perform a search using the typed search query as an input by selecting the "enter" key on a keyboard or by selecting the "Go!" user interface element 212.

In this example, the user interface shows that a user "auto" 216 has already logged into the website. A user may log into the website by typing a URL for a web address of the searching website into a web browser address bar (or selecting a bookmark), to navigate to a login page. At the login page, the user may enter a username and a password. The system may determine whether the username is valid, and whether the password is correct for the entered username. If so, the system may log the client device (e.g., a browsing session of the web browser) into the user account. Once logged in, the user experience and the web pages that are provided for display to the user may be customized based on preferences stored for the user account. In various examples, the searching system may provide multiple organizations access to the searching website, and each organization may have a customized experience through use of the searching website (e.g., with different saved lists of projects and different databases available to users of each organization). Each organization may be associated with multiple user accounts, and therefore the user account under which a person logs in may affect the user experience provided to the person while viewing the searching web site.

The user interface includes other components, such as a sidebar 220 that includes user interface elements that user input can select to navigate to different pages of the website. As indicated by the highlighting, the website is currently displaying the "Home" page.

This "Home" page provides additional features beyond just offering an ability to run a search. For example, the web page may include a list of questions 240 that other members of the team have provided. These may be questions that other individuals have previously specified through use of text entry box 210, when those other individuals were logged into the website under other user accounts assigned to a same organization. (Users logging into user accounts for a different organization would see a different list of questions, such as those that were entered by users of that different organization.) In response to selection of a suggested question, the client device's web browser may navigate to a display of one or more search results for the question, just as if the question was typed into the text entry box 210 and a user selected the "Go!" button.

The web page also includes a widget 230 that shows graphical data on marketing dollars spent for each state, a widget 250 that shows the top five automobile brands, and a widget 260 that includes links to recent news articles.

Underneath the text entry box 210 is a user interface element 214 for selecting a category within which to search. In response to user selection of this interface element 214, the web page presents a pull down list 216 of user-selectable categories. In this example, the user selects the "Luxury Cars" category, and the web page changes to that shown in FIGS. 3A-B, which show a web page for entering a category-specific query.

Figure 3A:
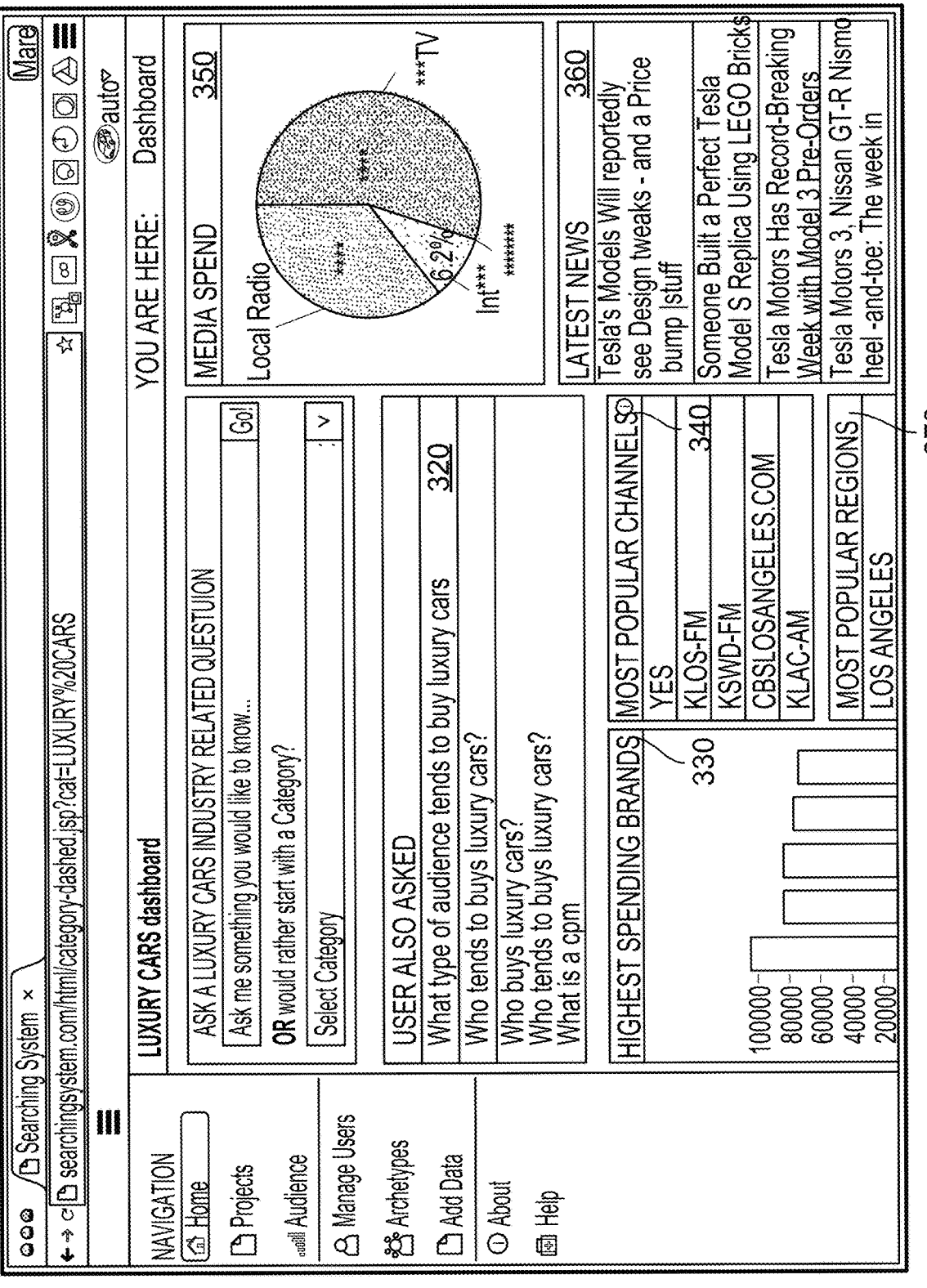
FIGS. 3A-B show a user interface for submitting a category-specific query.
Figure 3B:
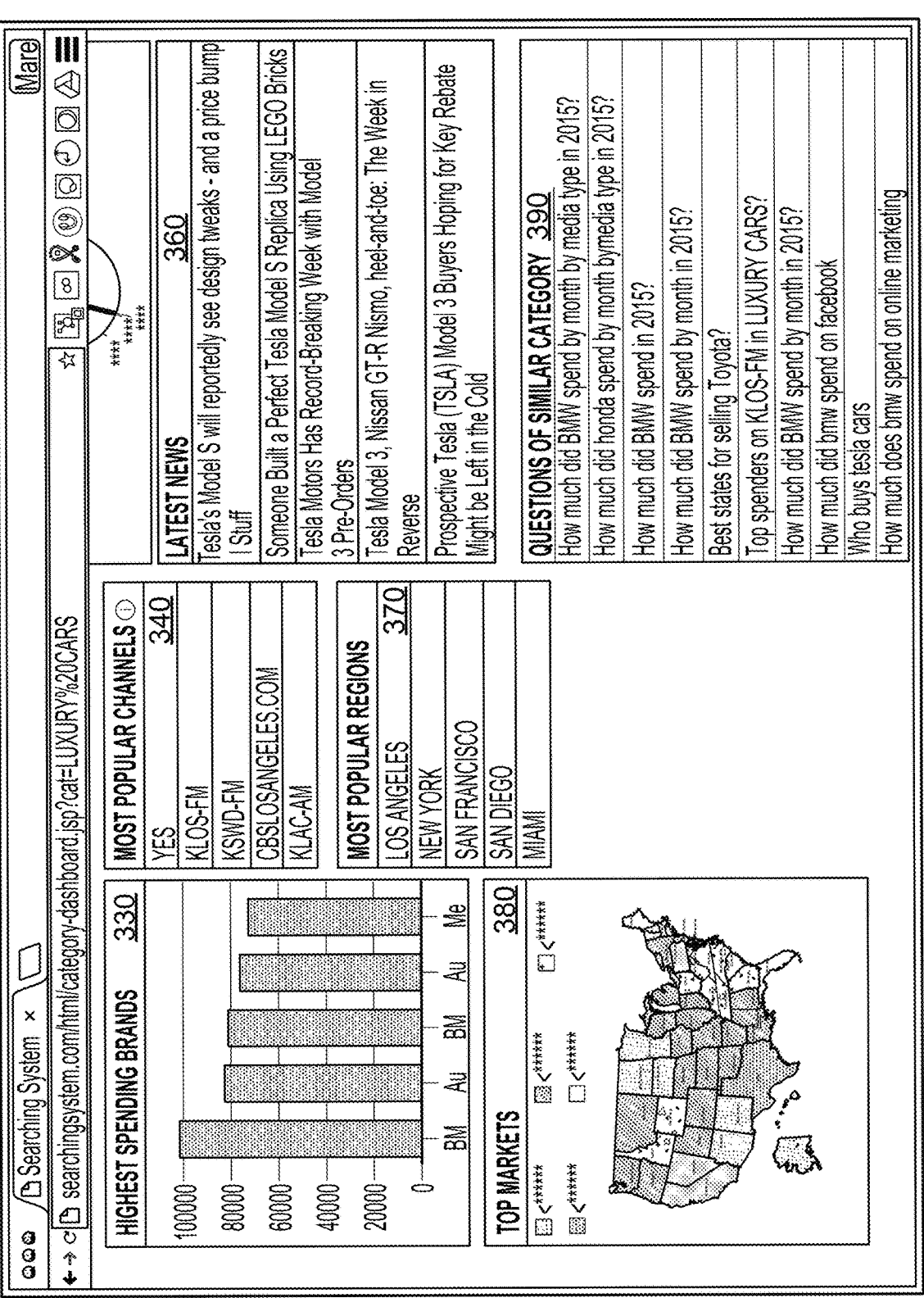

Note that in FIGS. 3A-B, the user interface has changed from that shown in FIGS. 2A-B (either through navigation to another web page or dynamic updating of the web page). The updated user interface indicates that the display is now of a "Luxury Cars dashboard" and prompts the user to "Ask a Luxury Cars Industry Related Question." In this example, should the user ask a category-specific question, only a subset of datasets (or documents within one or more datasets) may be queried to answer the question.

The category-specific web page includes multiple widgets that show data related to the category, such as a list of questions 320 that were previously asked by someone using that same user account while in the luxury cars dashboard. The web page also includes a pie graph 350 that shows the distribution of media spend within the luxury car industry, a bar graph 330 of the highest-spending brands within the industry (this bar graph may be a result that the computing system would provide should a user enter a natural language query into the text search box, such as "What are the highest-spenders for luxury automobiles"), a list 340 of the most-popular channels (e.g., outlets or publications through which media can be distributed) for the luxury car market, a widget 360 showing the latest news for the luxury car industry, a list 370 of the most popular regions for luxury cars, a depiction 380 of the top markets for luxury cars, and a list 390 of user-selectable questions of for similar categories.

Figure 4:
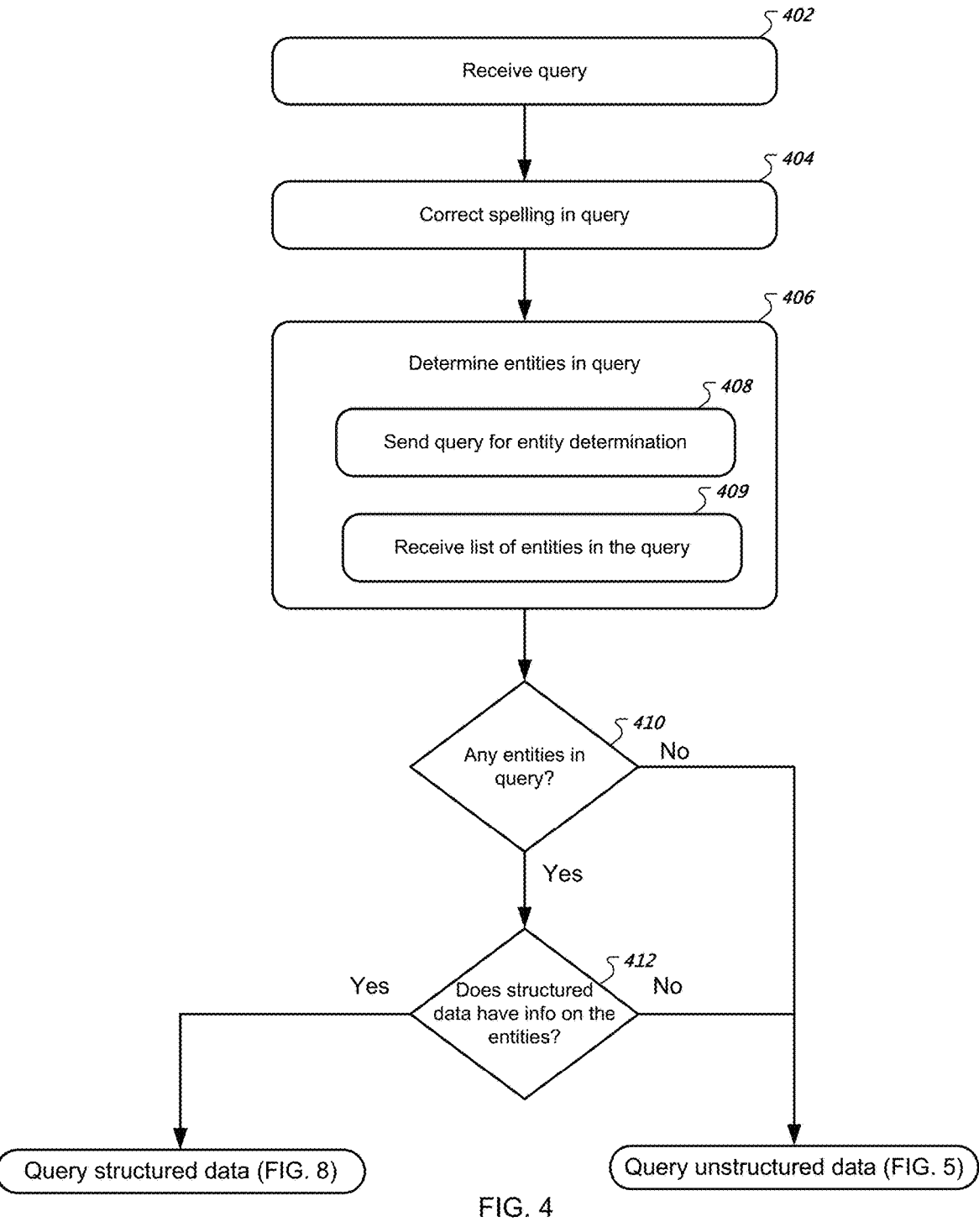
FIG. 4 shows a flowchart of initial actions for processing a query.

FIG. 4 shows a flowchart of initial actions for processing a query. For example, this flowchart may describe operations that the computing system 108 performs as a result of a user entering a query in the text search box 210 that is shown in FIG. 2A.

At box 402, the computing system receives a query. For example, the computing system 108 (FIG. 1) receives a query 104 that was specified by user input at computing device 102. The user may have specified the query 104 at the computing device 110 by typing the query into the text search box 210. In some examples, the user speaks the query and voice recognition processes at the computing device 102 or the computing system 108 convert the spoken query into text.

At box 404, the computing system corrects spelling in the query. For example, the user query handler 110 may perform spell-checking and spell-correction operations on the query, or may request that a separate process perform the same. The user query handler 110 may also perform or request that the query is processed by a natural language processor that restructures the query (e.g., by changing the sentence format to a standard or alternative format). The user query handler 110 may also perform other operations on the query, for example, by identifying synonyms to words in the query and adding those words to the query. Although the query may have been restructured and changed in various ways, this disclosure will still refer to the changed text as the query.

At box 406, the computing system determines any one or more entities in the query. In some examples, this involves sending the query (e.g., that which has been changed through natural language processing) to an entity determiner 112 (box 408) and receiving from the entity determiner 112 a list of entities in the query (box 409). The entity determiner 112 may analyze the query to determine whether the query includes words or phrases that are identified as entities. Entities may refer to persons, places, or things (e.g. nouns from a list of pre-determined nouns).

At boxes 410 and 412, the computing system (e.g., the query router 114) determines whether to use the query to interrogate one or more structured datasets or one or more unstructured datasets. In other words, the computing system identifies whether the one or more datasets of structured data include data for answering the query. This decision process is illustrated in FIG. 4 as two operations (i.e., those of boxes 410 and 412), but those operations could be combined into fewer operations.

The determination may involve determining whether the query includes one or more entities for which one or more structured datasets may have information. For example, a structured dataset may include sales data on various automobiles for various states and in various years. The automobiles may include "Subaru Outback" and "Honda Accord," the states may include all fifty states, and the years may include 2010-2015 for Subaru Outback and 2002-2015 for Honda Accord. Accordingly, the structured dataset may store this data in a multi-dimensional format (with each dimension, such as "car types," "years," and "states" including multiple members). Because a dataset may include a "car types" dimension that has "Honda Accord" as a member, should the entity determiner 112 determine that the query includes the phrase "Honda Accord," then the computing system may use the query to interrogate the structured dataset that includes the dimension with "Honda Accord" as a member. Should "Honda Accord" be the only identified entity in the query, and should there be no dataset that includes a "Honda Accord" member, then the query may be routed for interrogation of the unstructured datasets rather than structured datasets. These operations are described in additional detail with reference to boxes 410 and 412.

At box 410, the computing system determines whether the query was determined to include any entities. For example, the query router 114 may determine whether the entity determiner 112 identified at least one entity in the query. If not, the query router 114 may route the query for processing of unstructured data. If the query was identified as including at least one entity, the query router 114 may then determine whether any of the structured datasets store information for the identified one or more entities. Continuing with the above illustration, the computing system may determine whether any of the structured datasets include a "Honda Accord" member (sometimes referred to as an "attribute" in various database or data storage systems or nomenclatures). If the answer is yes, then the query router 114 may route the query for processing of structured data. If the answer is no, then the query router 114 may route the query for processing of unstructured data. In examples in which the query includes multiple entities, but only some of them have corresponding data in a structured dataset, the query may be provided for processing of the structured data, but the database query that is created (as described below, with reference to FIG. 5), may only refer to entities for which there is data in the structured dataset (e.g., for which there is a member or attribute assigned to the name of the entity).

Figure 5:
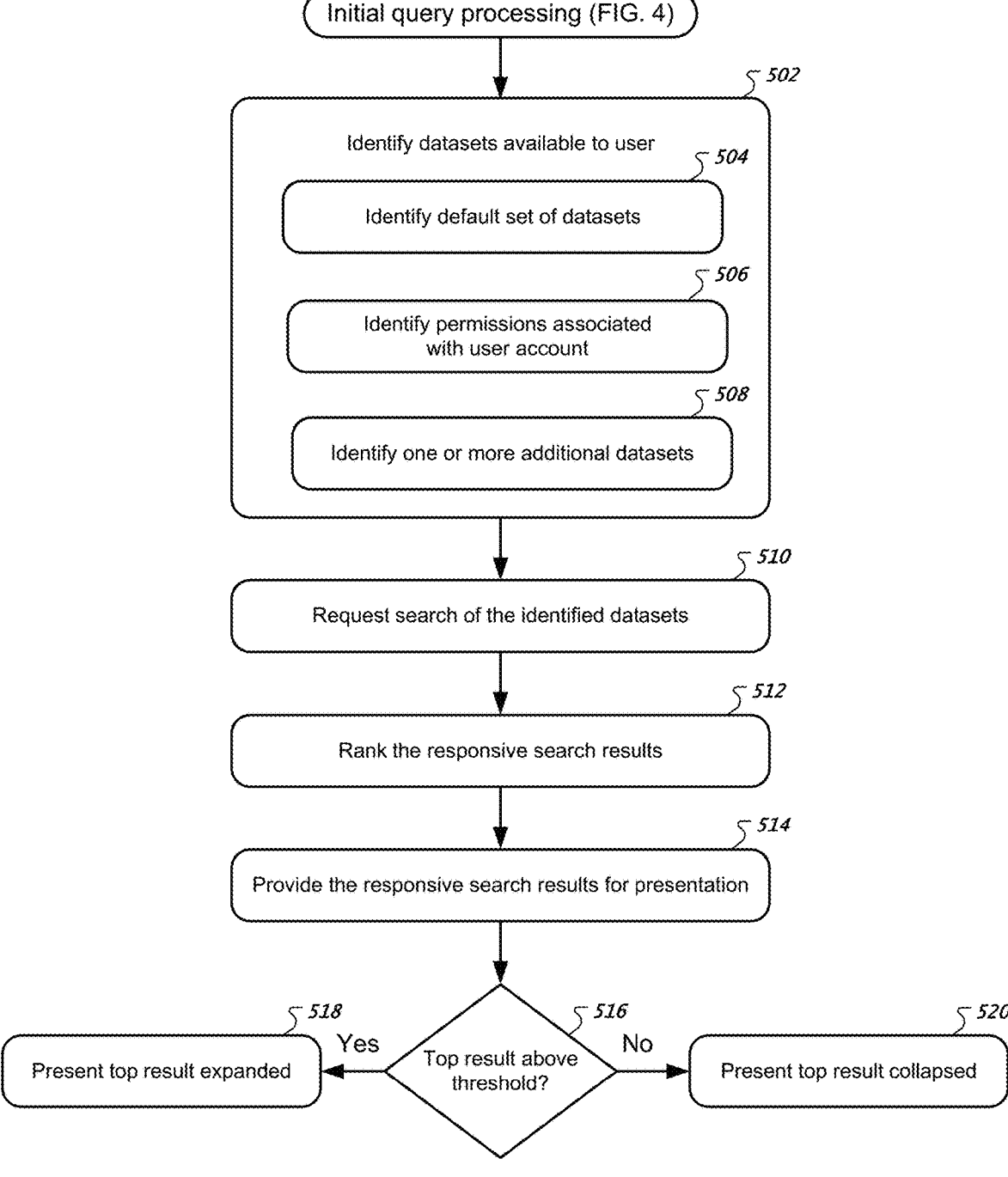
FIG. 5 shows a flowchart of actions for processing a query of unstructured data.

FIG. 5 shows a flowchart of the actions for processing a query of unstructured data. These actions may be performed in response to the computing system determining that the query should be run on one or more unstructured datasets, as described with respect to FIG. 4.

At box 502, the computing system (e.g., the dataset selector 116) identifies a subset of datasets that are available for querying. The identification may be performed because the computing system may include or be in communication with some datasets that should only be accessible to certain user accounts (e.g., user accounts affiliated with an organization that provided the dataset or an organization that paid a license to access the dataset).

At box 504, the identification of available datasets includes identifying a default set of datasets. These may be those datasets that are designated as being available to all user accounts, regardless of the organization to which the user account is assigned. One example default unstructured dataset may include data retrieved from WIKIPEDIA through an automated collection process (e.g., through use of a web crawler). Another example default unstructured dataset may include data pulled from a social network such as TWITTER (e.g., through use of an API). An example of a default structured dataset is data from BLUE SKY DATA CORPORATION.

At box 506, the identification of available datasets includes identifying permissions that are associated with a user account into which the computing device 102 was logged and for which the website customized the web page that presented text entry box 210. As previously described, the user account may be assigned to a single organization (e.g., employer of the user) or group of user accounts. Each user account may be only assignable to a single organization or a single group of user accounts. As such, the permissions may be those assigned specifically to the user account, or those that are associated with the user account by way of them being assigned to the organization or group of which the user account is a member.

In some examples, the permissions may indicate that the organization or a group of which the user account is a member has paid a license to access a particular dataset. For example, the user account may be for an employee of a particular organization, and that particular organization may have paid a license fee to another company that is different from an organization that runs the searching system. In other words, the searching system may be able to access licensed data, but may only be able to run searches on the licensed data for customers that have paid the appropriate licensing fee.

Access to the licensed datasets can be requested or authenticated in various ways. In some examples, an administrator of the particular organization can enter login credentials (e.g., a username and password) to login to an interface that is provided by the provider of the licensed data (e.g., either through a web page of the provider of the licensed data or a web page of the searching system that provides a widget or login system on behalf of the provider of the licensed data). Once authenticated, the computing system of the provider of the licensed data may provide, to the administrator or the searching system, an indication (e.g., a token) that users of the particular organization can utilize to access the licensed data. This indication may be the above-described permission, or may be used to set the above-described permission.

In some examples, the permissions (e.g., a portion thereof) may indicate that the organization or group of which the user account is a member has provided the data in a particular dataset, and thus that the user account is able to access that data. As an illustration, some companies may have data that would be particularly relevant to some queries, and may want that data to be included in search results if relevant. One such example may be a car company that wants to be able to search sales data for all car brands from publicly-available or licensed sources of data, but which would also like its own confidential sales data to be searched-yet only when searches are performed by employees of the car company.

In such an example, the computing system 108 would include an interface through which a remote computing device authenticated for a particular user account or group of user accounts could upload data to the computing system. The uploaded data could be accompanied by a request that the uploaded data only be available to a specified group of user accounts. In other examples, the interface would allow the remote computing device to specify a location at which data was stored remote from the computing system (e.g., along with credentials or a token to access the data).

At box 508, the identification of the available datasets includes identifying one or more additional datasets. These one or more datasets may be those datasets that the permissions that are associated with the user account indicate as being available for a search. As such, a portion of the one or more additional datasets may include one or more licensed datasets, while another portion of the one or more additional datasets may include one or more employer-provided datasets.

The default and additional datasets may be just the unstructured datasets that are available to the user, just the structured datasets that are available to the user, or both, depending on whether the query was routed for unstructured querying, or structured querying, or both. (In the flowchart of FIG. 5, the query was routed for unstructured dataset processing, but the same or similar operations may occur to identify datasets specific to structured dataset processing, as described with reference to box 802 in FIG. 8.)

At box 510, the computing system requests a search of the identified datasets. For example, the unstructured query engine 118 may request a search of a subset of the unstructured datasets 120 that were selected by the dataset selector 116. Those searched datasets may include the one or more default datasets and the one or more datasets that were identified based on permissions. The search may be performed by the computing system 108 or may involve the computing system 108 requesting that a remote system performs the search and provide an indication of the responsive results to the computing system 108.

In this example, the unstructured datasets include datasets in which the entire content of a resource (e.g., a web page or an article) may be queried to determine whether the resource is relevant to the query and should be identified as being responsive to the query. The determination of whether a resource is relevant may involve determining a frequency with which words in the query (e.g., the entities) appear in the resource. Although the resources may be referenced by different database fields, this determination may be in distinction to operation of a query of a structured dataset, in which a result may be retrieved not based on a content of the result itself, but based on the result being located in a field in a dataset that is assigned to database members/attributes that match certain words in the query (e.g., because the database members/attributes have the same name as words in the query). In other words, a structured result may be retrieved based on its location in a dataset (e.g., the result being located in a field in which the result was identified as residing), whereas structured results may be retrieved based on the result itself matching the query.

At box 512, the computing system identifies a ranking of the search results that are responsive to the query. For example, the computing system may rank the search results or request that another system provide a ranking. The ranking may be based on a confidence score that the computing system identifies for each of the responsive results (e.g., as calculated by the confidence score generator 129). The confidence score may be calculated based on various factors. One factor may be a degree to which the result (or the resource that is identified by the result, when the result is considered a summarized version of the resource and may include a link to the resource) includes words in the query. Another factor may be a degree to which the result has previously been selected by the same user account or other user accounts in response to the same or similar queries. Yet another factor may be whether users selected a user interface element to indicate that the result was helpful or not helpful as a response to the query. The computing system may select a subset of the results with the best confidence scores (e.g., the top twenty results with scores that are highest on a range from 0 to 100, in this example).

At box 514, the computing system provides the responsive search results for presentation. As an example, the computing system may provide, for receipt by the computing device, data (e.g., HTML data and other web resource data) that is configured to cause the computing device to display a list of search results when rendered by a web browser on the computing device. The listed search results may include at least a title and a listing of the confidence score, as described with respect to the user interfaces presented in the next figures.

At box 516, the computing system determines whether the confidence score for the top result (e.g., the result with the highest-rank) is above a threshold value. If that score is above a threshold, the top result may be presented for display in an expanded format (box 518) (e.g., with only with all other results presented in a collapsed format). If that score is below the threshold, the top result may be presented for display in a collapsed format (box 520) (e.g., with all other results presented in a collapsed format). In some implementations, all results that are above the threshold may be presented in the expanded format (e.g., in distinction to only one result being able to be expanded, as discussed above). In some implementations, should the top result fall below an even lower threshold, the system may generate a report that indicates that the query was untrustworthy. That report may be provided for review by employees that support the searching system, to evaluate whether to refine the querying system or the datasets that are queried.

Figure 6:
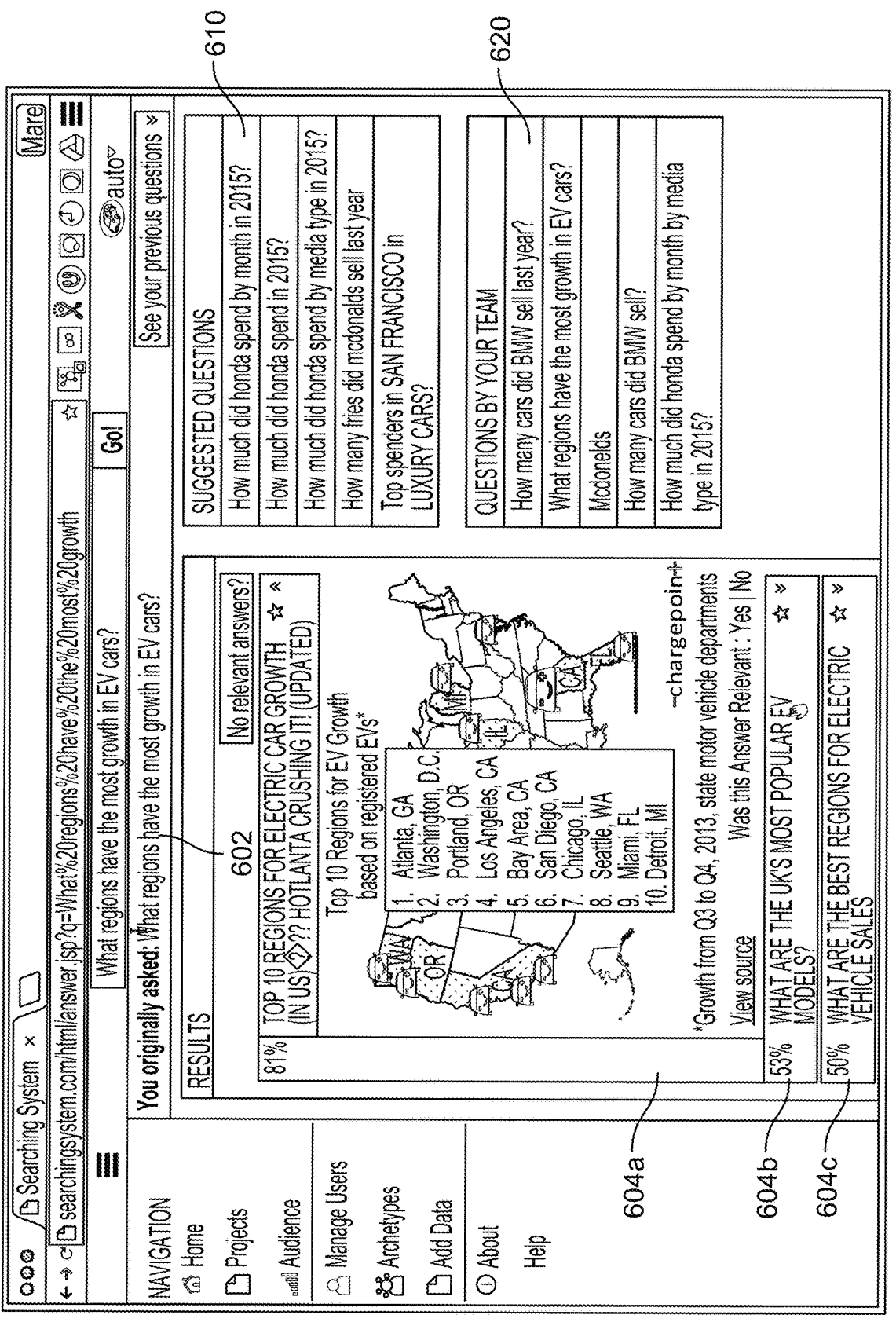
FIG. 6 shows a webpage that includes a list of results to a query of unstructured data, in which the highest-ranking result has a confidence score that exceeds a threshold and is expanded.

FIG. 6 shows a webpage that includes a list of results to a query of unstructured data, in which the highest-ranking result has a confidence score that exceeds a threshold. In this example, the user typed the query "What regions have the most growth in EV cars?" as illustrated by the header 602 and the text in the text entry box. The computing system 108 may have queried multiple datasets and returned the results 604a-c that are shown in FIG. 6. Each result includes a title (e.g., "Top 10 regions for electric car growth (in US)" and "What are the UK's most popular EV models?"), a confidence score (e.g., 81% and 53%), a user interface element to save the result (e.g., the "star" in the figures), and a user interface element to expand or collapse the result (shown to the right of the star). In this example, suppose that that the threshold for causing the top result to appear is 75%. As such, since the top result has a confidence score of 81%, the initial presentation of search results shows the top result as expanded, even though the user may not have provided input to expand the search result subsequent to submitting the query.

In this example, the expanded result is a picture that was pulled from a resource that can be viewed by selecting a "view source" link. A user can also indicate whether the result was helpful by selecting the "Yes" or "No" buttons next to the phrase "Was this Answer Relevant?" Selecting "Yes" can cause the computing system to weight the confidence score for the result higher (either generally, for the specific query, or for queries that include the same one or more entities), while selecting "No" can cause the computing system to weight the confidence score for the result lower. The user interface also includes a list of suggested questions 610 and a list of questions by the team 620 that is associated with the logged-in user. The user interface presented by FIG. 6 (and also those of FIGS. 7, 9, and 10, discussed below), can be provided by the result user interface generator 124 (FIG. 1).

Figure 7:
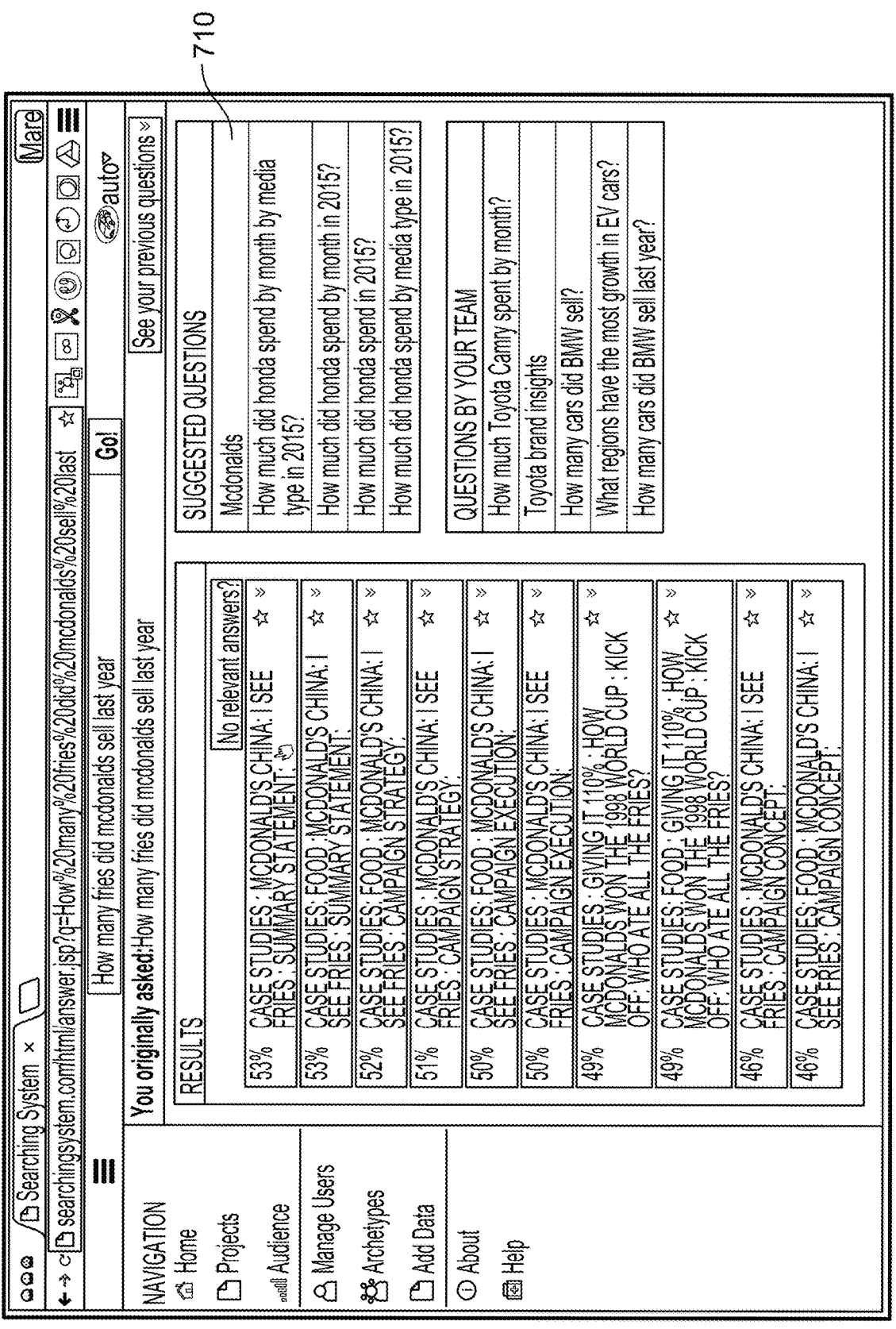
FIG. 7 shows a webpage that includes a list of results to an unstructured query, in which the highest-ranking result has a confidence score that does not exceed a threshold and is collapsed.

FIG. 7 shows a webpage that includes list of results to an unstructured query, in which the highest-ranking result has a confidence score that does not exceed a threshold. As a result, all of the results are shown in collapsed format, although a user can select the arrow-shaped user interface element at the right of each result to expand the respective result to show additional information pulled from a source of the result, similar to that shown by FIG. 6.

Figure 8:
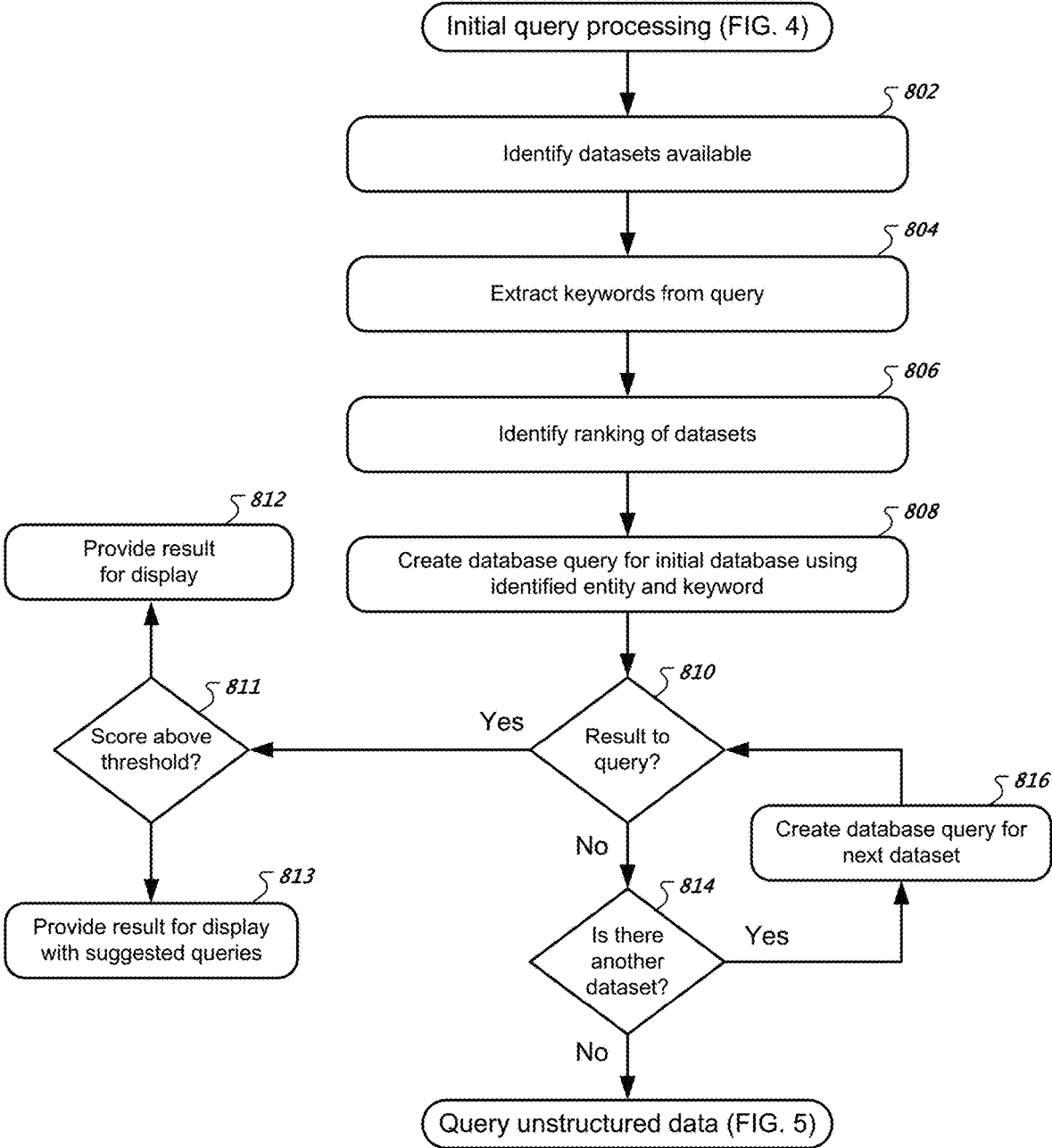
FIG. 8 shows a flowchart of actions for processing a query of structured data.

FIG. 8 shows a flowchart of actions for processing a query of structured data. These actions may be performed in response to the computing system determining that the query should be run on one or more structured datasets, as described with respect to FIG. 4.

At box 802, the computing system (e.g., the dataset selector 116) identifies a subset of datasets that are available for querying. This operation may be the same or similar to that described with respect to box 502 (FIG. 5), but the selection may be of a subset of structured datasets rather than a subset of unstructured datasets. In some examples, the subset of structured datasets is further limited to those datasets that sore information on the one or more entities identified in the query.

At box 804, the computing system extracts keywords from the query. The keyword extraction can include identifying whether the query includes keywords for various pre-designated categories. Such categories may have been defined by an administrator of the searching system and may include, for example, a date or portion thereof (e.g., "2015", "March", "Jan. 5, 2016"). Another category can be a type of media (e.g., "outdoor", "digital", or "television"). Yet another category can be a type of metric of data (e.g., "spend" or "volume").

At box 806, the computing system identifies a ranking of the datasets. For example, each of the datasets in the plurality of structured datasets 122 may be associated with a priority value. Each of the structured datasets 122 may have a different priority value, such that a ranking of the structure datasets 122 may be determined. The subset of the structured datasets that are identified as being available in box 802 may therefore also have a ranking based on the priority value of each of the selected datasets.

In some examples, the priority value and/or ranking of the structured datasets is user-specified, for example, by an administrator of an organization or group to which a user account belongs. As an illustration, a particular organization that may subscribe to a service provided by the searching system described herein may have an administrator that can configure certain aspects of the searching system for use by individuals logging into the searching system with user accounts that are affiliated with the particular organization. One of these aspects may be an administrator-specified ranking of the structured datasets.

At box 808, the computing system creates a database query for querying an initial database. The initial database may be a highest-ranked of the subset of datasets that are available for querying. The database query may be formed using the identified entity and one or more keywords. For example, for the highest-ranked dataset, the computing system may create an SQL query to access a field that specifies database members that include the identified entity and each identified keyword. An example statement may select from an (entity) table the data that is stored for a certain (date), where the (entity) and (date) values were selected from the query.

At box 810, the computing system may determine whether there is a result to the query of the dataset (for the highest-ranked structured dataset in this example). In some examples, the structured query engine 121 may execute the database query on the highest-ranked dataset 121, and determine whether the database query returns a result.

If there is a result to the query, the computing system may determine whether a confidence score of the result exceeds a threshold (box 811). If so, the computing system may provide the result for display by the computing device (box 812). If the confidence score of the result does not exceed the threshold, the computing system may provide the result for display by the computing device along with suggested alternative queries ranked in an order according to confidence scores for the suggested queries (box 813). The suggested queries may be provided in line with the provided result. In some examples, the computing system provides only a single result to a query, because the field of the database may only store a single result (and the computing system may stop querying structured datasets after it finds a result).

At box 814, in those examples in which the computing system is unable to find a result to the query in the highest-ranked structured dataset (or is able to determine from the values of the entity and the keywords that the highest-ranked database would not have a result), the computing system may determine whether there is another structured dataset available for querying from the identified subset of structured datasets.

At box 816, if there is another structured dataset available, the computing system may create a database query for a next-highest-ranked structured dataset. In some examples, the query is the same as the database query that was already executed, but is run on a different structured dataset. In some examples, the query is different, for example, because initially-queried dataset and the dataset to be newly queried have different structures (e.g., different dimensions and members).

For example, the initially-queried dataset may have had a dimension for "car type", a dimension for "year", a dimension for "state", and a dimension for "sales", and as such the system may have transformed a user query of "What were the sales for Honda Accord in Minnesota for 2012" in to a query that was configured to select data from the database members "Honda Accord", "2012", "Minnesota" and "sales." Although the initially-queried dataset was structured to store information for this value, the query was unsuccessful as previously discussed (e.g., because the relevant field was blank). The newly-queried dataset, however, may only have the database members "Honda Accord", "2012", and "sales", and therefore the computing system may create a database query that is configured to select data from the union of these members, and therefore that is different from the initially-queried dataset.

At box 810, the computing system again determines whether there is a result to the query (this time using the query that was created for the newly-queried dataset). Again, if yes, then the computing system performs the operations of box 811 (and either box 812 or 813) to provide the result for display. If not, the computing system again determines whether there is another dataset that is available for querying. If yes, the cycle continues until a result is eventually obtained or the computing system cycles through all available structured datasets. At that time, instead of returning an empty result page, the computing system may perform the operations that are described with respect to FIG. 5 to use the query to search one or more unstructured datasets. The user interfaces for querying structured datasets and for viewing the results there are described with reference to the following figures, and are generated using the result user interface generator 124 (FIG. 1).

Figure 9:
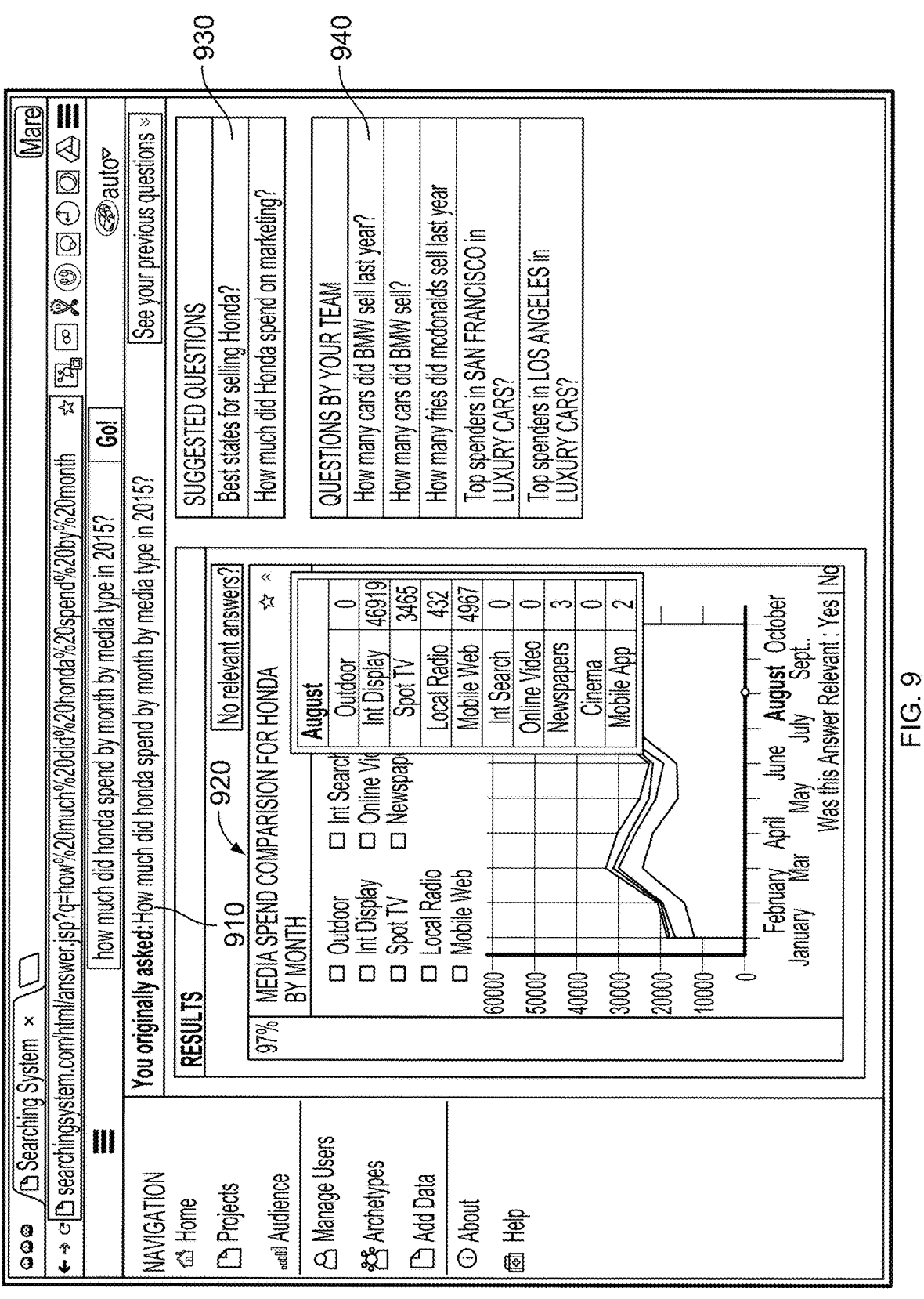
FIG. 9 shows a webpage that includes a result to a query of a structured dataset, in which the highest-ranking result has a confidence score that exceeds a threshold.

FIG. 9 shows a webpage that includes a result to a query of a structured dataset, in which the highest-ranking result has a confidence score that exceeds a threshold. In this example, in response to the query 910 that asks "how much did Honda spend by month by media type in 2015," the computing system identifies a single result 920 with a confidence score of 97%. No suggested queries are displayed inline with the result 920 because the confidence score here was above a predetermined threshold (e.g., 80%). Still, the web page displays a list of suggested questions 930 and a list of previous questions by the user's team 940 to the side of the web page.

The result 920 here includes a graph that is based on data that was specified by the structured dataset that was queried. For example, the database query may return a collection of data, such as a time-ordered series of sales values for each of 12 months in a given year for several different media types (e.g., "Outdoor" and "Int Display"). The computing system may be configured to recognize from the format of the data or from an identifier stored with the data, that this information may be displayed in a line graph, and may generate a display of a line graph (or at least may generate code for configuring the computing device 102 to present such a display). On the other hand, the computing system may not be configured to automatically generate graphs or tables from data that is retrieved from unstructured datasets. For example, the result 604a (FIG. 6) may appear in graphical format only because that item was a picture pulled from the source document. The information may not have been formed into a table or graph by the computing system, as can occur with certain structured data results.

Figure 10:
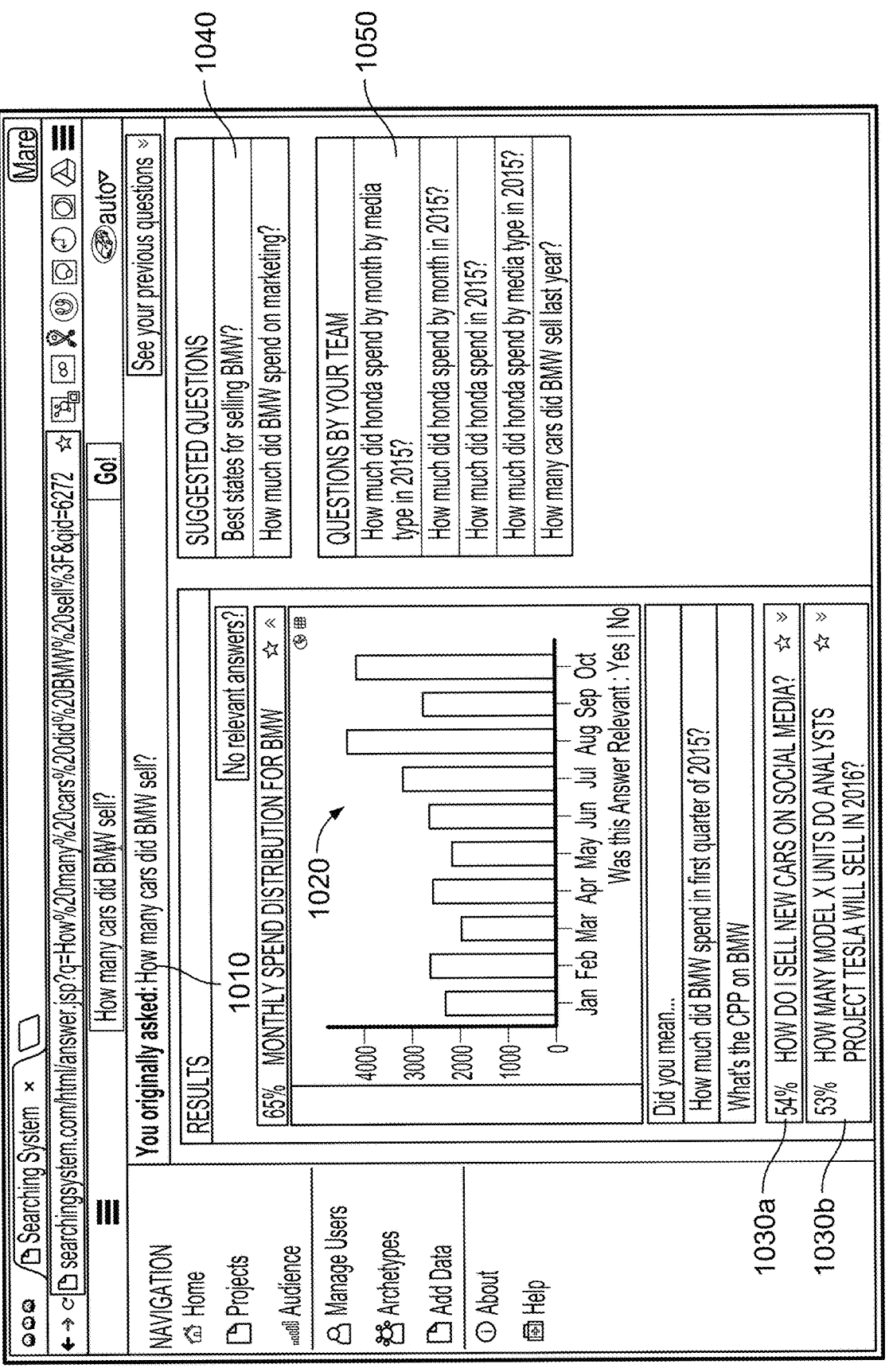
FIG. 10 shows a webpage that includes a result to a query of a structured dataset, in which the highest-ranking result has a confidence score that does not exceeds a threshold and is shown with suggested queries.

FIG. 10 shows a webpage that includes a result to a query of a structured dataset, in which the highest-ranking result has a confidence score that does not exceeds a threshold. For example, the highest-ranking result 1020 to the query 1010 only has a confidence of 65%, which may be below the confidence score threshold of 80%. With result 1020, the computing system may have transformed data values in the result into a bar chart that graphically illustrates the data values.

Because the result 1020 has a confidence score that is below the threshold, the computing system may cause the result page to present suggested questions 1030*a-b* along with the result. The computing system may also present a separate list of suggested questions 1040 and a list of questions by the user's team 1050, but those questions may not be in line with the result, may not include a confidence score for each question (and be ordered according to the confidence score), may not include an ability to "save" a question (e.g., along with its responsive single answer) by selecting a user interface element that is in the shape of a star, and may not be user-expandable by selecting the question (e.g., the text of the question or the arrows to the right of the "star" user interface element).

Figure 11:
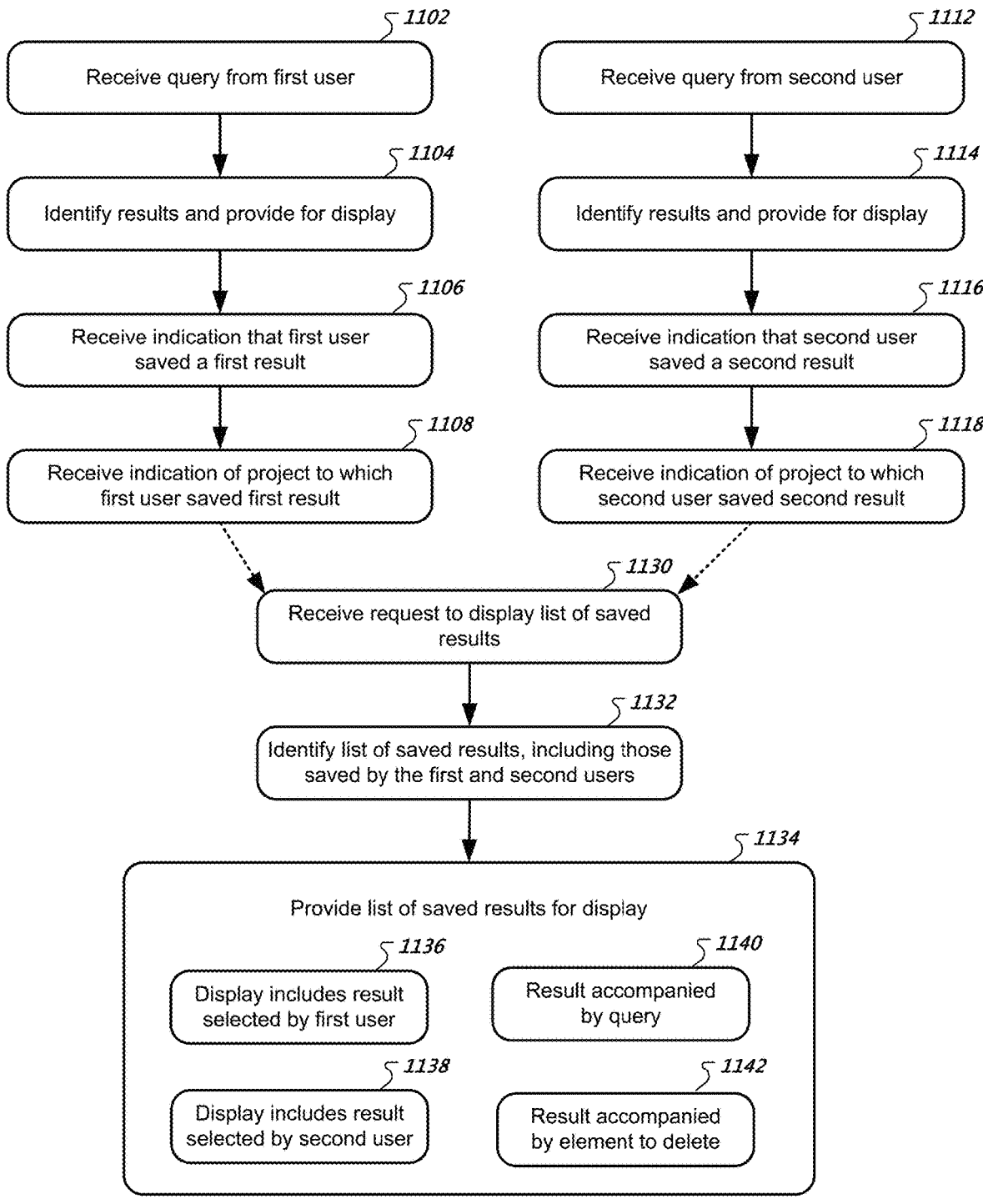
FIG. 11 shows a flowchart of a process for saving a result to a query.

FIG. 11 shows a flowchart of a process for saving a result to a query. This process may allow a user to select results from multiple different queries for later viewing through a display on a saved search results screen.

At box 1102, the computing system receives a query from a first user. For example, the computing system 108 may receive a query from a first computing 102 while that first computing device 102 is logged into a first user account for the searching system (and through user interaction with a web page that was customized for display by the first computing device 102 due to the first computing device 102 having been logged into the first user account).

At box 1104, the computing system identifies results to the query and provides results for display by the computing device 102, as described throughout this document.

At box 1106, the computing system receives an indication that the first user saved a first result. For example, the computing device 102 may display one or more results to the query, and each result may include a user interface element that a user may select with a single user input action (e.g., a single click or a single tap of the user's finger) in order to indicate that the selected search result is to be saved for later presentation. As a result of user-selection of the user interface element that indicates that the selected search result is to be saved, the computing device 102 may send a communication for receipt by the server system 108 that indicates that that a user selected to save the search result. As an illustration, a user may select the "star" user interface element that accompanies any of the search results presented in FIGS. 6, 7, 9, and 10.

At box 1108, the computing system may receive an indication of a project to which the first user saved the first result. For example, in response to a user selecting to save a result, the computing device 102 may present a dialog box that presents a list of projects (selected from project storage 130) to which a user can save the result, and may receive user input that selects one of the projects. The list of projects may include one or more projects that were created by the user (or more accurately through user input with a device while that device was logged into the user account), and can also include one or more projects that were created by other users (e.g., through input provided through use of other user accounts). A user can also provide input to create a new project (e.g., by typing a name for the new project). As a result of user input selecting an existing or new project, the computing device 102 may transmit to the computing system 108 an indication not only of the saved result, but also the project to which the result is to be saved.

Figure 12:
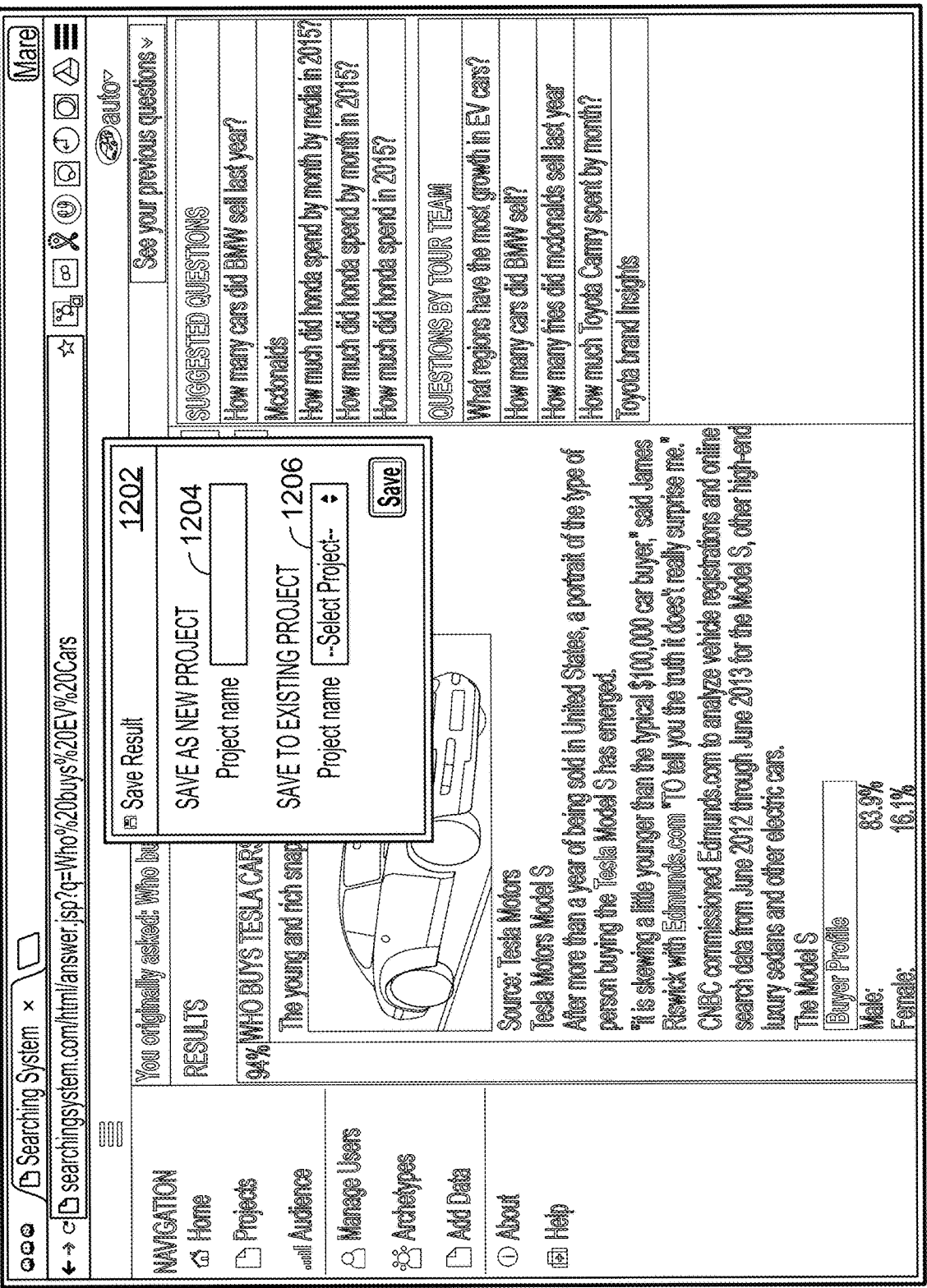
FIG. 12 shows a web page at which a user can select a project to which to save a result.

As an illustration of identifying a project, in response to a user selecting a user interface element to save a search result (e.g., a "star" user interface element), the computing device 102 may present the dialog box 1202 that is presented in FIG. 12. This dialog box may include a pull-down list 1206 to select any of multiple projects that have been created by a user of the logged-in user account (e.g., "auto" in this example), or in certain examples any project created through use of any user account associated with a same group as the logged-in user account. A user can also type a new project name into the "Project Name" text entry box 1204 and click the "Save" user interface element to save the selected search result to a new project.

In some implementations, a user may save multiple results that are presented in response to a query, for example, by selecting a user interface element that is displayed for each of the results. In some implementations, a user may save one or more results for each of multiple different queries.

At boxes 1112 through 1118, the same or similar operations can occur for a second user (e.g., for user interaction provided while a computing device is logged into a second user account).

Figure 13:
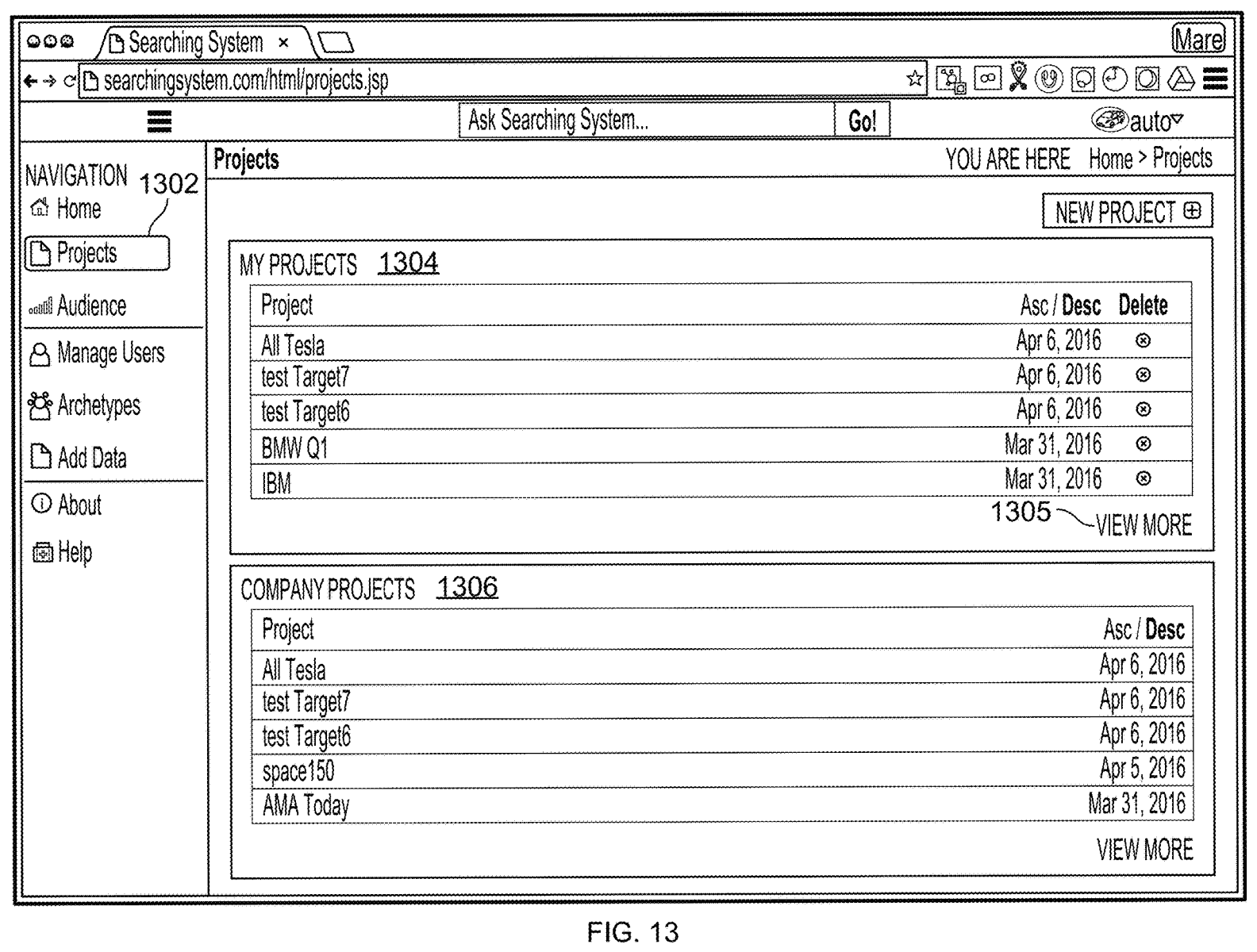

In some examples, in response to a user selection of the "Projects" user interface element 1302 in the web page side bar, the computing device 102 may display the "Projects" web page that is shown in FIG. 13. The Projects web page may include a list 1304 of "My Projects," which may show at least some of the projects that were created through use of the logged-in user account. (All such projects may be viewed by selecting a "view more" user interface element 1305.) The Projects web page may also include a list 1306 of "Company Projects" that can include all or at least some of the projects that may be created by user accounts that are affiliated or otherwise assigned to a same organization or group of accounts as the logged-in user account. These projects may be retrieved from a projects storage 130.

At box 1130, the computing system receives a request to display a list of saved results. For example, either the first user or the second user may request that a web browser navigate to a web page that displays a saved list of results. The request may occur as a result of a user selecting one of the projects that is presented by the web page in FIG. 13.

At box 1132, the computing system identifies a list of saved results. The list of saved results may include those results saved by the first user and those saved by the second user. In some examples, the list of results is those that are saved to the user-selected project, in distinction to those that are saved only to another project.

At box 1134, the computing system provides a list of saved results for display. For example, the computing system 108 may provide data (e.g., web page code) for receipt by the computing device 102, to cause the computing device 102 to render a display of the list of saved results when then web page is rendered by a web browser that is executing on the computing device 102. The displayed list can include a result that was selected by a first user (box 1136) and a result that was selected by a second user (box 1138), regardless whether the list is being displayed for presentation to an account of the first user or an account of the second user.

Figure 14A:
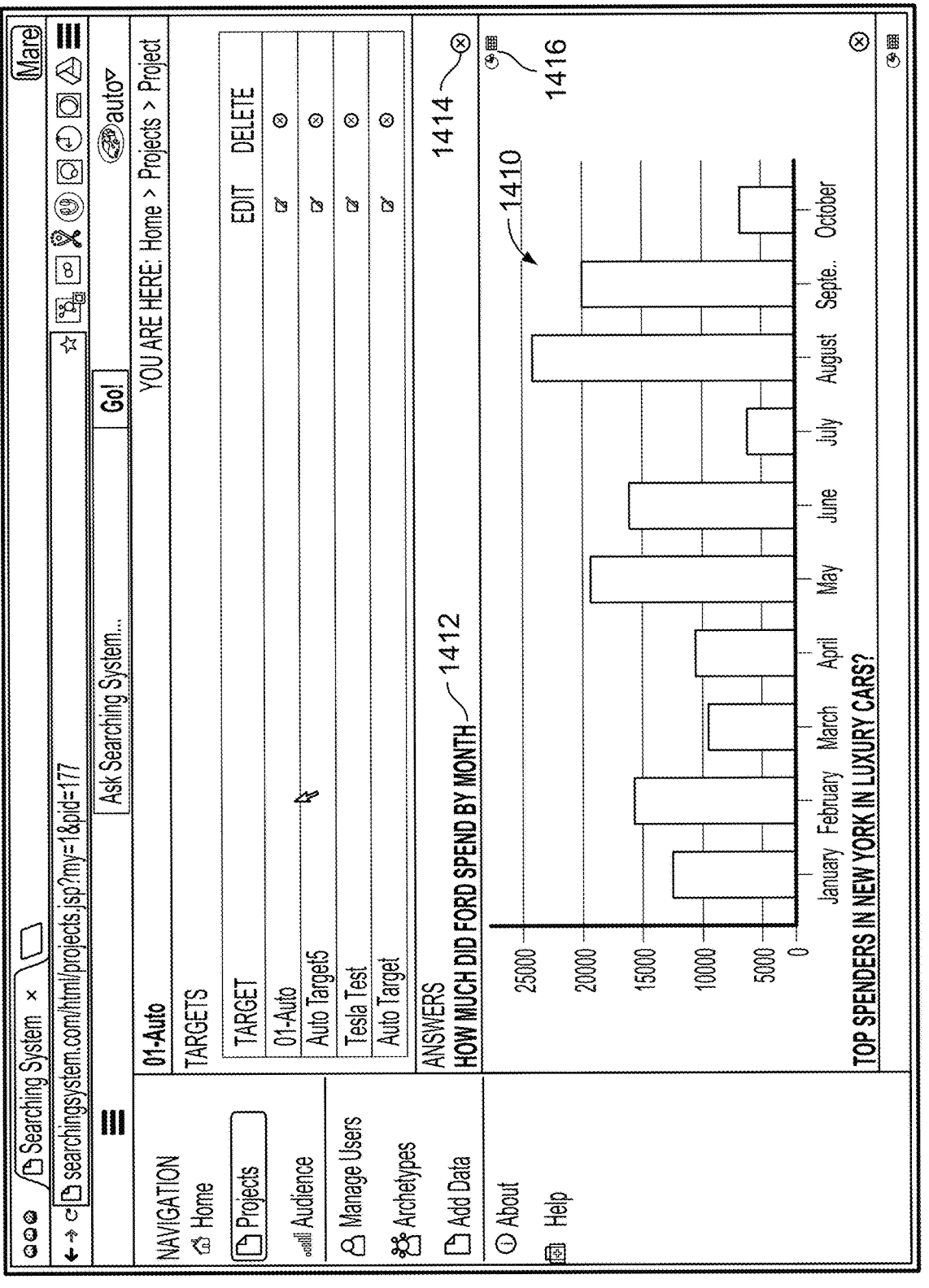
FIGS. 14A-B show a web page that presents a list of saved search results.
Figure 14B:
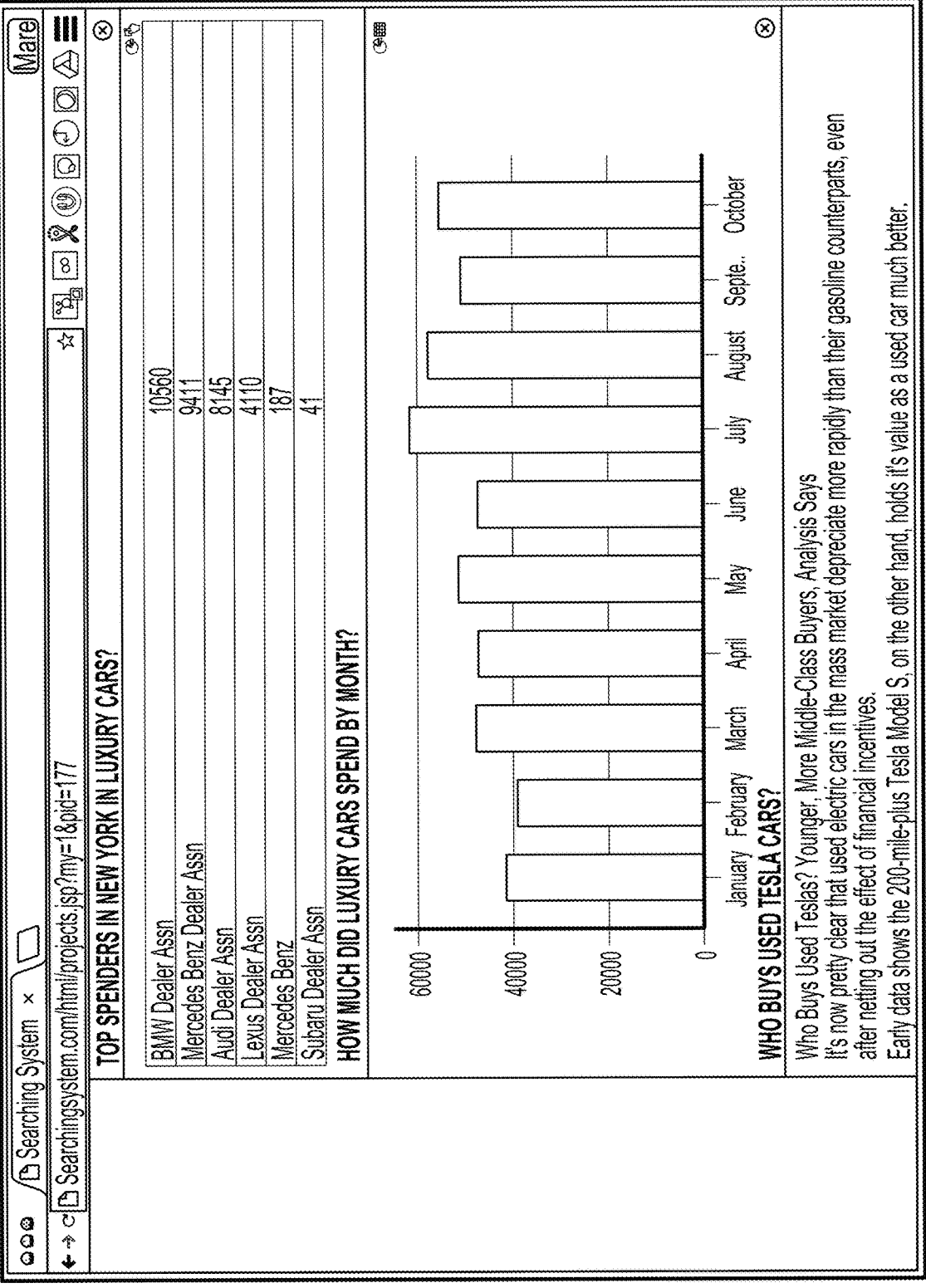

As an illustration, the presented list of saved results may appear as that shown in FIGS. 14A-B. In this example, the top result includes result content 1410, the query 1412 that was previously submitted to obtain the result content, a remove interface element 1414 that can be selected to remove the result (and the accompanying query) from the list of saved results, and user interface elements 1416 for toggling between graphical and table views for the data. Each of the results shown in FIGS. 14A-B include these elements.

At box 1140, each of the saved results that is presented for display may be accompanied by the query that a user provided in order to access the result. The query may not be pre-affiliated with the result, and thus may represent the unique combination of words that a user typed in order to retrieve the result.

At box 1142, each of the saved results may be accompanied by an element to delete the result. For example, in response to user selection of the element, the computing system may remove the selected result from the list, so that the same user, or users of other accounts, would no longer view the saved result.

Figure 15:
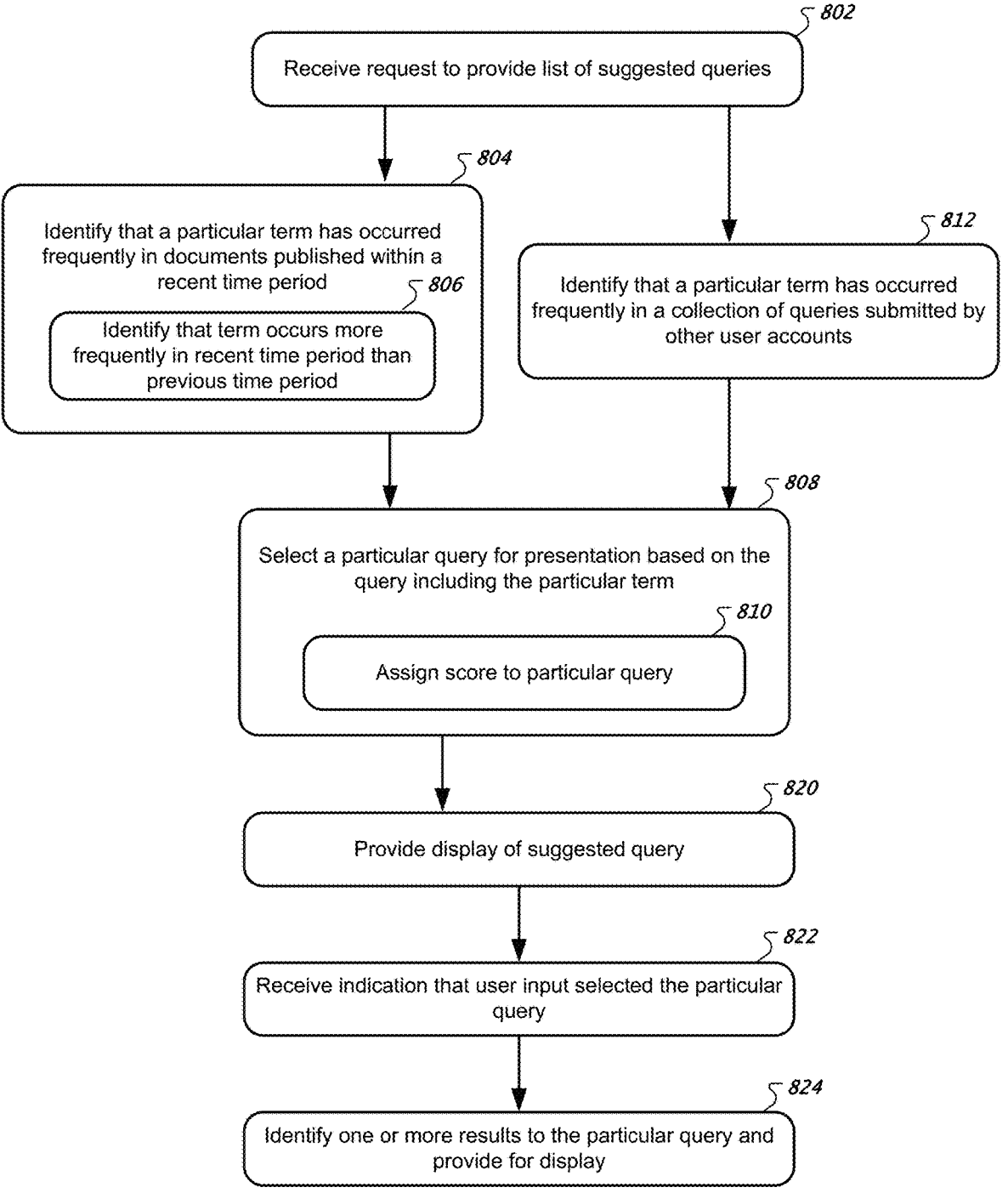
FIG. 15 shows a flowchart of a process for suggesting queries based on frequently-used terms.

FIG. 15 shows a flowchart of a process for suggesting queries based on frequently-used terms. This process may be used to generate suggested queries that appear on various user interfaces that are described throughout this disclosure and that are shown in the figures, for example, the suggested queries in lists 240 (FIG. 2A), 610 (FIG. 6), 710 (FIG. 7), 930 and 940 (FIG. 9), and 1030*a*-*b* and 1040 (FIG. 10). The selection of the suggested queries may include selecting queries that include terms that have been occurring frequently (e.g., "entities" that have occurred frequently in recently published articles, such as news articles).

At box 802, the computing system receives a request to provide a list of suggested queries. For example, a user of computing device 102 may have clicked a link on a first web page or otherwise provided user input to request navigation to a second web page. The server system may be configured to generate the second web page to include a widget that includes a list of suggested queries (e.g., lists 240, 610, 710, 930, 940, and 1040), or may include a list of suggested queries in line with the search results (e.g., suggested queries 1030*a*-*b*).

At box 804, the computing system identifies that a particular term has occurred frequently in documents published within a recent time period. In some examples these documents are news articles or other publications that were published by their author or first accessed by the searching system in a recent time period. The identification of the particular term may be an identification that the particular term occurs more frequently than other terms (e.g., it is one of the N most popular terms in the time period and is designated as a frequently-occurring term for that reason). The terms for which frequency data is calculated may be the "entities" discussed elsewhere in this document (e.g., proper nouns that are recognized by the searching system). In some examples, the recent time period is a most-recent period of time for which the computing system stores the news articles or publications (e.g., from the current moment, going back 1, 5, 10, or 30 days).

In some examples, the identification that the term occurs more frequently in the recent time period is an identification that the term occurs more frequently in the recent time period than in a previous time period (box 806). In other words, the word may be "trending" or becoming more popular. In these examples, the frequency data for the recent time period may be compared to the frequency data for a previous time period to determine whether the frequency of usage has increased. As stated above, the recent time period may extend from a current moment back a number of days (e.g., 10 days), while the previous time period may extend from that number of days (e.g., once again 10 days) back more days (e.g., back another 10, 30, or 100 days, or through the remainder of the data). In some examples, the computing system does not look at usage based on discrete time periods, and uses various formulas to generally detect whether the word usage is increasing over time.

At box 808, the computing system selects a particular query for presentation based on the query including the particular term. For example, the computing system may select the particular query for presentation in a list of suggested queries. In some examples, the computing system may determine those terms that are occurring most-frequently in the published documents, and identify previously-submitted queries that include those terms. The selection may include assigning a score to a particular query (box 810) or adjusting a score of the particular query based on the particular query including a frequently-occurring term. Queries that are candidates for selection but that do not include a frequently-occurring term may not see their scores affected at all, or in the same manner.

At box 820, the computing system provides a display of the suggested query. The display may include displaying the suggested query along with a collection of other suggested queries, for example, as shown in lists 240 (FIG. 2A), 610 (FIG. 6), 710 (FIG. 7), 930 and 940 (FIG. 9), and 1030*a*-*b* and 1040 (FIG. 10). The queries in the lists may be selected based on scores that are calculated using various metrics, and the presence of a frequently-occurring term in the query may be one of the metrics. Other metrics may include how frequently a query is submitted, how relevant the query is to recent queries by the same user, etc.

At box 822, the computing system receives an indication that user input selected the particular query. For example, a user may have clicked on the particular query using a mouse, or pressed a location of a touchscreen at which the particular query was displayed.

At box 824, the computing system identifies one or more results to the particular query and provides the one or more results for display. For example, the computing system may either expand the query to display a result to the query in the same display, or may navigate to a different web page and present one or more results to the query, just as if a user had typed the same query into a query input text box.

In some implementations, the computing system selects a query based on similar frequency of usage data, but instead of the word frequency data being drawn from recent articles and documents (e.g., newspaper articles or published web articles), the word frequency data is drawn from recent queries that were submitted by other users. For example, at box 812, the computing system may identify that a particular term has occurred frequently in a collection of queries submitted by other user accounts, where these other user accounts may be accounts of that are assigned to a same organization or group. The analysis of the particular term may be the same or similar to that described above with respect to boxes 804 and 806, and may identify which word or words occur frequently in recent data or that have been trending and increasing in popularity.

At box 814, the computing system selects a particular query for presentation based on the query including the particular term.

FIG. 16 shows a flowchart of a process for identifying a publication that is relevant to a subset of social network users. This process allows a user to identify which one or more publications may provide the best match for a particular user-defined group of individuals, where the group of individuals is identified using a search of social network data. This process is illustrated with reference to the web pages that are shown in FIGS. 17-29.

Figure 17:
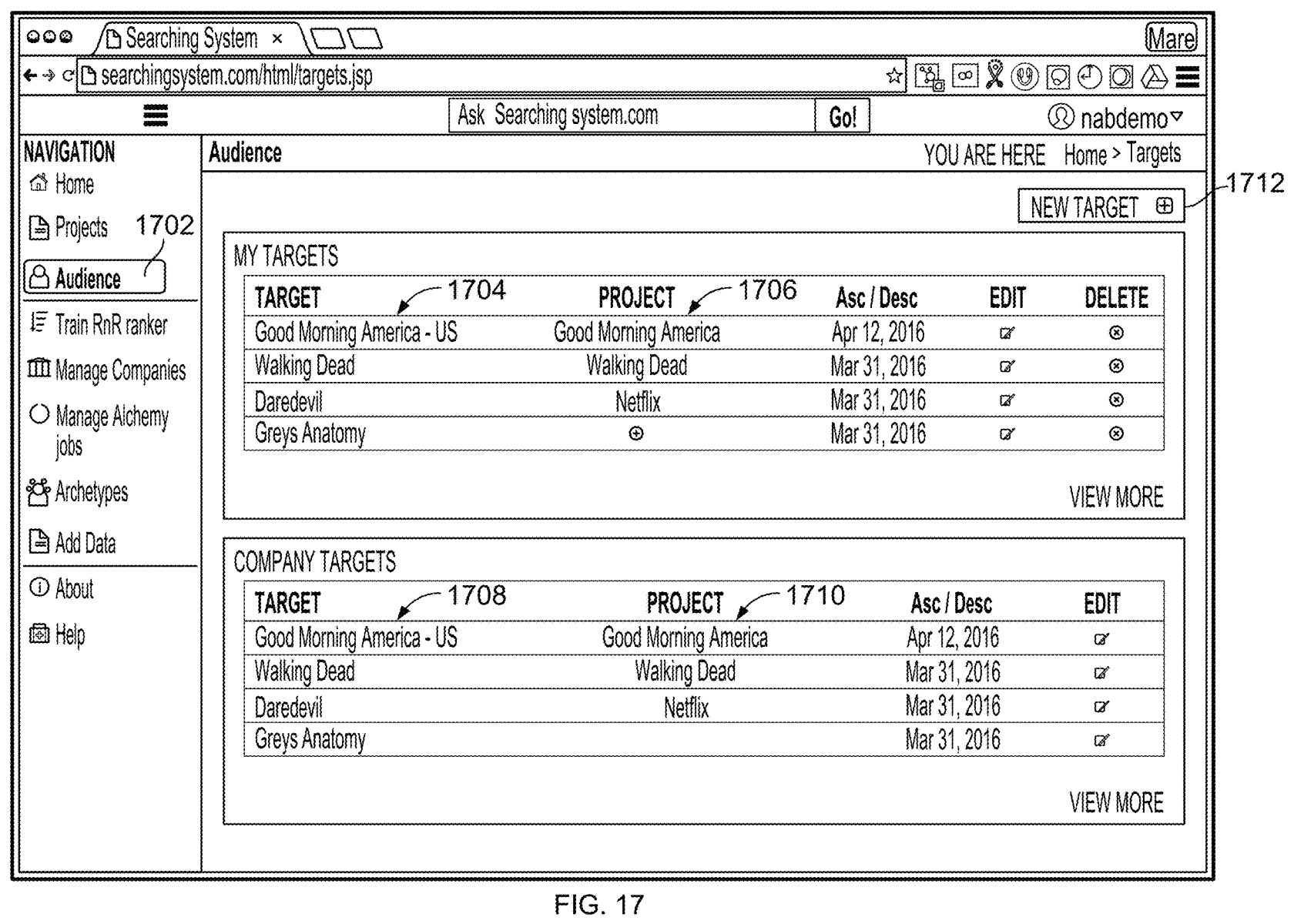

At box 1602, the computing system receives a query. The query may be entered after a user specifies that the user would like to create a new target (e.g., specify a new query). For example, the computing device 102 may present the web page that is shown in FIG. 17 after a user selects the "Audience" user interface element 1702 in the sidebar of a previous web page. The Audience web page may list multiple user-selectable targets 1704 that the user previously created, along with indications 1706 of the projects to which the user previously assigned those projects. The Audience web page may also list multiple user-selectable targets 1708 that were created using other users accounts from the same organization or group, along with indications 1710 of the projects to which those targets are assigned. To create a new target, a user may select the "New Target" user interface element 1712. The computing system may store the existing and newly-defined targets in the target dataset 128.

Figure 18:
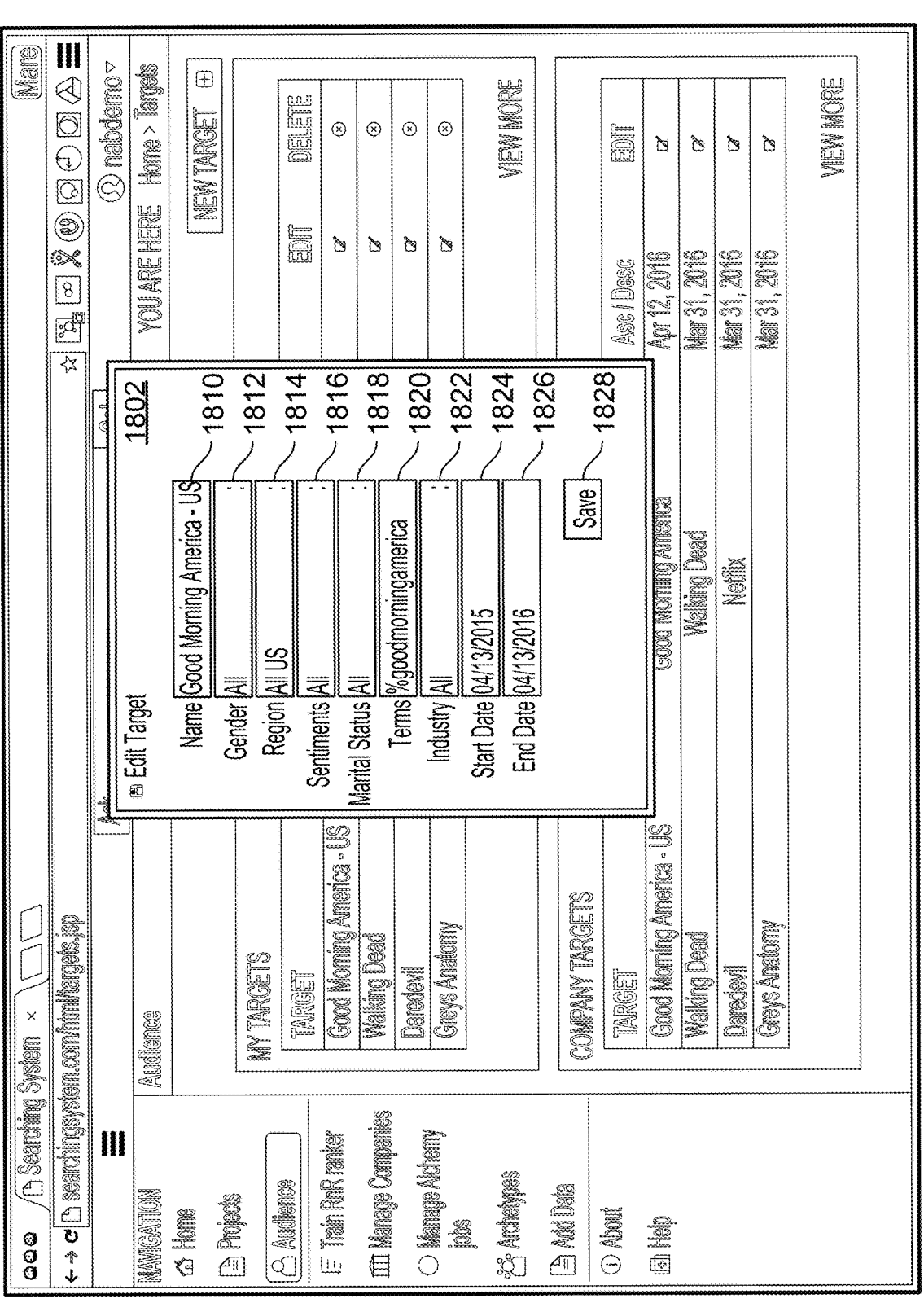
FIG. 18 shows a web page for specifying or editing a new target.

In response to selection of the "New Target" user interface element 1712, the computing device may present the web page that is shown in FIG. 18, which may include dialog box 1802. This dialog box may include various options for specifying characteristics of the target. In effect these are characteristics of a query to be run on data that was generated by various users (e.g., a query of posts generated by users of one or more social networks). The characteristics that the user can specify include a gender 1812 of an individual, a geographic region 1814 (e.g., a state) of an individual, a sentiment 1816 of an individual, a marital status 1818 of an individual, a term 1820 specified in posts by the individual (e.g., #goodmorningamerica), an industry 1822 within which the individual works, a start date 1824 of posts to search, and an end date 1826 of the posts to search.

Using these user interface elements, an individual can specify characteristics of a search of social network posts (box 1604). For example, in this illustration a user has specified to search for posts by all genders, in all portions of the US, with all sentiments, all martial statuses, in all industries, where those posts included the term #goodmorningamerica, and were submitted or published between Apr. 13, 2015 and Apr. 13, 2016. This collection of criteria (or the collection of results that would appear in response to a search using the criteria) may be termed a "target" and a user can specify a name for the target using text entry box 1810 (here "Good Morning America—US). In response to the user selecting the "Save" element 1828 (or selecting a link to the target on the web page), the computing device 102 sends an indication to the computing system 108 to run a query on the characteristics specified in the query.

At box 1606, the computing system requests that a search be performed to identify social network messages that satisfy the query. For example, the computing system 108 may request that the target identifier 126 perform the identification of social network messages, or may request that an external entity identify such social network messages.

At box 1608, the computing system requests an analysis of the identified social network messages in order to identify an aggregate profile. For example, the target identifier 126 may request that an external system analyze a content of the identified social network messages (e.g., the word usage of the social network messages) and determine values for various personality characteristics, such as "openness," "extraversion," and "curiosity." The determined values may be for an aggregate profile, for example, an analysis that attempts to identify the overall "personality" of that group.

In response to requesting the analysis, the computing system may receive information that identifies the personality characteristics of the aggregate profile, and may provide for display by the computing device 102 a web page that presents the personality characteristics. For example, FIG. 19 shows a web page that indicates values for these personality characteristics in a target group profile section 1902. This web page (along with those shown in FIGS. 17-19 and 22-29) may be generated by the Audience User Interface Generator 132. Each characteristics includes a corresponding line with a dot on it, where placement of the dot to the right on the line indicates a high level of that particular characteristic, and placement of the dot to the left indicates a low level of that particular characteristic.

The web page also includes a Target Archetypes section 1904. This section indicates what percentage of the target users are classified as being of a particular archetype (e.g., a particular personality type). As such, the computing system may have identified not just the personality characteristics for an aggregate profile, but may have also done so for each author of that makes up the aggregate profile. The determination regarding whether a particular author falls under a particular archetype can include identifying whether the determined personality characteristics for that author fall within ranges that are specified for the archetype. Should a user select an archetype (here "The Regel" archetype was selected), the computing system may display information 1906 on that selected archetype.

Figure 20:
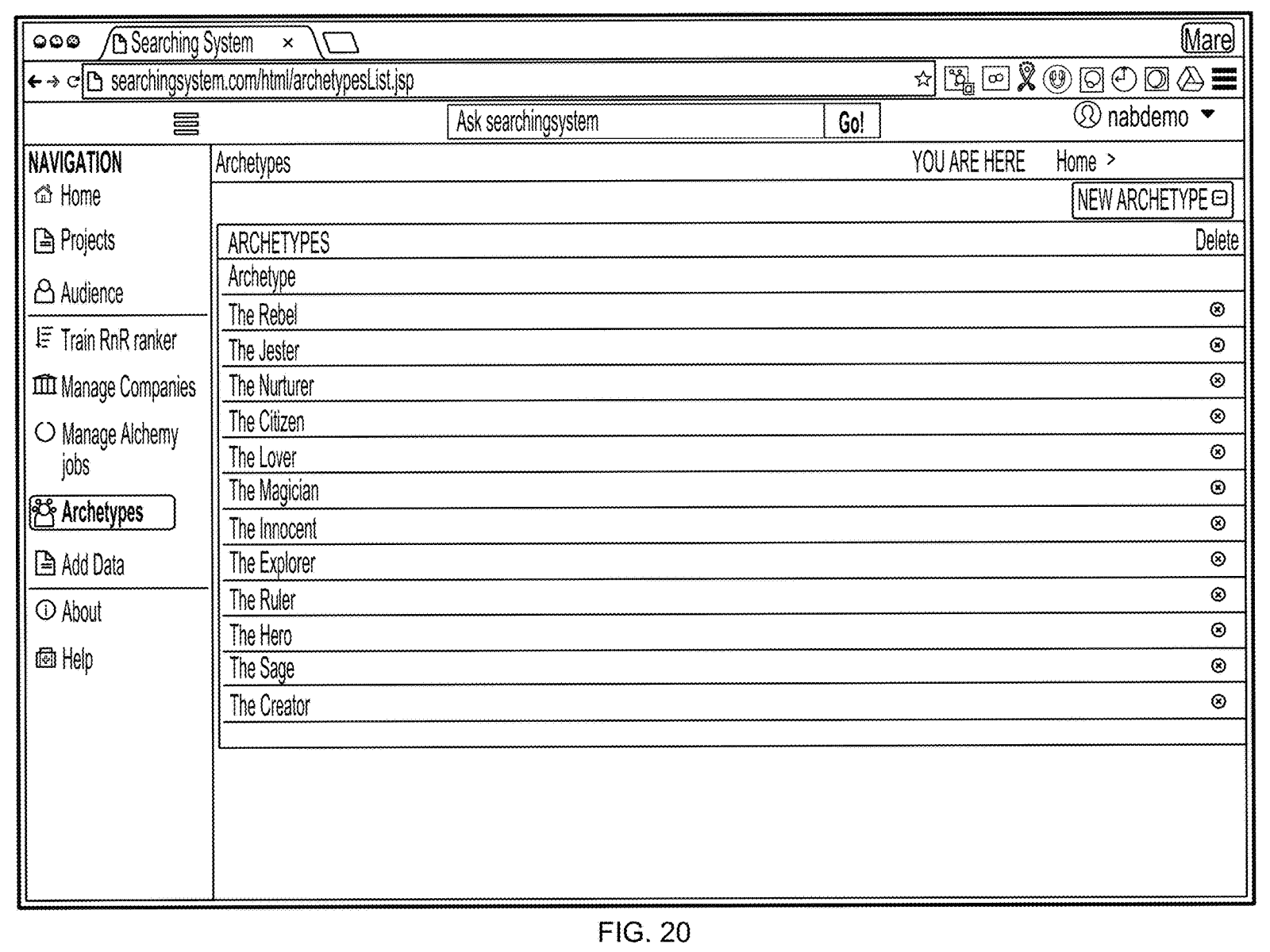

FIG. 20 shows a web page at which a user can select an archetype. A user can navigate to this web page by selecting the "Archetypes" element in the sidebar on the left of most web pages in the searching website. This list of archetypes may be stored in the Archetype Storage 131.

Figure 21:
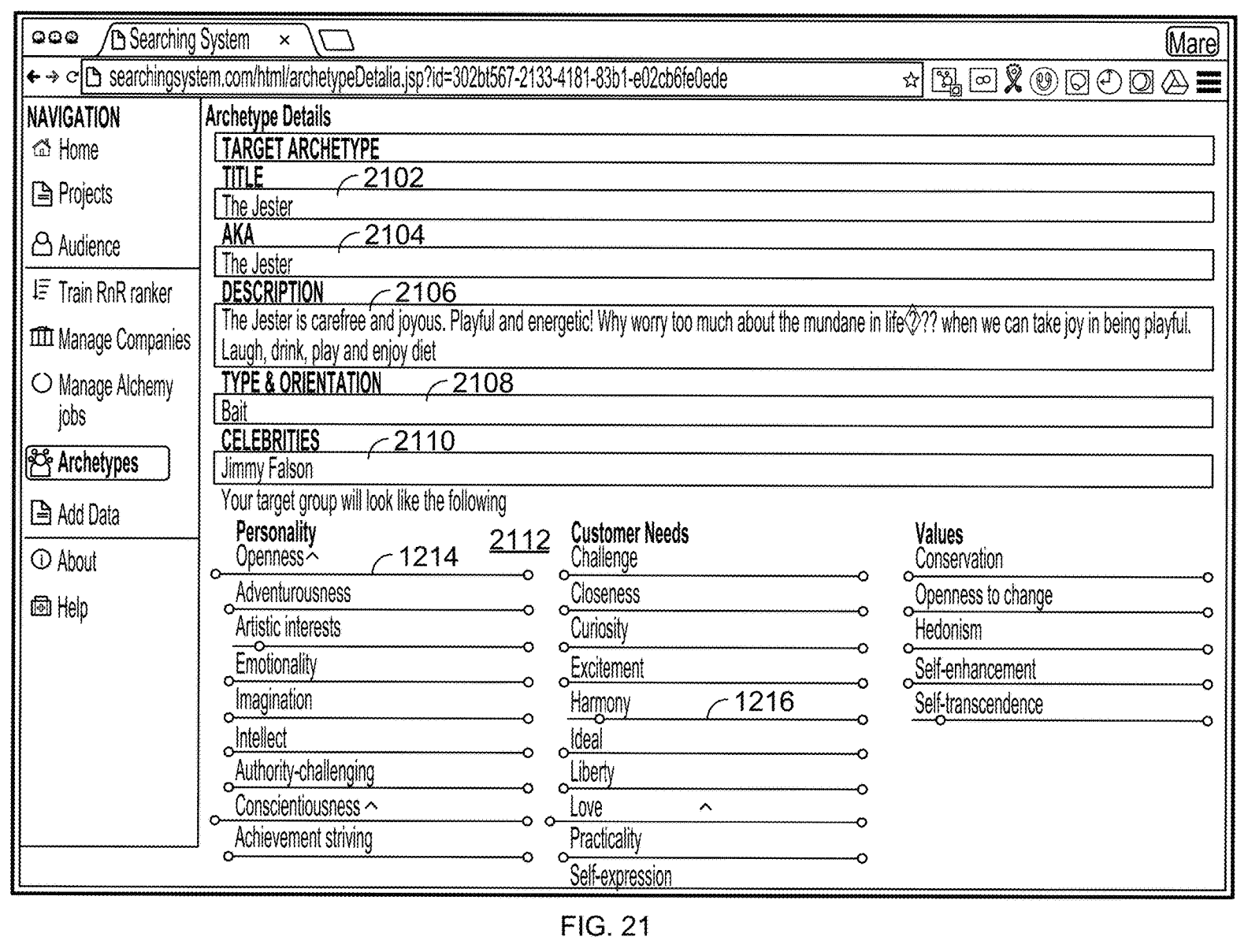

FIG. 21 shows a web page at which a user can specify characteristics for an archetype that the user selected using the web page of FIG. 20. At this web page, the user can specify the title 2102 of the archetype, an also-known-as name 2104 for the archetype, a description 2106 of the archetype, a type & orientation 2108 of the archetype, and a list of zero or more celebrities 2110 that have the archetype. The user can also specify ranges 2112 within which characteristics of social network users must fall in order to qualify as having the archetype. Suppose that the ranges span from 0 to 100. In this example, the "Openness" personality characteristic 1214 is set to accept an entire range, and thus no individual would be disqualified from having the "Jester" archetype based on their openness score. On the other hand, the "Harmony" personality characteristic does not span the entire range, because the lower interface element is moved roughly 10% up the span. As such, let's assume that this means that the range spans from 10 to 100. Thus, a user with an openness score of 9 or lower would not qualify for the Jester archetype. An individual may have to satisfy all characteristics (e.g., their score may have to fall within all ranges specified in the Archetype Details page) in order for the computing system to consider that individual as satisfying the archetype.

Figure 22:
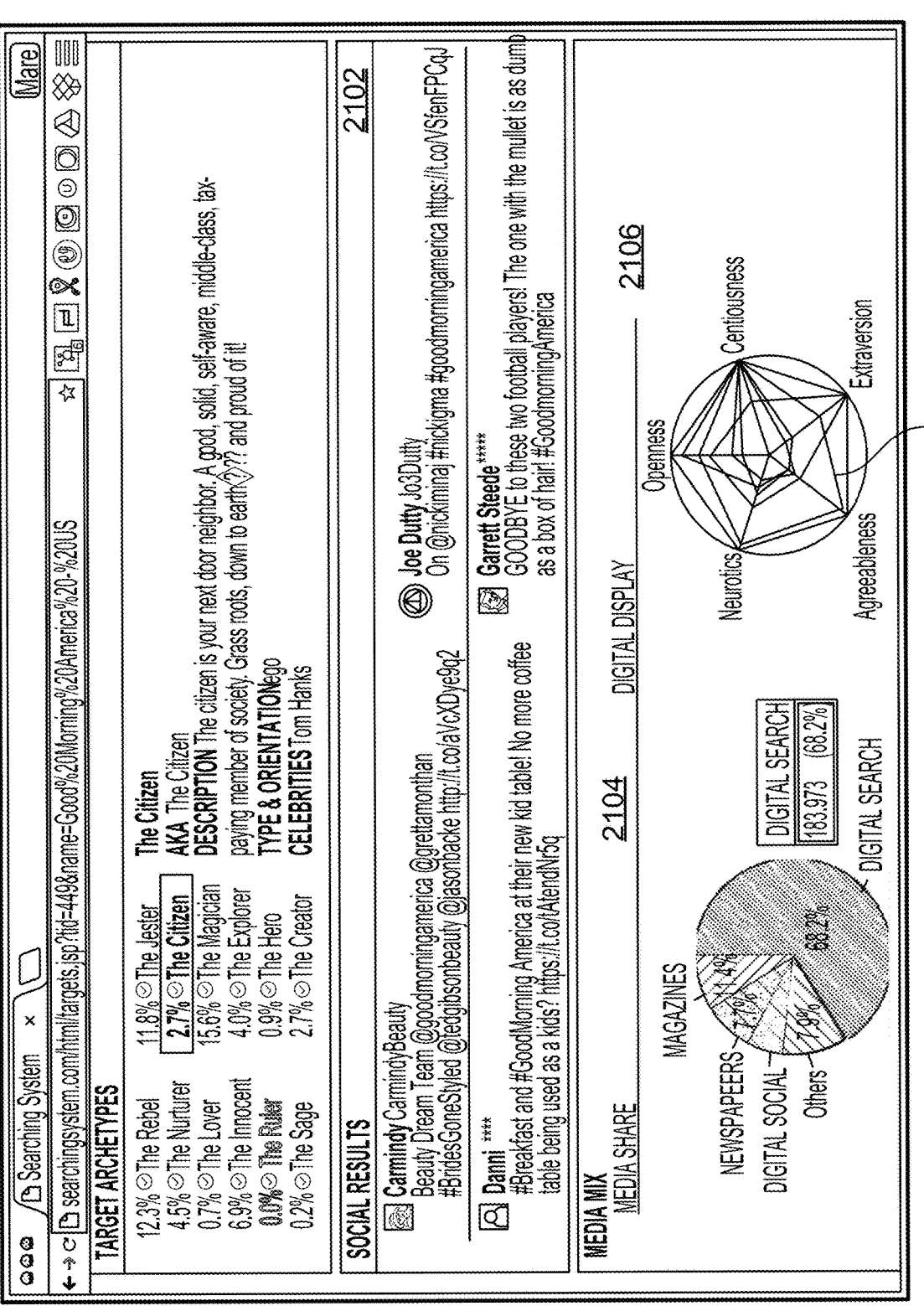
FIG. 22 shows another example of the web page that was shown in FIG. 19, but for a different target and scrolled to the bottom of the page.

FIG. 22 shows another example of the "Dashboard" web page that was shown in FIG. 19, but for a different target and scrolled to the bottom of the page. The "Social Results" section 2102 lists some social network posts that were authored by individuals that satisfied the selected archetype (here "The Citizen" archetype). The media share pie graph 2014 show multiple type of media (e.g., multiple distribution channels), such as magazines, newspapers, digital social, and digital search. The types of media and the distribution may be specified by an administrator of the organization for which the user account belongs (e.g., based on how the company desires to advertise among different types of media).

In box 1610, the computing system receives an indication that user input specified a publication from among multiple types of publications. For example, each of the types of media in the pie graph may be user selectable (e.g., by clicking on a wedge in the pie graph or selecting a name of a media type next to the pie graph).

At box 1612, the computing system identifies a publication profile for a publication of the first type of publication. For example, the computing system may have previously analyzed the content of publications by different publishers of the type of publication (e.g., the content of articles by different newspapers companies of a newspapers type of publication). Using this analysis, the computing system may determine personality characteristics of each publisher (e.g., an "Openness" and "Agreeableness" value for each publisher).

At box 1614, the computing system determines an alignment between the aggregate profile (e.g., the target) and the publication profile. For example, the computing system may determine a difference between an "Openness" value for each of the target and for a particular newspaper, and may determine a percentage difference for the two items (e.g., the values may be 80% aligned if the openness value is 80 for the newspaper but is 64 (80*0.8) or 100 (80/0.8) for the target). The computing system may determine this difference and alignment for multiple characteristics for each of multiple different publications.

At box 1616, the computing system may provide a display that illustrates the alignment. For example, the computing system may provide information for receipt by the computing device 102 that causes the computing device 102 to display the radar map 2106 that is illustrated in FIG. 22. That map illustrates, for each of five publications, an alignment for each of five characteristics. A 100% alignment is represented by the pentagon shape (which represents a particular publication) touching the circle at a corner of the pentagon, while a lower alignment is represented by the pentagon shape having a corner near the center. In this example, the shape 2108 with the largest area has a strong agreeableness alignment (lower-left), but a not-as-strong extraversion alignment (lower-right).

Figure 23:
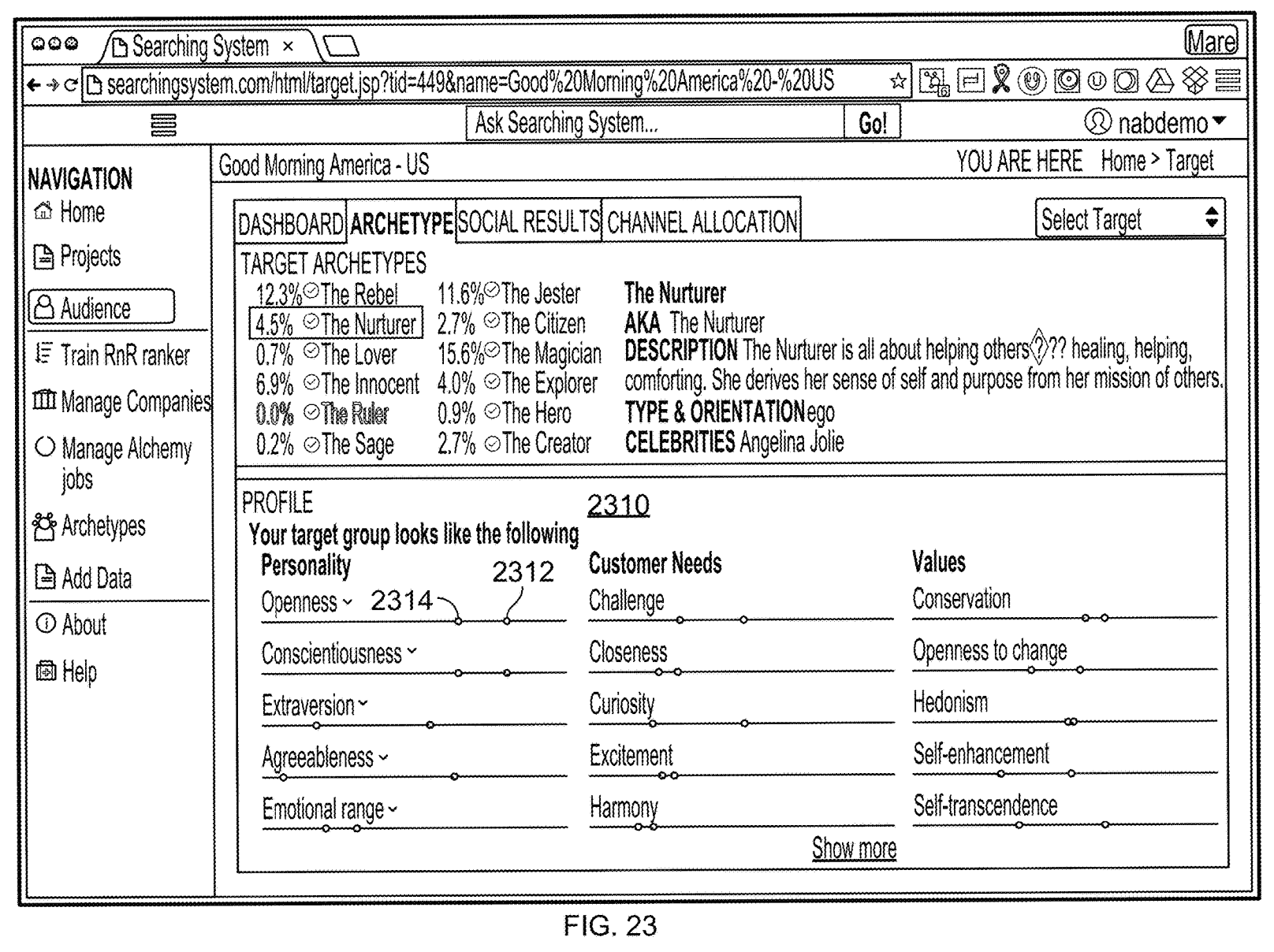

FIG. 23 shows an Archetype tab for the Audience portion of the web page. This web page lists the various target archetypes, just like in the Dashboard tab, but the profile portion 2310 of the web page shows not just a graphical element that identifies a value of the target for each personality characteristic, but also a value of an aggregation of all those that satisfy the archetype criteria for a selected archetype. For example, a green user interface element 2312 identifies an openness value of the aggregate profile for the target, while a blue user interface element 2314 identifies an openness value of the aggregate profile for the subset of individuals in the target that satisfy the selected archetype (which happens to be "The Nurturer" in this example).

Figure 24:
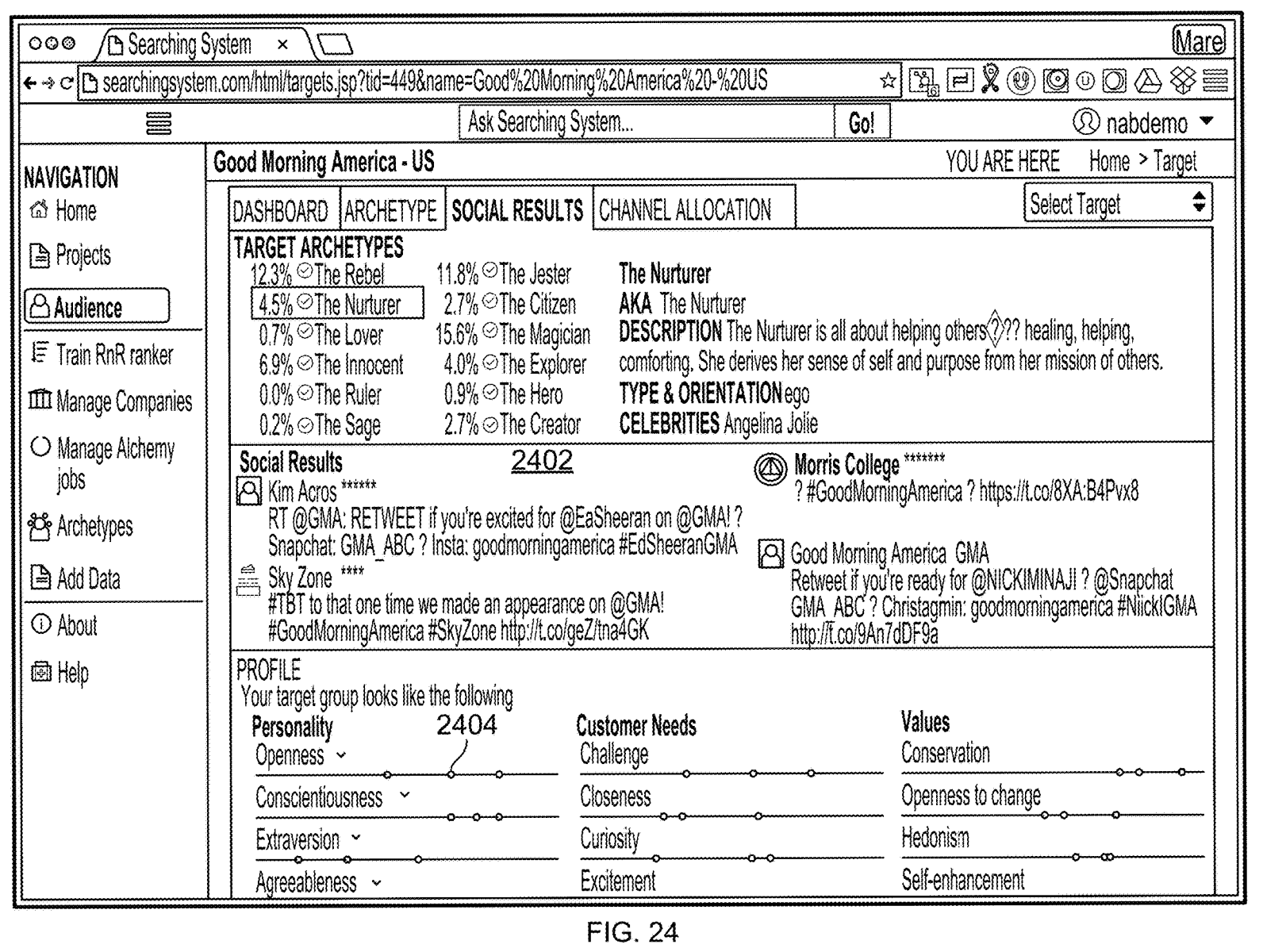

FIG. 24 shows a Social Results tab for the Audience portion of the web page. In this page, a user can select an archetype, and view example social results 2402 for that archetype (e.g., social network posts by individuals in the Target that satisfy the archetype). The profile portion of the web page also includes, in addition to a user interface element for the target and for the archetype (as discussed with reference to FIG. 23) a gray user interface element 2404 for a particular user that authored a selected one of the social media posts.

Figure 25:
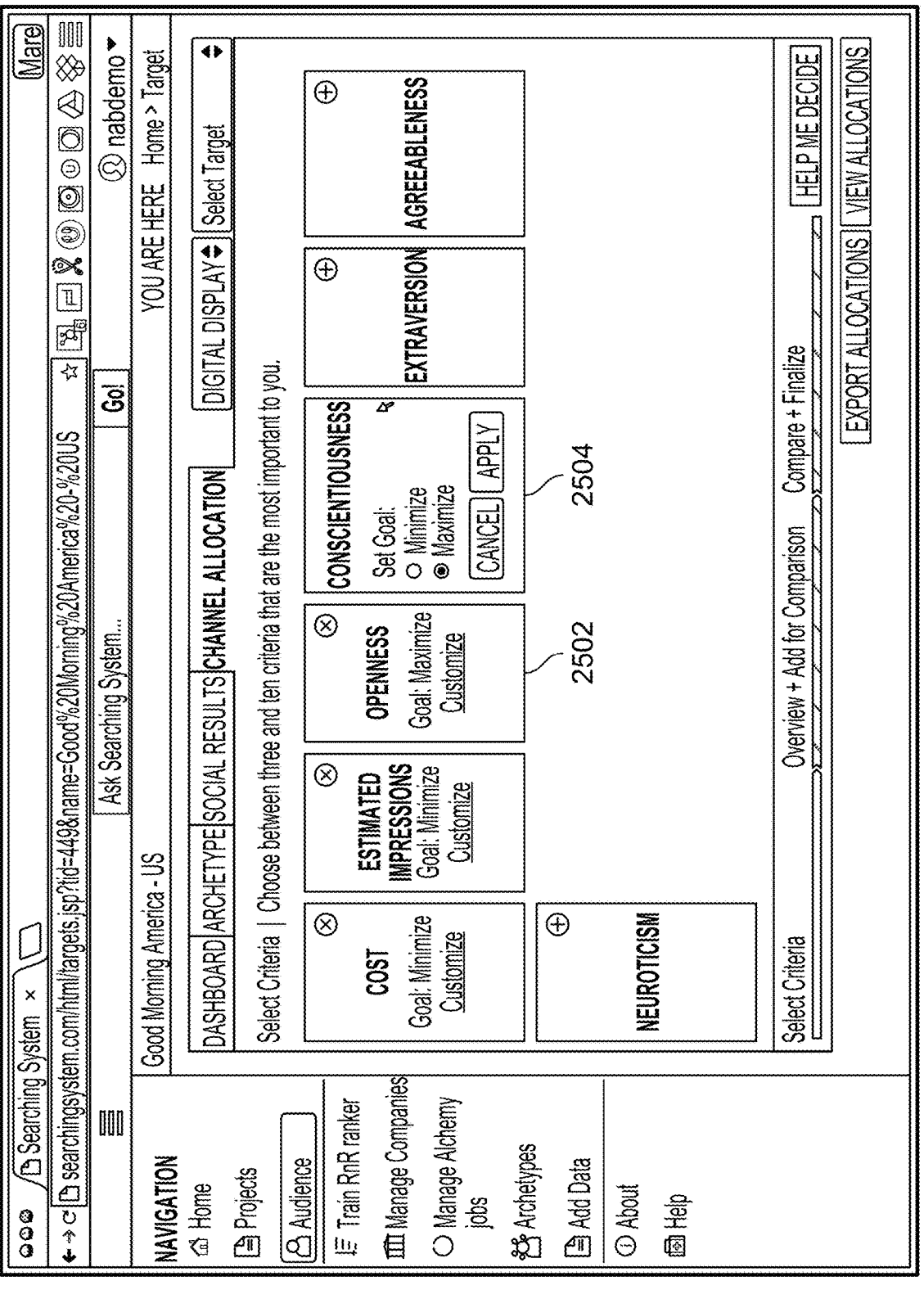
FIG. 25 shows a Channel Allocation tab for the Audience portion of the web page.

FIG. 25 shows a Channel Allocation tab for the Audience portion of the web page. In this page, a user is able to select one or more criteria, for example, by clicking on user interface elements for each criterion. In this illustration, a user has selected the "Openness" user interface element 2502 (causing it to become shaded). Upon selection, a user can select whether to set a goal to minimize or maximize that criteria, as shown by the options presented within the "Conscientiousness" user interface element 2504. In this illustration, the user has not selected the extraversion, agreeableness, and neuroticism user interface elements.

Figure 26:
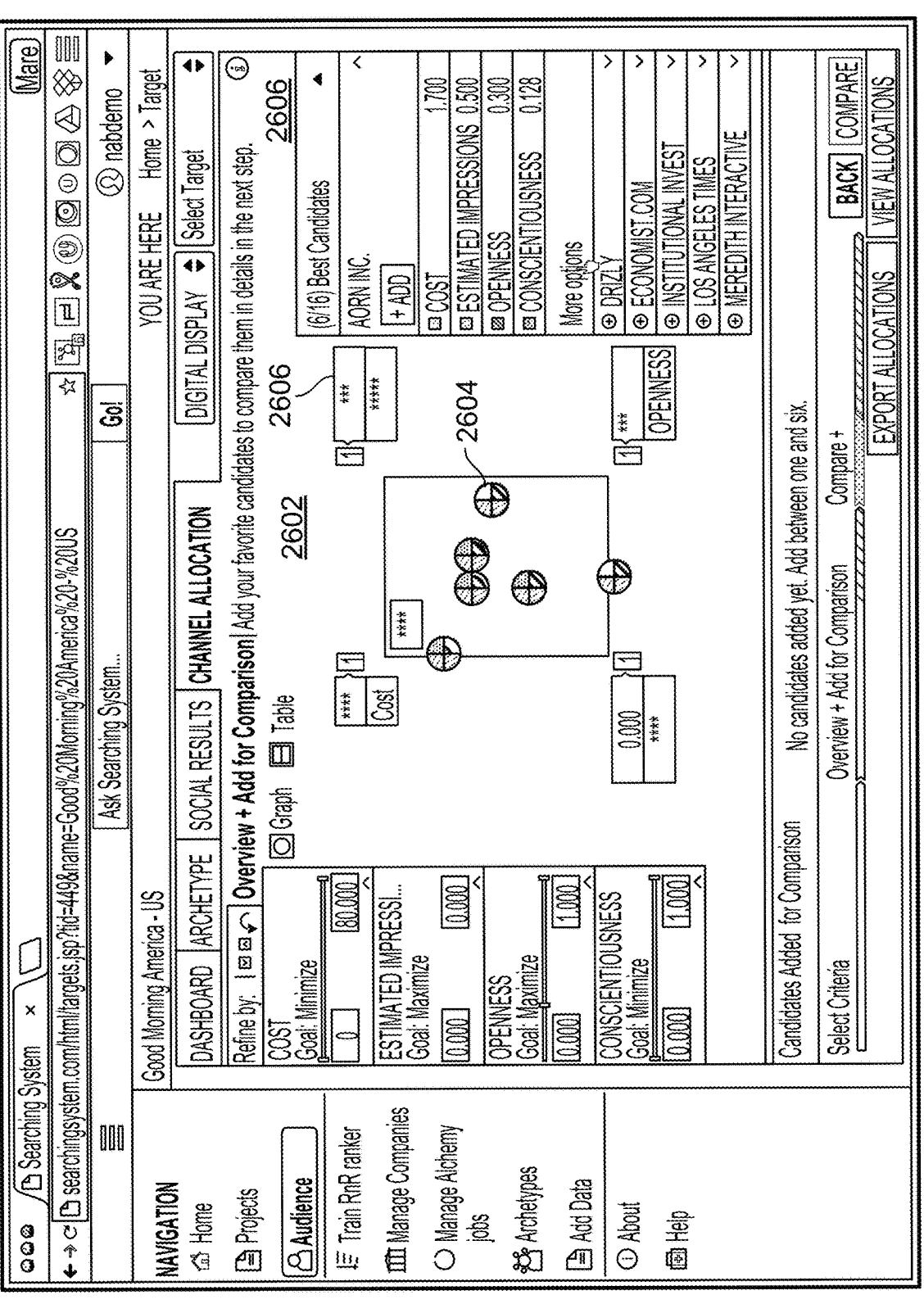
FIG. 26 shows a graphical illustration of multiple user interface elements that represent various publications, arranged in the graphical illustration with respect to various criteria.

FIG. 26 shows a graphical illustration 2602 of multiple user interface elements that represent various publications (here the circles, e.g., circle 2604), arranged in the graphical illustration a various distance from various criteria (here the rectangles in the corners, e.g., rectangle 2606). The criteria may be those selected in the previous web page (FIG. 25), while the publications may be those shown in the radar map (item 2106 in FIG. 22). In this example, if the alignment values for all characteristics/criteria for a particular publication are the same (whether those alignment values may all be low or all high), the circular user interface element for that publication would appear centered between the rectangular user interface elements for the various criteria. A user can view the values for each of the selected circles (e.g., the selected publication) in the bar 2606 to the right of the web page.

FIG. 27 shows the web page that is presented when a user selects the Table user interface element 2702. The table presents the values for each of the metrics. Openness and Conscientiousness values are the alignment values, while cost and estimated impressions may be independent of alignment to the candidate publications.

Figure 28:
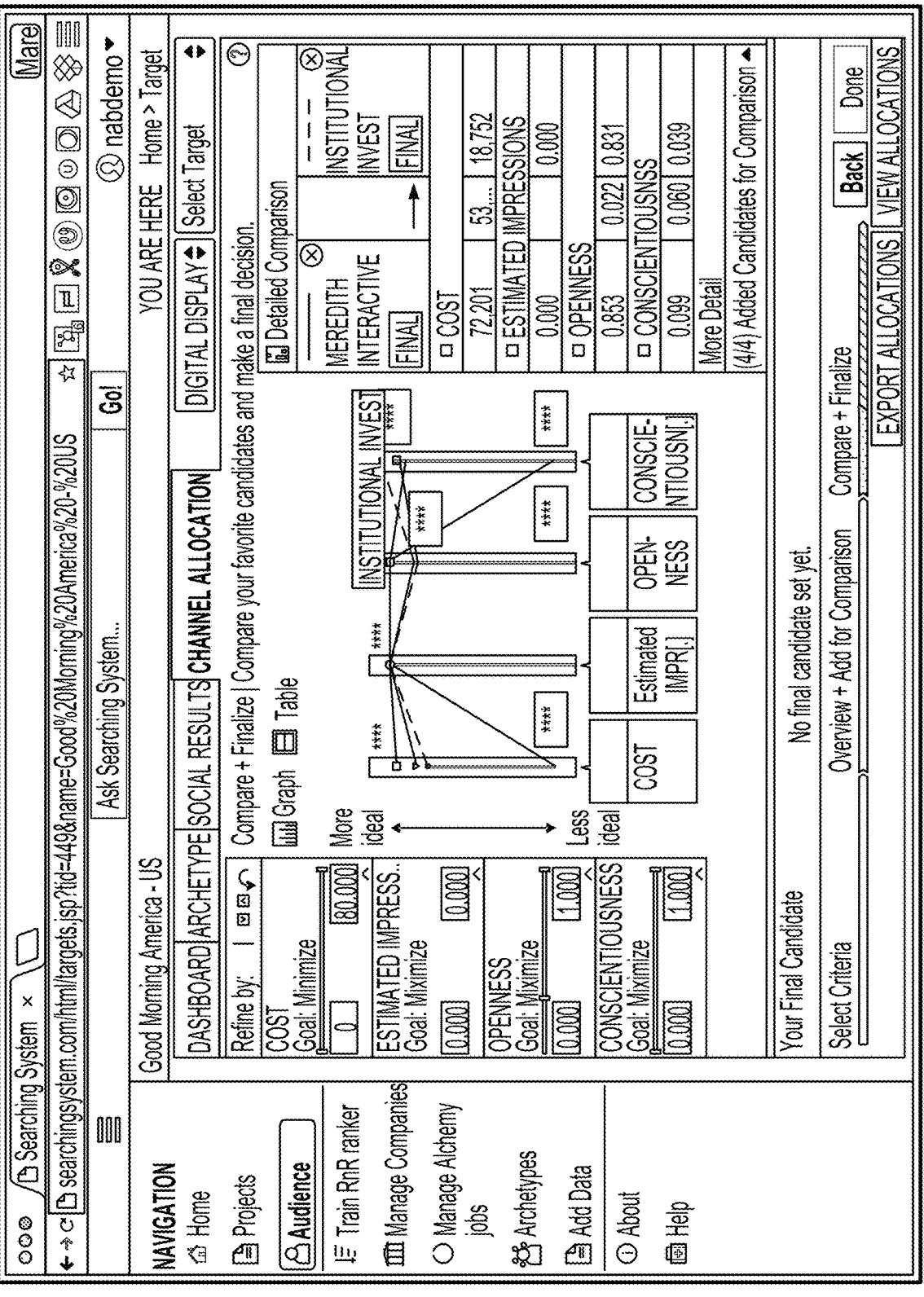
FIG. 28 shows a graphical display that illustrates a degree to which each publication is ideal for each of various criteria.

FIG. 28 shows a graphical display that illustrates a degree to which each publication is ideal for each of the various criteria. For example, the graphical display shows, for each metric, a bar with a graphical element for each publication to represent the how ideal each respective publication is for that metric. A graphical element that is placed closer to the top may be represent a more ideal value, while a graphical element that is placed closer to the bottom may represent a less-ideal value. Each bar may have a graphical element for each publication, and the graphical elements for each publication may be connected by lines among the bars. A user may select two publications (e.g., by clicking on their respective lines) to cause the computing device to display values that indicate the difference between each publication for each metric or criteria (e.g., as bars with accompanying numbers in the graphical display, and in table format to the right of the web page). FIG. 29 shows a popup box that shows the values in table format.

In some implementations, a user of the system described herein may create a target of individuals and analyze information associated with that target to determine which individuals to target in a different dataset. The user may request that the images of the individuals in the target be analyzed to further refine/narrow the target to a subset that has a certain gender, race, and/or age.

As an illustration, an organization may have a dataset that identifies information on certain customers, and may want to send a communication to those of its customers who are women of a certain age and race. The organization, however, may not have all of this information in their dataset (e.g., the age and race of the women). The organization may further not know how these women communicate, and thus how to tailor the content of its communications to these women. Still, using the system described herein, the organization may gather information that specifies characteristics of women that are of the specified age and race, and use that information to select from their own dataset those individuals that are women of the specified age and race (and that potentially satisfy other criteria).

To do so, the organization (e.g., a user that is employed by the organization), may access the interface that is shown in FIG. 18 and may interact with dialog box 1802 to specify characteristics of a target group to be created. These characteristics can include limiting the target group to people that mentioned the name of the organization in social media posts over the last several months. In response to running a search of social media posts to identify posts that satisfy the specified characteristics, the system may present the user with an interface that is similar to that shown in FIG. 19. That interface shows various characteristics of the identified target group of users, such as personality characteristics of the target group and the most-common target archetypes of the target group. A user may select an archetype to narrow the target to those users that have been determined to belong to a particular archetype. For example, the organization may wish to identify those users that not only have posted about the organization within the last few months, but also have the "Rebel" archetype.

The organization may further wish to identify those users that have characteristics that can be identified by analyzing images associated with the social media accounts, such as age, gender, and race. As earlier stated, the organization may wish to send communications to women who are of a certain age and a certain race. Thus, the organization may request that the system analyze images associated with social media accounts of individuals in either the target or sub-segment, to narrow the target to those individuals that have the specified gender, age, and/or race. The images analyzed may include all images uploaded by the individuals to their social media accounts, the profile images of the individuals, and/or those images in which the individuals have been tagged. In some examples, the computing system may allow a user to specify age, gender, and race in the initial criteria for the target group (e.g., in dialog box 1802), rather than requiring the user to first specify a target and then refine that target.

The organization may export information that identifies the individuals in the target group and associated information (e.g., words commonly used by the individuals in social media posts). The organization may then match these characteristics to their own dataset to identify those customers that likely belong to the same group. As an illustration, assume that the organization is introducing a shoe department and wants to send an announcement out to women of a certain age and that like certain luxury brands of shoes, but the organization does not know which of its customers are women of that certain age and that like luxury brands of shoes. In this case, the user could create a target that includes women of a certain age that have posted the names of luxury shoe brands within the last few months. The user can view information on the created target, such as what other items the users talked about, and use this information to identify those users from within its own dataset that match the target (e.g., which users have purchased the other items, and thus are likely to be interested in the new shoe department). The organization can also use the viewed information to determine which words are commonly used by the target group and thus how to structure/phrase a communication to the target group.

Figure 30:
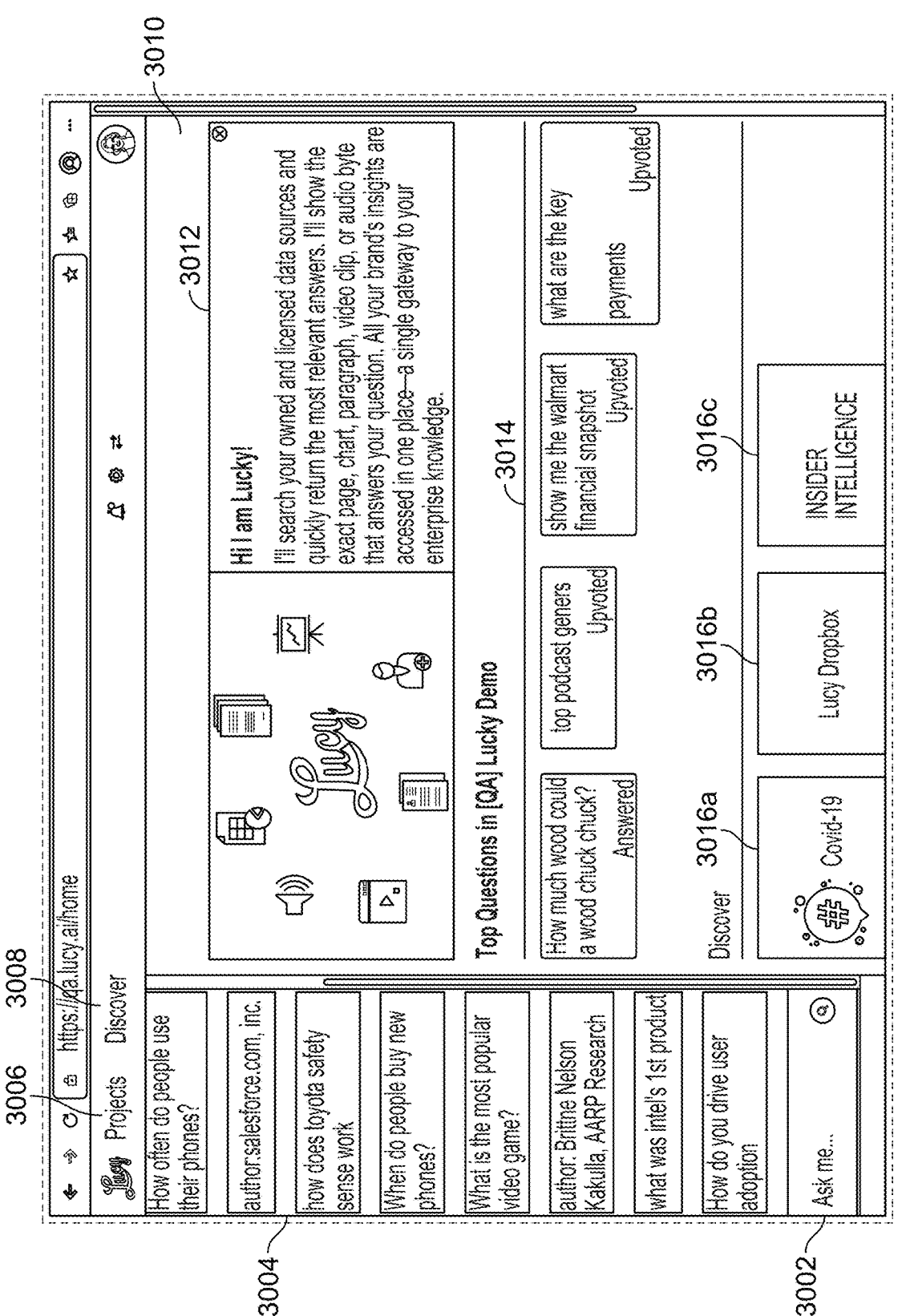
FIG. 30 shows a dashboard user interface.

FIG. 30 shows a dashboard user interface, with which a user can interact to submit a search query or access other features of the searching website. The user interface shown in FIG. 30 is similar and an alternative to the user interface shown in FIG. 2A.

The user interface of FIG. 30 may be the first or "home" webpage shown to a user after logging into the searching system described in this document. A user may submit a search query by selecting search input field 3002 and typing a query into the search input field 3002. A search pane 3004 above the search input field 3002 shows previous queries submitted by the user.

A main region 3010 of the web page shown in FIG. 30 includes various different types of content, including an introductory statement 3012, a collection of top questions 3014, and a set of resources 3016*a-c* that a user is able to browse.

At a top of the web page shown in FIG. 30 is a "Projects" user interface element 3006 and a "Discover" user interface element 3008. The "Projects" user interface element 3006 is similar to the "Projects" user interface element 1302 (FIG. 13), and selection of both elements causes web browser navigation to a list of projects to which users have saved search results. The "Discover" user interface element 3008 is similar to the "Latest news" widget 260 (FIG. 2A), which both show recently-created search results.

Figure 31:
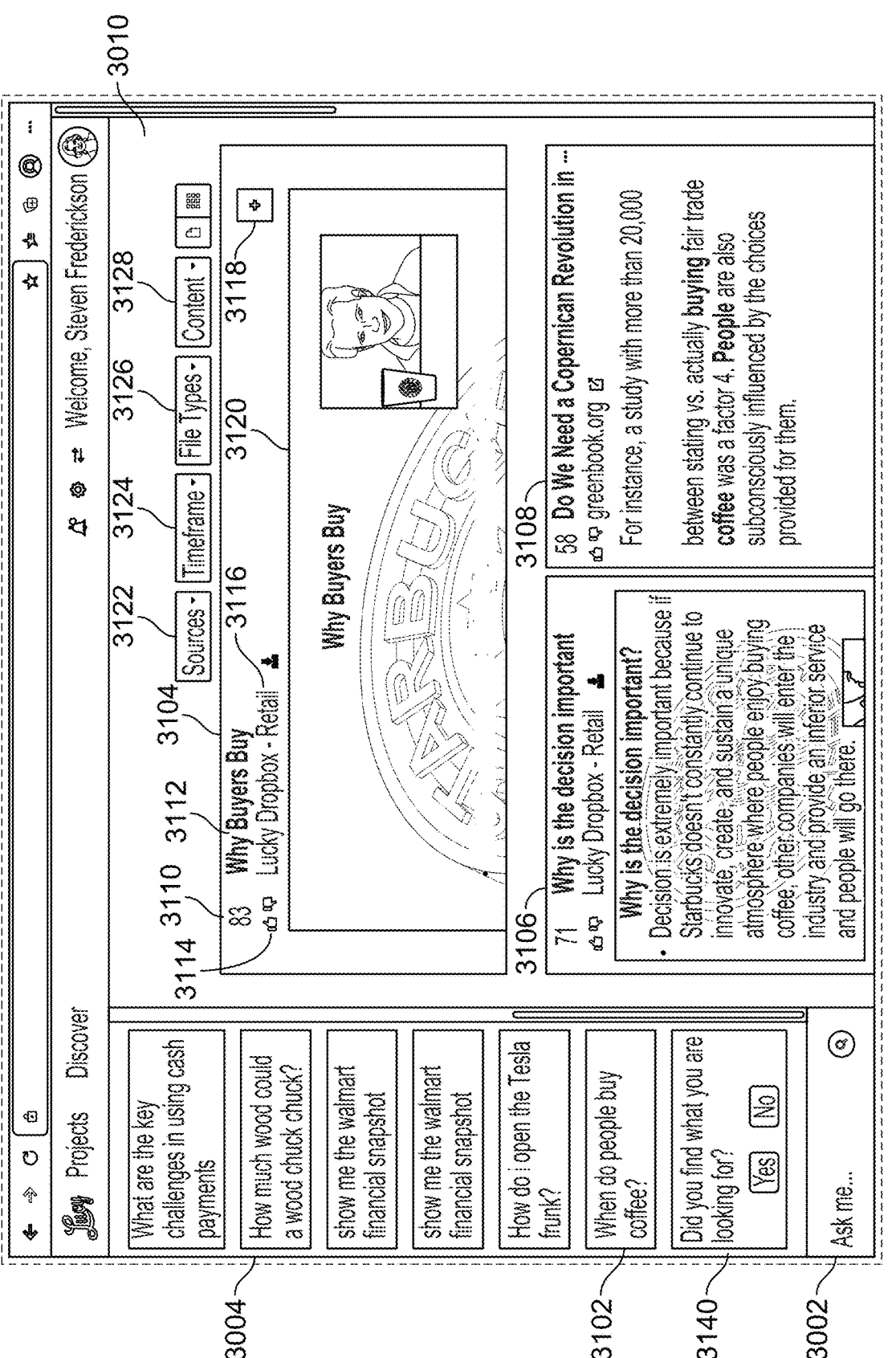
FIG. 31 shows a user interface provided after entry of a search query.

FIG. 31 shows a user interface provided by the computing system after a user has entered "When do people by coffee?" into the search input field 3002. Accordingly, the search pane 3004 includes a user interface element 3102 that includes the text "When do people buy coffee?", indicating the last query entered. The search pane 3004 also includes a dialog box 3140 that includes the text "Did you find what you are looking for?" along with "Yes" and "No" selectable interface buttons. User input is able to select "Yes" or "No" to specify whether the results provided by the computing system provided the user with satisfactory information.

The web page has also changed so that the main region 3010 shows results to the search query "When do people buy coffee?". This main region 3010 shows three results 3104, 3106, and 3108 that the computing system identified as being responsive to the search query. Each search result includes: (1) a score (e.g., score 3110) that indicates how responsive the corresponding search result is to the query, (2) a title to the search result (e.g., title 3112), (3) up and down voting elements (e.g., elements 3114) with which a user can provide feedback to indicate whether the search result was helpful, (4) an indication of a data source from which the search result was retrieved (e.g., data source indication 3116), (5) an interface element enabling the user to add the corresponding search result to a project (e.g., element 3118), and (6) a summary of content from the search result (e.g., summary 3120).

The web page shown in FIG. 31 also includes user interface elements 3122-3128 with which a user is able to filter the search results that are responsive to the query down to a subset of responsive search results that meet certain criteria.

Figure 32:
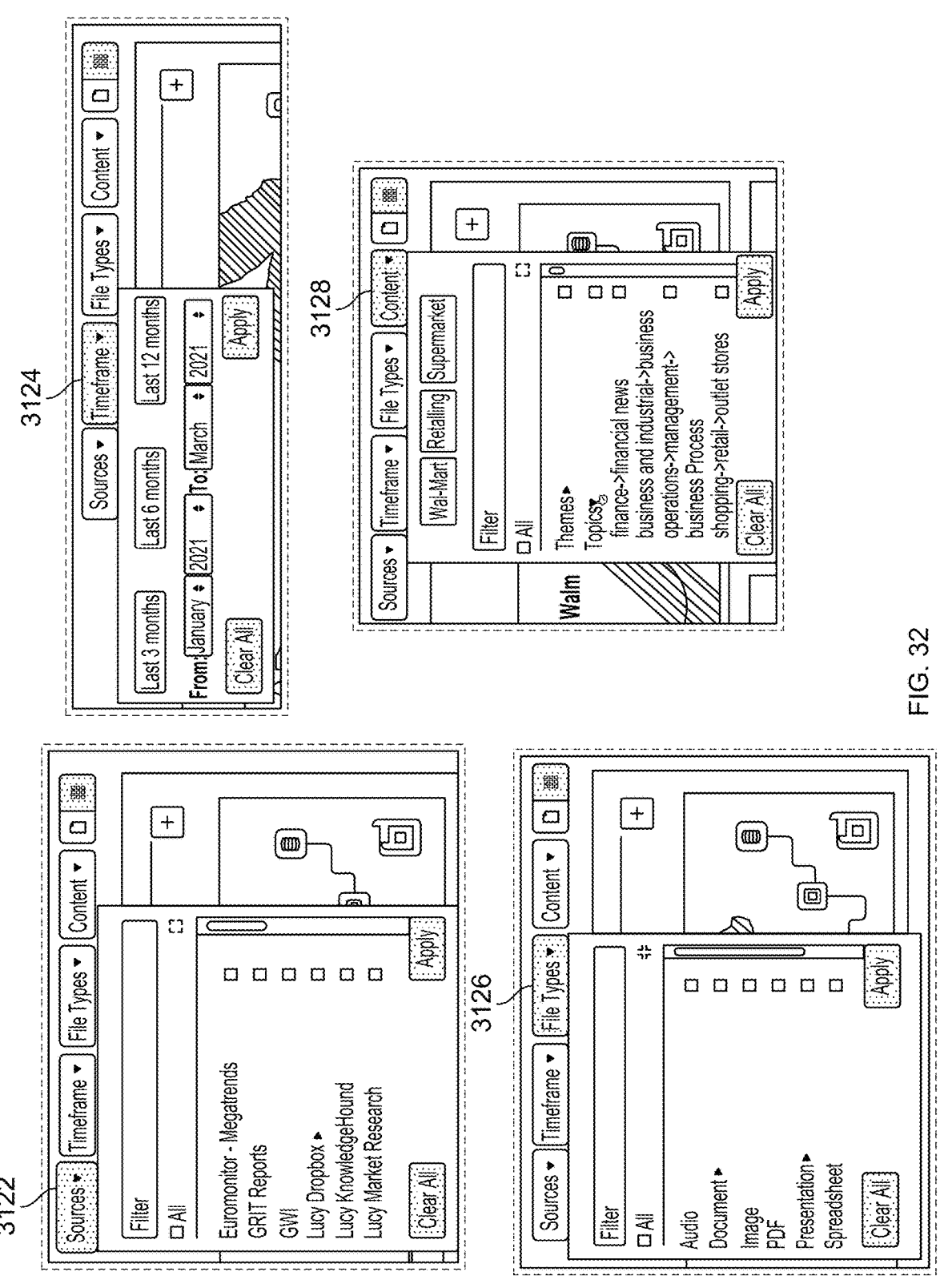
FIG. 32 shows drop down boxes selectable from the user interface of FIG. 31.

FIG. 32 shows drop down boxes that appear when user input selects each of the user interface elements 3122-3128 in FIG. 31. For example, user selection of the "Sources" interface element 3122 presents a list of data sources from which search results that are responsive to the query have been pulled (e.g., the "GWI" data source" and the "Lucy Dropbox" search data source). A user may click on the check box next to one or more data sources and then select the "Apply" user interface element to limit the presentation of search results to those that are both responsive to the search query and were retrieved from the user selected data sources.

User selection of the "Timeframe" interface element 3124 causes the computing device to present user interface elements with which user input may specify a time period to which search results responsive to the query should be limited. For instance, each search result may be associated with a date (e.g., a date at which content in the search result was authored, or a date at which the search result was added to its data source). User selection of the "Last 3 months" interface element may limit the presentation of search results to those that are both responsive to the query and are dated within the last three months (the "Last 6 months" and "Last 12 months" interface elements operate similarly, but with respect to different time periods). A user may also interact with the "From" and "To" fields to specify a time range spanning from a beginning month/year to an ending month/year, respectively.

User selection of the "File Types" interface element 3126 causes the computing device to present user interface elements with which user input may specify file types to which search results responsive to the query should be limited. For example, FIG. 32 shows that a user may specify the type of search results to "Audio" files, "Document" files, "Image" files, "PDF" files, "Presentation" files, and "Spreadsheet" files, to provide a few examples.

User selection of the "Content" interface element 3128 causes the computing device to present user interface elements with which user input may specify certain types of content to which search results responsive to the query should be limited. In particular, content of each search result may have been previously analyzed by the computing system and each search result tagged with one or more "Themes" and one or more "Topics." User input may interact with interface elements presented under the "Content" interface element to select certain topics and themes, and therefore limit the presentation of search results to the selected topics and themes.

Figure 33:
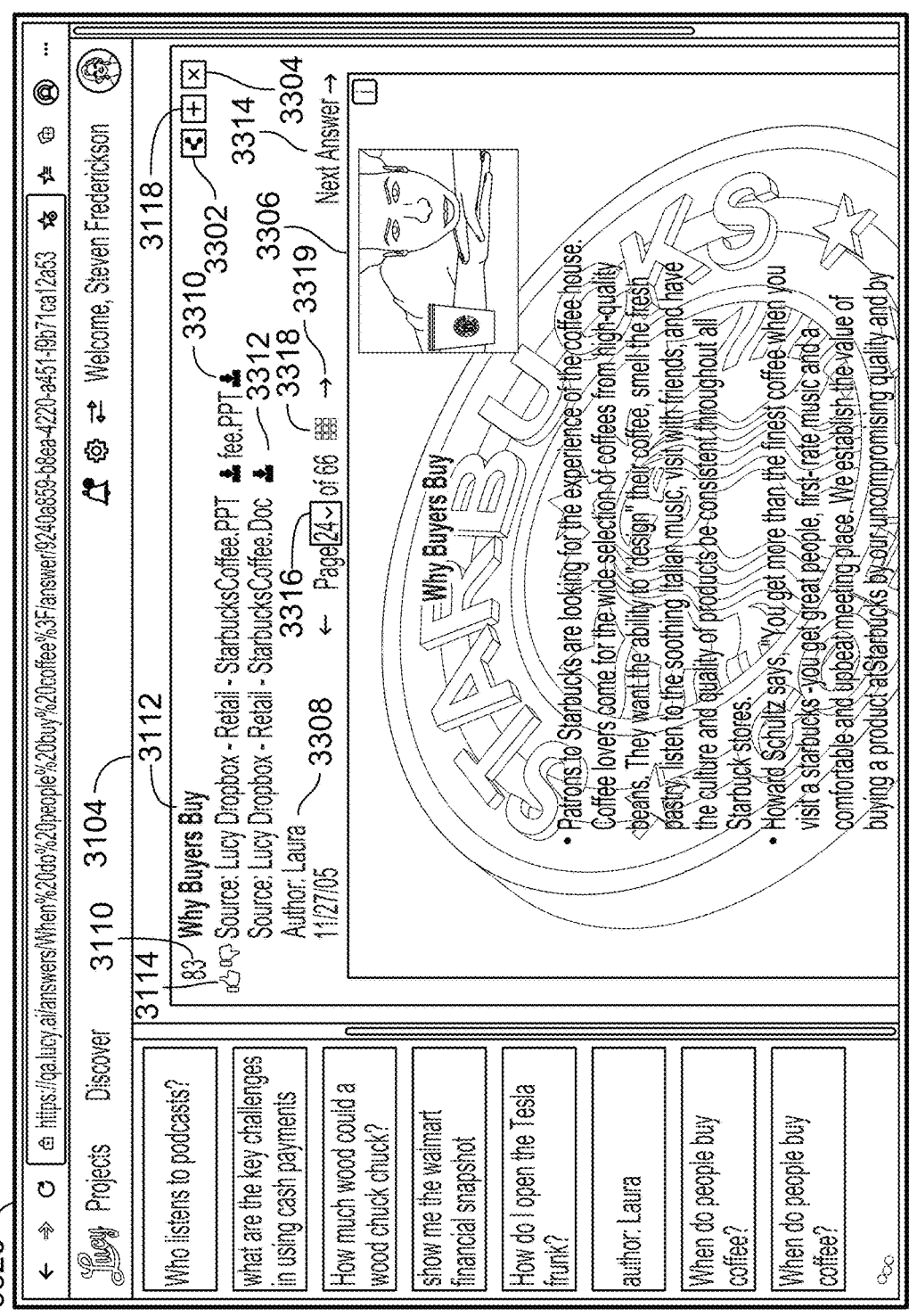
FIG. 33 shows a web page that presents a search result from a presentation.

FIG. 33 shows a web page that presents the search result 3104 (FIG. 31) after user selection of the search result 3104 in the FIG. 31 user interface. The web page in FIG. 33 differs from that shown in FIG. 31, at least because the FIG. 33 web page shows a single result responsive to the query (in distinction to presenting multiple responsive results, as displayed in FIG. 31), and because the FIG. 33 web page shows more content regarding the search result than the summary 3120 shown in FIG. 31. For example, the primary display area 3306 of the search result 3104 presents more content (e.g., more text) than the summary 3120 shown in FIG. 31.

Like the "many results" interface of FIG. 31, the "single, selected result" interface of FIG. 33 shows the score 3110, title 3112, up and down voting elements 3114, and an interface element 3118 to add the corresponding search result to a project. The FIG. 33 user interface further includes a "Share" interface element 3302 that is user selectable to present options for sharing a link to the search result, and a "Close" interface element 3304 that is user selectable to close this search result and navigate back to the presentation of multiple search results shown in FIG. 31.

While the FIG. 31 user interface only showed that the source for the "Why Buyers Buy" search result 3104 is the "Retail" folder within the "Lucy Dropbox" data source, the FIG. 33 user interface shows that the content for the "Why Buyers Buy" search result was retrieved from two sources: "StarbucksCoffee.PPT" and "StarbucksCoffee.Doc". This is because the computing system determined that both the Powerpoint (.PPT) and Word (.doc) file included the same content, presumably because the Powerpoint file was created from the Word file. Because the content matches, the computing system (1) presents the content as a single search result responsive to the search query "When do people buy coffee" (in distinction to presenting duplicative search results), and (2) displays an indication that the content is from two sources. The source links 3310 and 3312 are user selectable to open the corresponding source files (e.g., open the PowerPoint file or the Word file). The source documents need not be entirely the same, but the portion of the source files from which the content was selected may be the same. In other words, Page 24 of each document may be the same in order for the search result created from Page 24 to reference both the PowerPoint and the Word document, other pages in the documents may differ.

The FIG. 33 user interface also includes an author indication 3308 that the Author of the search result is "Laura." This author indication 3308 may be determined based on analysis of which individual is listed as an author in the source documents (e.g., the PPT and DOC documents), or based on which person uploaded the document to the "Lucy Dropbox" data source 3116 (FIG. 31). The author indication 3308 is user selectable to view a list of files and/or search results that identify the same author. For example, an individual may select the author indication 3308 to view a list of dozens of files authored by "Laura."

The "Next Answer" interface element 3314 is user selectable to cause the computing device to navigate to a next search result presented as responsive to the query in FIG. 31. In particular, user selection of the "Next Answer" interface element 3314 will cause the presentation of search result 3104 in FIG. 33 to be replaced with a presentation of search result 3106.

Notably, the "Why Buyers Buy" search result 3104 represents content from a single page of a multiple page document (either the PPT or DOC file), as indicated by the "Page 24 of 66" set of interface elements. A user may navigate to a different page of the presentation by selecting the Page "24" drop down box and selecting another page, or selecting the left arrow or right arrow interface elements to navigate to the previous or next page, respectively.

Figure 34:
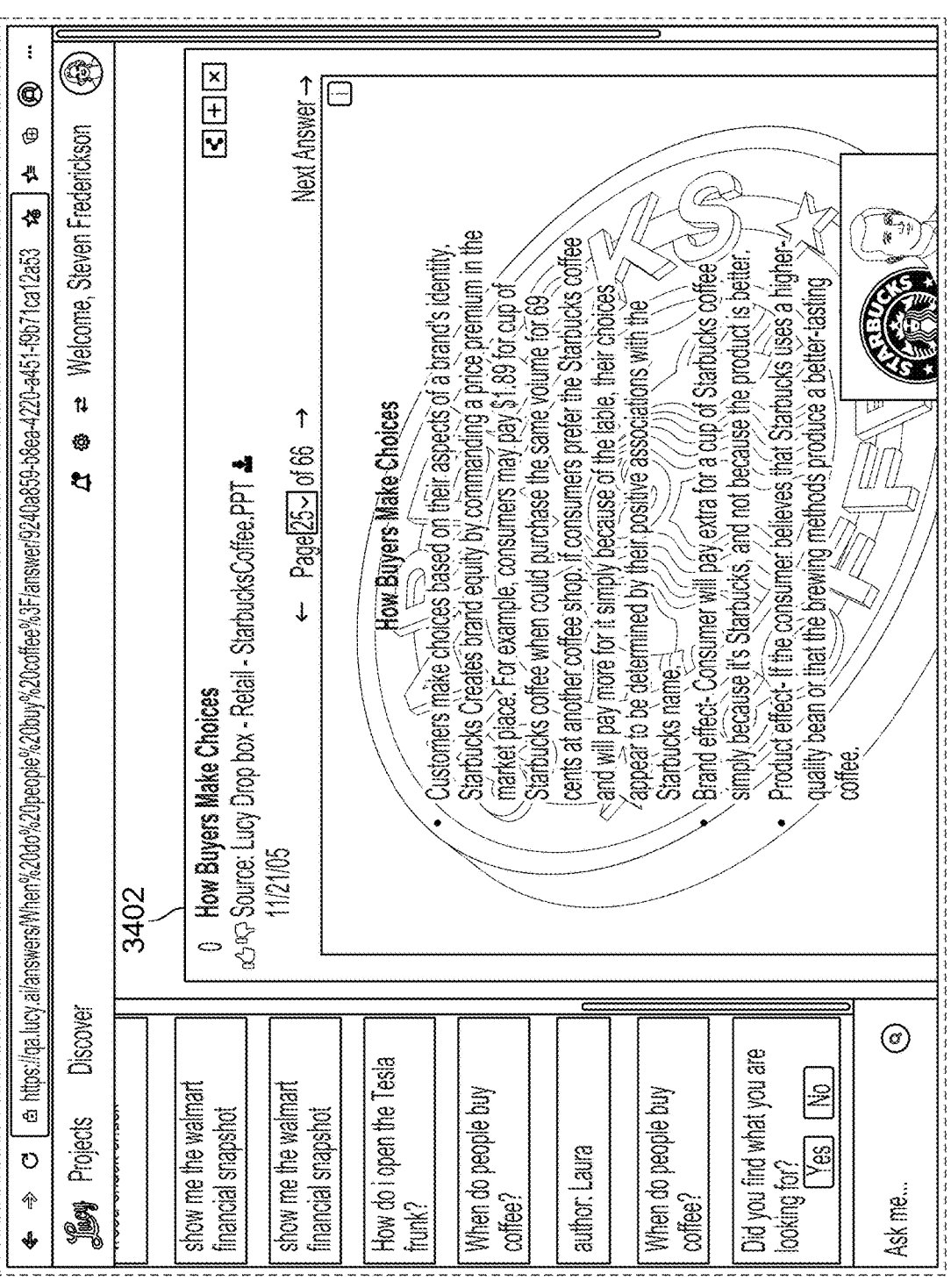
FIG. 34 shows a next page from the presentation.

FIG. 34 shows the user interface after user input has selected the next page element to navigate to "Page 25" of the presentation. As indicated above, the computing system is able to generate different search results from different pages of the presentation, such that the content of each page in a presentation is treated by the computing system as a potentially different search result. This is illustrated in FIG. 34, by the search result for page 25 (result 3402) being visually identified as having a score of "O" with respect to the query "When do people buy coffee?". As such, a user is able to navigate through a presentation and determine how relevant each page of the presentation is to a query that the user previously entered.

Figure 35:
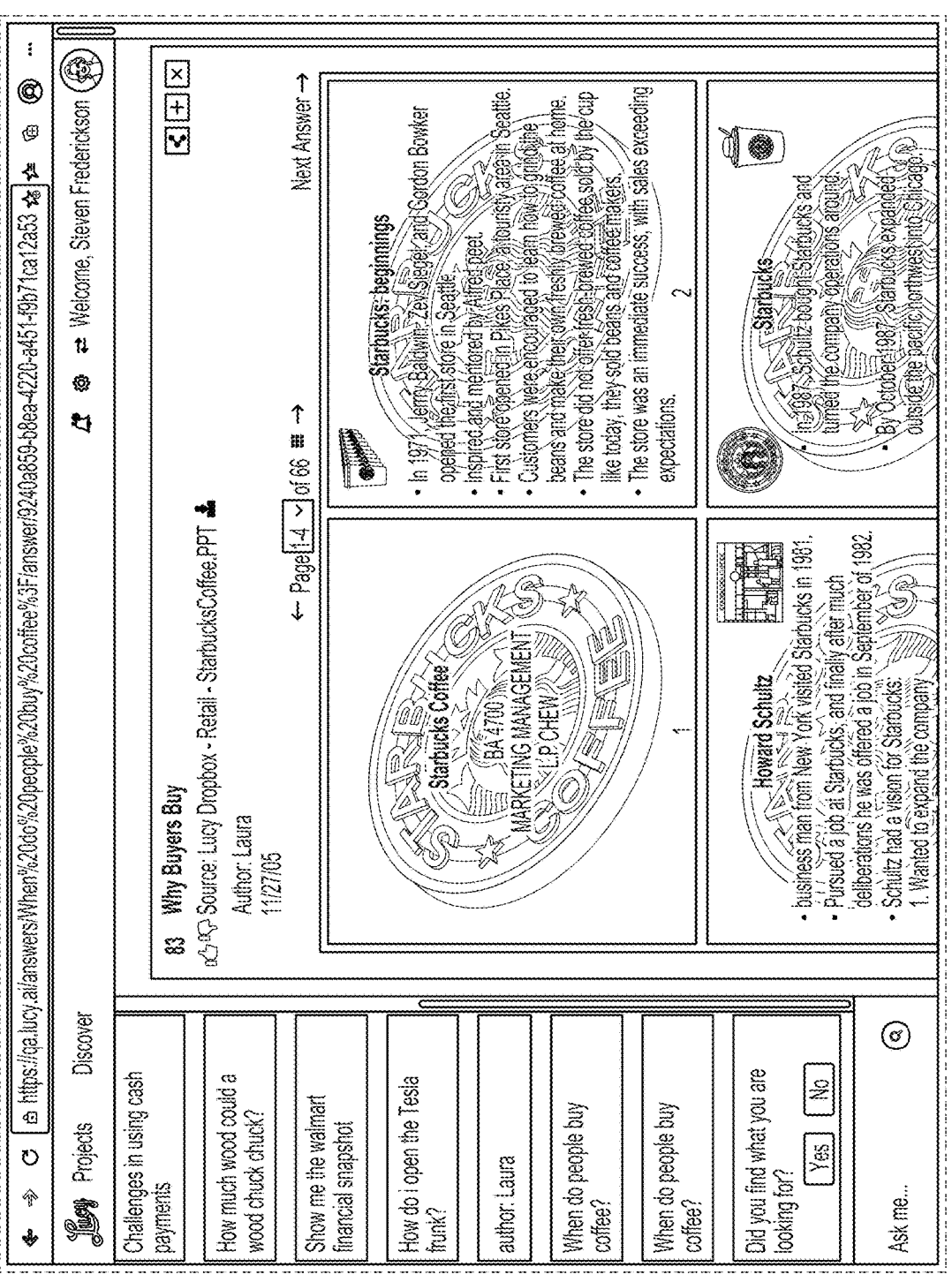
FIG. 35 shows multiple pages of the presentation.

FIG. 33 also includes a "view multiple pages" user interface element 3318. User selection of this element 3318 causes the computing device to transition to the user interface shown in FIG. 35, which shows multiple pages of the presentation in a single web page (specifically pages 1-4).

Figure 36:
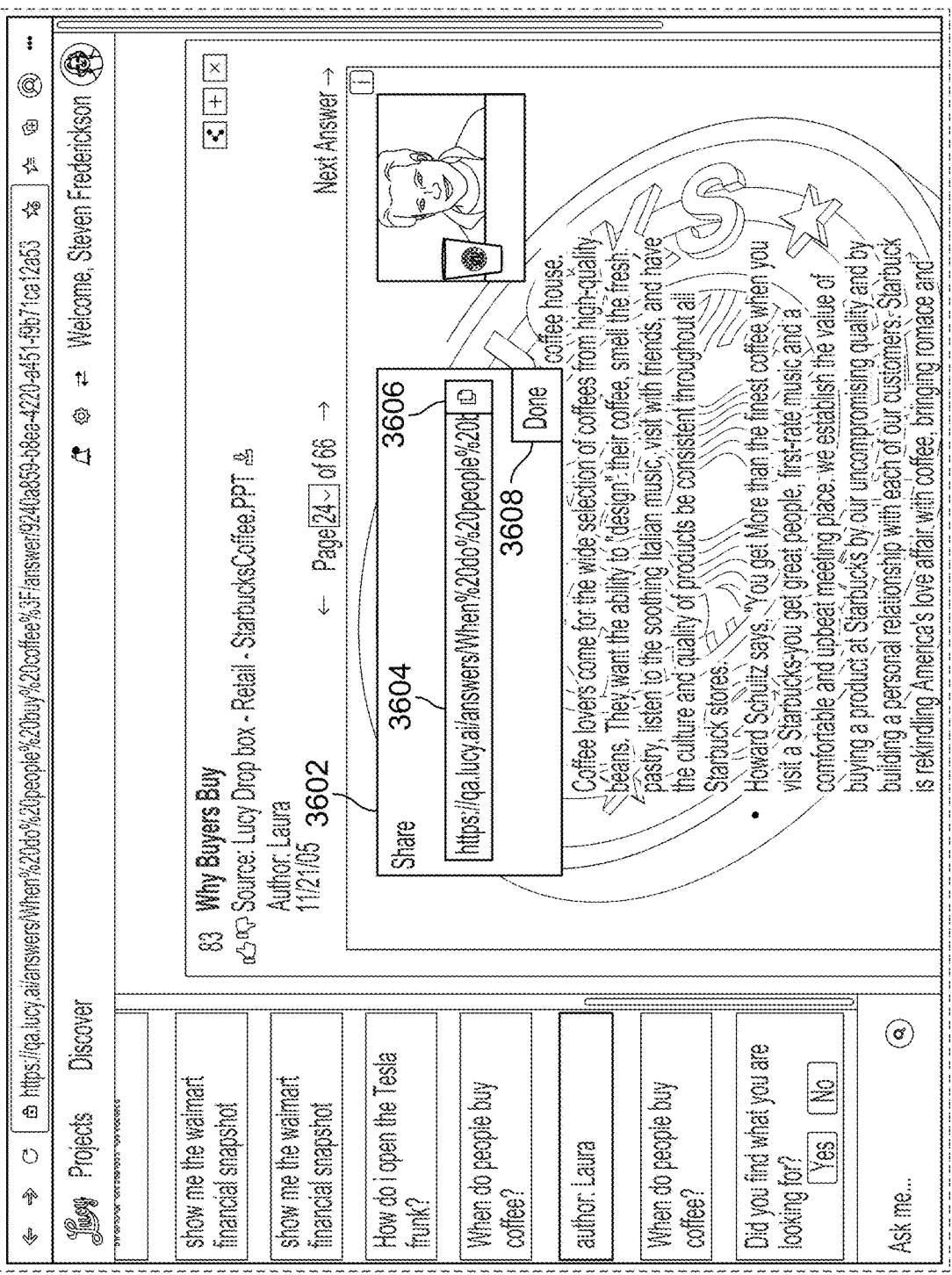
FIG. 36 shows a "Share" dialog box.

FIG. 36 shows a "Share" dialog box 3602 presented responsive to user input selecting the "Share" interface element 3302 in FIG. 33. The Share dialog box 3602 includes a text field 3604 that presents a text link specific to the search result 3104. User input may select the "copy" interface element 3606 to copy the link in text field 3604 to a clipboard. User selection of the "Done" interface element 3608 causes the computing device presenting the user interface of FIG. 36 to close the dialog box 3602. Alternatively, user selection of the "Share" interface element 3302 in FIG. 33 causes the computing system to directly copy the link to the clipboard, without presenting the dialog box 3602. The link presented in text field 3604 may be different from, or the same as, the URL presented in the address bar 3320 (FIG. 33).

FIGS. 37A-E show a flowchart of a process for linking to a search result. The process involves a system providing a link to a search result that was retrieved based on a query. The link, when shared with users of other user accounts, directs those other users to either the specific search result or a list of search results generated based on the query, depending whether the viewing user account has access to the specific search result.

At box 3702, the computing system (e.g., computing system 108, FIG. 1) receives a query specified by user input at a first computing device (e.g., computing device 102, FIG. 1). For example the computing system may receive, over a network, information that indicates content of a query typed by user input into search input field 3002 (FIG. 30). The operations involved in receiving a query may include those operations shown by boxes 402 and 404 (FIG. 4). The first computing device may be logged into the computing system with a first user account (box 3704). For example, an individual viewing the user interface presented in FIG. 30 may have previously submitted credentials (e.g., a username and password) to authenticate with the computing system that provides the website discussed in this disclosure.

At box 3706, the computing system identifies multiple results that are responsive to the query. These results may be from different data sources/datasets (box 3708). For example, the results may be selected from a combination of various unstructured datasets 120 (FIG. 1) and structured datasets 122 (FIG. 1). Users of the computing system may have access to different datasets, with some datasets only available to users that have licenses to the corresponding datasets (users may be part of organizations that optionally have the ability to license datasets for use and searching by their employees).

As such, a first user account may have access to a first dataset due to that first user account having a license to the first dataset (box 3710), while a second user account may not have access to the first dataset due to the second user account not having a license to the first dataset (box 3712). As described in additional detail below, the differing user access to various datasets can mean that different user accounts are provided with different sets of search results responsive to the same query. The identification of results that are responsive to the query may incorporate the techniques described throughout this disclosure.

At box 3714, the computing system provides information to cause the first computing device to present a display of the multiple results. For example, the computing system may transmit information to the first computing device that causes a web browser at the first computing device to present the web page shown in FIG. 31. The transmitted information may include an HTML file that specifies content of the web page shown.

The web page may include a presentation of search results in a ranked order based on relevance of each of the multiple results to the query (box 3716). For example, the web page of FIG. 31 shows multiple search results 3104, 3106, and 3108 in order based on the score of each search result (e.g., score 3110 for search result 3104). The web page may include additional search results, presented when user input scrolls the web page down.

At box 3720, the computing system provides information to cause the first computing device to present a display of a user selected result. For example, the computing system 108 (FIG. 1) may provide information to computing device 102 (FIG. 1) to cause the computing device 102 to display the web page shown in FIG. 33. The display of the user selected result by the first computing device may be responsive to user input selecting the user selected result (box 3722). For instance, user input may select search result 3104 in the web page shown in FIG. 31, causing the web browser to navigate to the web page shown in FIG. 33. The information (e.g., an HTML web page and/or other resources) may be provided to the computing device responsive to receiving a request from the first computing device for the web page of FIG. 33 (e.g., rather distinction to the computing system providing the content for generating the display of FIGS. 31 and 33 at the same time, effectively preloading the web page of FIG. 33, which is also an option).

At box 3726, the display of the user selected result can exclude presentation of other of the multiple results. For example, the web page shown in FIG. 33 may not include any of the other search results that are responsive to the query.

At box 3728, the display of the user selected result includes a user-selectable element that facilitates sharing of the web address. For example, the web page shown in FIG. 33 includes a "Share" interface element 3302, which facilitates sharing of the web address. The display of the user selected result may represent content independent of the web browser user interface features, such that the user-selectable element that facilitates sharing of the web address is defined by the web page and not the address bar 3320.

In some examples, user selection of the Share interface element 3302 causes the computing device to present the web address, for example, as shown in FIG. 36 (box 3730). In some examples, user selection of the Share interface element 3302 causes the computing device to copy the web address, for example, as though user selection of the Share interface element 3302 copied the address shown in text field 3604.

The web address may be shareable with other user accounts. For example, a user of the computing device 102 may paste the web address into an email or other type of communication message that is transmitted to another user of the computing system 108.

At box 3734, the computing system provides information that identifies the web address specific to the user selected result. For example, the computing system may provide information to the computing device that enables the computing device to populate the text field 3604 with a web address, for example, the address itself or parameters/components that are included as part of the web address.

At box 3736, the display of the user selected result is a web page defined by the information provided by the computing system. For example, the information provided by the computing system to the computing device to cause presentation of the web page shown in FIG. 33 may include an HTML file and associated files (e.g., a JavaScript file and an image).

At box 3740, the display of the user selected result represents a display of a single page from a presentation of multiple pages. The single page may be a middle page in the presentation, for example, as FIG. 33 shows page "24" of "66" of a presentation named "StarbucksCoffee.PPT" and "StarbucksCoffee.Doc". Selection of a user selected result from among a presentation of multiple results may cause direct navigation to the single page. For example, user selection of the search result 3104 in FIG. 31 from among the displayed list of multiple search results, causes the computing device to navigate directly to the "page 24" user interface shown in FIG. 33 without displaying any other page of the 66-page presentation.

At box 3744, the single page is the only result from the presentation that is included among the multiple results to the query. With respect to the user interface shown in FIG. 31, the "StarbucksCoffee.PPT" and "StarbucksCoffee.Doc" provide at least two search results 3104 and 3106, but is possible that the multiple results that are responsive to the query (e.g., the entire collection responsive, or just those displayed to a user in a single page) may include only a single result selected from a multi-page document. The multi-page document may include different pages that are search results to other, different queries.

At box 3746, the computing system provides information to cause the first computing device to present a next page from the presentation, with the next page being displayed responsive to user input interacting with a selectable interface element presented by the display of the single page. For example, responsive to user input at a computing device selecting the right arrow selectable interface element 3319 (FIG. 33), the computing device may send a request to the computing system for content corresponding to page "25" of the presentation. In response, the computing system may send to the computing device information that causes the computing device to present page "25" of the presentation (e.g., an HTML file that causes the computing device to render the display shown in FIG. 34).

At box 3748, the computing system provides information to cause the computing device to present a concurrent display of a plurality of pages from the presentation, the concurrent display of the plurality of pages displayed responsive to user input interacting with a selectable interface presented by display of the single page. For example, the computing device may present the "multiple page" user interface shown in FIG. 35 responsive to user input at the computing device selecting the multiple page user interface element 3318 (FIG. 33). As with other user interfaces described in this disclosure as being presented at a client computing device, the user interfaces may be displayed responsive to the computing system sending the content to the client computing device (e.g., responsive to a request by the computing device for a web page).

At box 3760, the display of the user selected result by the computing device includes a presentation of multiple links to multiple different sources that provide the user selected result, including a first link to the user selected result at a first data set and a second link to the user selected result at a second dataset. For example, the display of search result 3104 in FIG. 33 shows a first link 3310 to a PowerPoint (PPT) file and a second link 3312 to a Word (Doc) file. This can occur when both source files (here the PPT file and the Doc file) include substantively similar content (e.g., the user-viewed text and visual content may be the same, although potentially encoded differently by the files).

In this example, both source files (the PPT and Doc files) are from the same dataset "Lucy Dropbox", but it is possible that the source files are located in different datasets, such that a first dataset stores the user selected result as a first type of file (box 3762) and a second dataset stores the user selected result as a second type of file (box 3764). For example, the file may be stored as the same or different file types in various types of datasets (e.g., dropboxes, licensed datasets, different hard drives, different servers, different publications).

At box 3770, the computing system receives a request from a second computing device for content corresponding to the user selected result. For example, a second user may use a different client computing device to log into the computing system with a second user account (box 3770). The second user may have received the web address from the first computing device (3772). For example, the second user may have received the web address from the first user in a computer communication (e.g., an email, an instant message, or a message within a messaging service provided by the computing system).

At box 3780, the computing system determines whether the second user account is authorized to access the user selected result. For example, the computing system may determine a data source from which the user selected result was formed or retrieved. The second user account may have varying levels of access to different data sources, for example, because some data sources may require licenses and the second user account may be affiliated with an organization that has not purchased such license for any of its users (or at least not for the second user account).

Also, some data sources may only be accessible to user accounts affiliated with an organization that hosts or provided the respective data sources (e.g., only company employees may be able to access data sources hosted or provided by the company). Also, only some departments within an organization may be able to access certain data sources. Authorization to a data source can also be provided a user account should that user account submit proper credentials (e.g., username and password) to access the data source.

At box 3782, should the second user account be authorized to access the user selected result, the computing system may provide information to the second computing device to cause the second computing device to present a display of the user selected result. This display of the user selected result may be the same as or substantially similar to the display of search result 3104 (FIG. 33). Of course, the user interface may display a name of the second user account, rather than "Steven Frederickson," which is the user account logged into the computing system in FIG. 33.

At box 3784, the display of the user selected result can exclude presentation of other of the multiple results. For example, the FIG. 33 user interface does not include a presentation of other search results, such as those shown in FIG. 31.

At box 3786, the display of the user selected result includes presentation of the query. For example, the display of the user selected result by the second computing device (that has logged into the second user account) may include information indicating the search query "When do people buy coffee?", even though user input at the second computing device may not have entered the query (box 3788). Rather, it was user input at the first computing device that searched "When do people buy coffee?", selected the search result 3104 from the user interface shown in FIG. 31, and then saved a link to the search result 3104 and sent that link to the second user account.

At box 3790, the web address may include information that enables the computing system to identify that the query was used to access the user selected result. For example, a parameter or other component of the query shared with the second user account may include information that itself identifies the query "When do people buy coffee?" or that can be used to identify the query.

At box 3792, should the second user account not be authorized to access the user selected result, the computing system may provide information to the second computing device to cause the second computing device to present the display of the multiple results. For example, because the second user account does not have authorization to access the search result 3104 that is shown in FIG. 33, the computing system may send to the second computing device information to cause the second computing device to present results to the query "When do people buy coffee?", even though the second computing device may not have received user input specifying such query. The display of the multiple results that are responsive to the query may include a presentation of the query (e.g., "When do people buy coffee?").

At box 3794, the display of the multiple results excludes presentation of the user selected result. For example, the second computing device may present a user interface similar to that of FIG. 31, excluding at least the search result 3104 (and likely also search result 3106, since it comes from the same presentation). Other search results (e.g., search result 3108 and others below that search result) may be presented. In some examples, instead of simply omitting presentation of the search result(s) to which the second user account does not have authorization to access, the second computing device may display an indication that the second user account does not have access to the user selected result (box 3796). For example, the second computing device may display the user interface shown in FIG. 31, with search results 3104 and 3106 replaced with a same-sized graphic that states "User account does not have access to this result."

Figure 38:
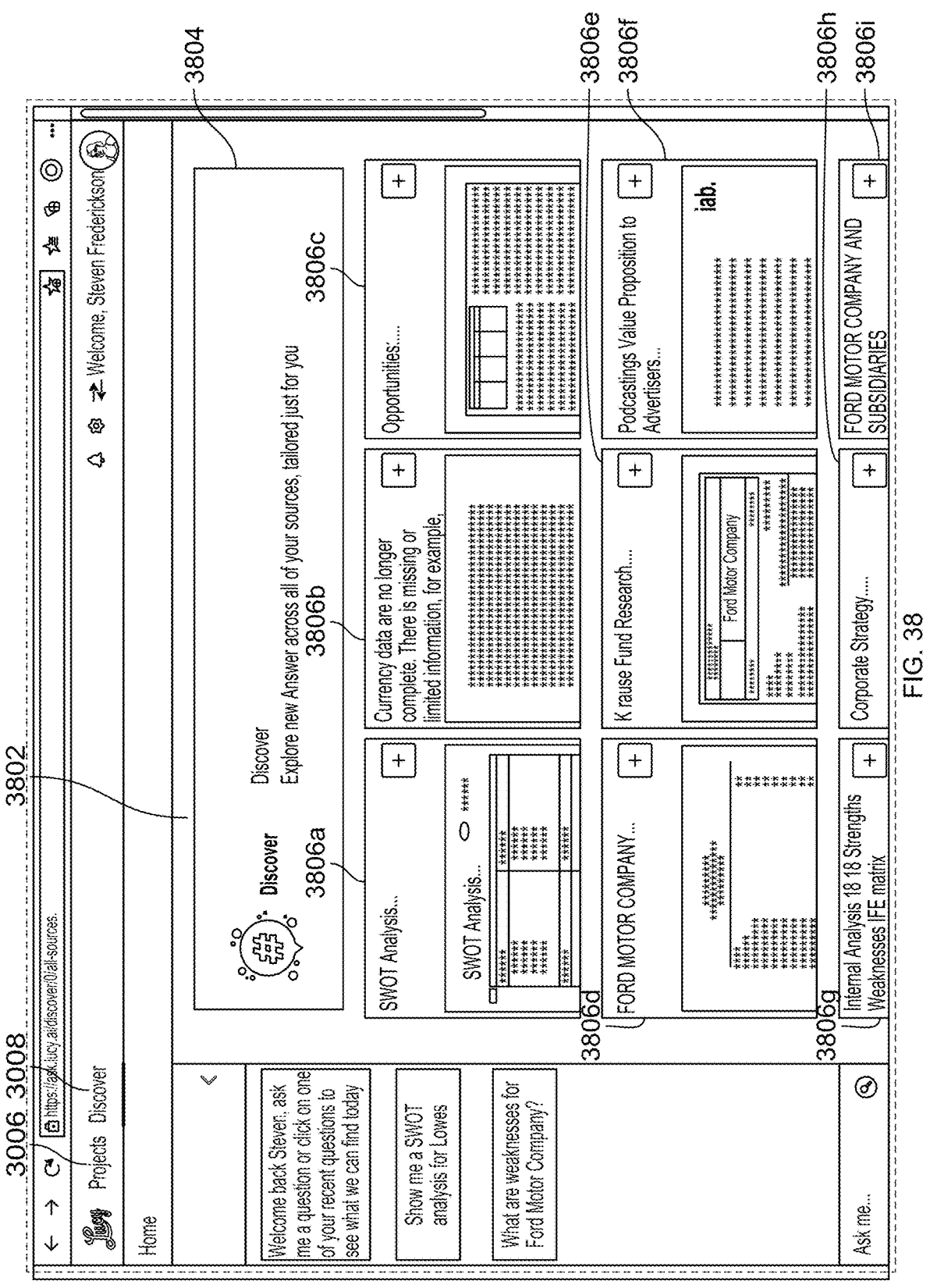
FIG. 38 shows a top of a "Discover" user interface.

FIG. 38 shows a user interface of a "Discover" web page provided by a web browser. This web page may be shown responsive to user input selecting the "Discover" user interface element 3008, for example, by selection of the button during presentation of the user interface shown in FIG. 31.

A main portion 3802 of the web page includes a top portion 3084 that indicates to users that this is the Discover page. Below the top portion 3804 is a collection of suggested search results 3806a-i. The suggested search results 3806a-i are search results that would normally be presented in response to various different user queries, and are presented as part of the "Discover" user interface based on the computing system automatically forming and executing a query that is personalized to the user account that requested display of the "Discover" user interface.

In some examples, the computing system generates the personalized query by accessing a set of queries submitted by the user account (e.g., the last 100 queries), performing keyword extraction on those queries to extract a set of keywords (e.g., proper nouns and other words known the system), and generating a unified query based on the extracted keywords. Terms in the query may be weighted based on importance of the terms (e.g., how many times the terms appeared in the last 100 queries, how recently the terms were submitted in queries). The personalized query may be considered an interest model.

Figure 39:
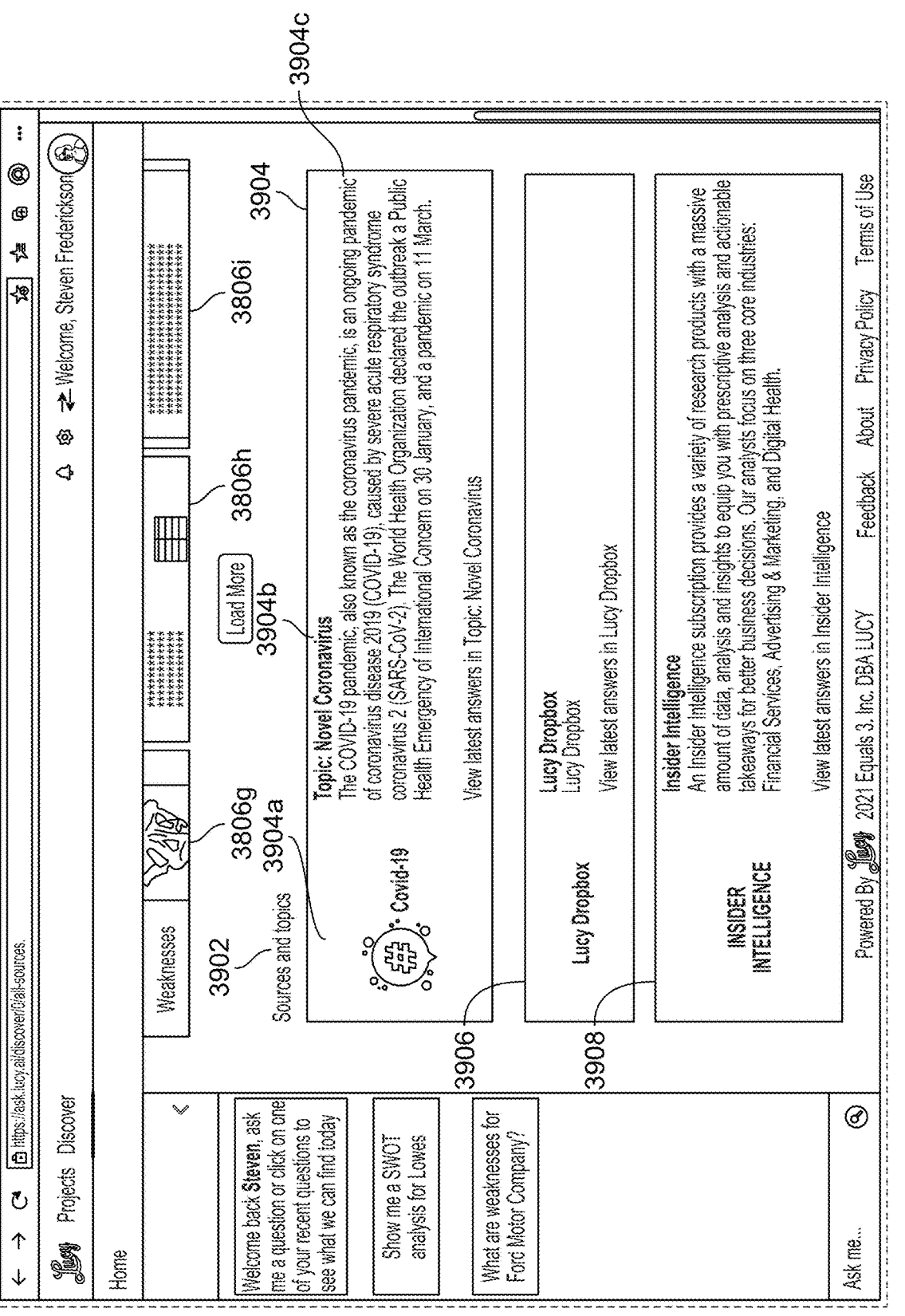
FIG. 39 shows a bottom of the "Discover" user interface.

FIG. 39 shows the web page of FIG. 38, scrolled down so that only the last three suggested search results 3806g-i are shown at the top of the FIG. 39 user interface. At a bottom of the "Discover" page shown in FIGS. 38-39 is a collection of sources and topics 3902, including a "Covid-19" topic 3904, a "Lucy Dropbox" source 3906, and an "Insider Intelligence" source 3908. Each source/topic presents a graphic (e.g., graphic 3904a), a title (e.g., title 3904b), and a description (e.g., description 3904c).

In response to user selection of a source/topic, the user interface navigates to a newsfeed corresponding to the selected source/topic. The news feed may present a list of query results that are generated based on an automated query that is regularly being updated by the computing system. Rather than the automated query being based on recent queries submitted by the viewing user account (as with the suggested search results 3806a-l) the query for each source/topic is specific to that source/topic, generating results common to all users that have access to the source/topic.

For example, the Covid-19 news feed may present a list of search results that are both (1) designated as having the topic "Covid-19" and (2) were most-recently added to any resource accessible to the user account. The Lucy Dropbox newsfeed may present a list of search results that were most recently added to the Lucy Dropbox. The Insider Intelligence newsfeed may present a list of search results that were most-recently added to the Insider Intelligence data source.

User input may interact with system settings to add additional topics/sources to the user interface presented in FIG. 39. In some implementations, the items presented in the news feed for each of the sources and topics 3902 may be ranked based on a personalized model specific to the user account.

Figure 40:
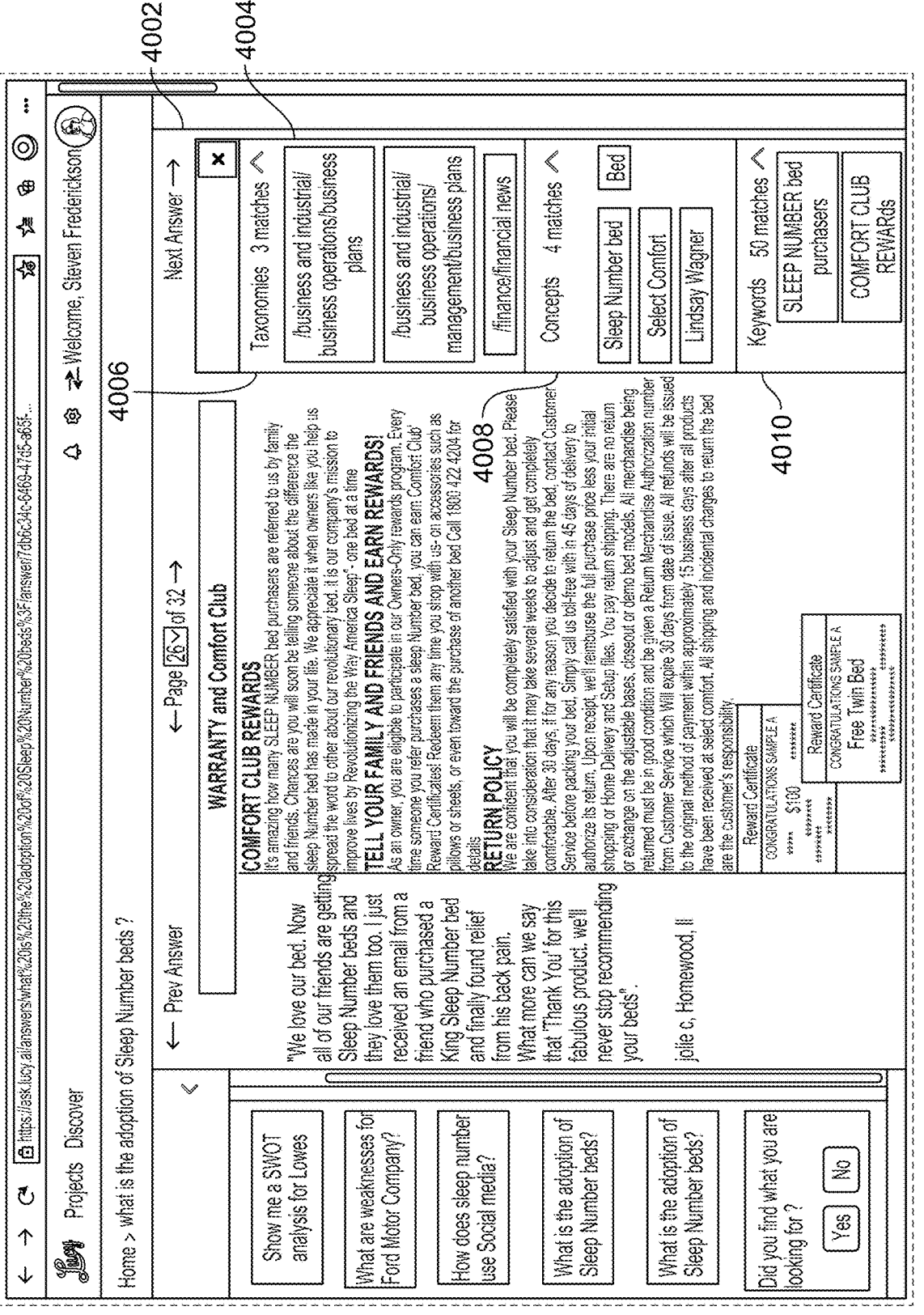
FIG. 40 shows a sidebar of search result attributes.

FIG. 40 shows a search result 4002, with a sidebar 4004 expanded to show various attributes assigned to the search result. The attributes include a list of Taxonomies 4006, Concepts 4008, and Keywords 4010. Each attribute (e.g., each taxonomy, concept, and keyword) may be assigned to the search result by the computing system based on analysis of content that makes up the search result. In this example, the search result 4002 is a page of a presentation, and each page of the presentation may have a different set of taxonomies, concepts, and keywords. Each of the taxonomies/concepts/keywords shown in FIG. 40 is user selectable to cause the web browser to navigate to a presentation of multiple search results that are also assigned to the user selected taxonomy/concept/keyword.

Figure 41:
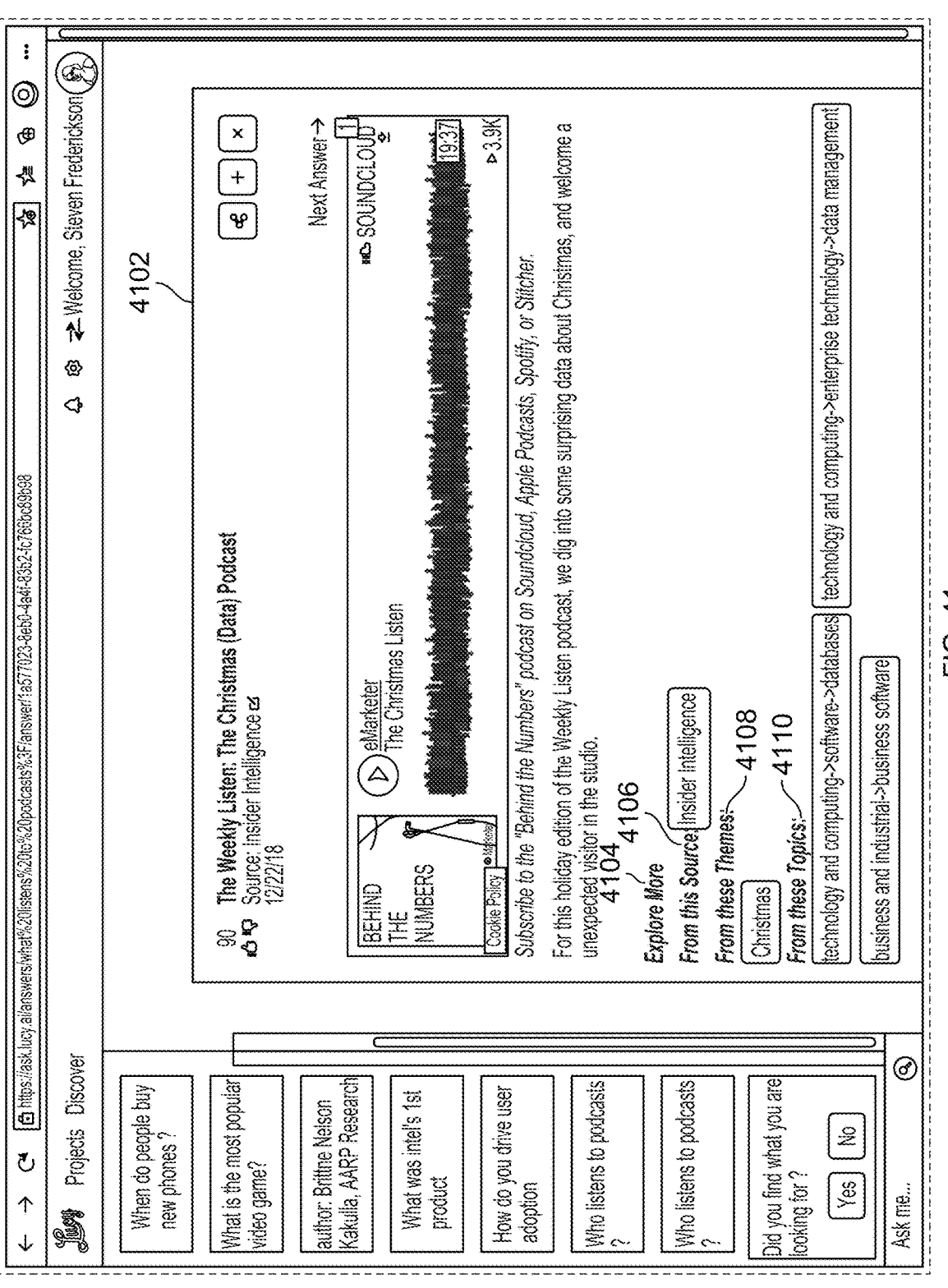
FIG. 41 shows an "Explore More" section at a bottom of a search result.

FIG. 41 shows a search result 4102, and how the bottom of search results can include an "Explore More" section 4104 that shows: (1) any sources 4106 from which the search result was accessed, (2) any themes 4108 assigned to the search result ("theme" is another name for the "concepts" discussed with respect to FIG. 40), and (3) any topics 4110 assigned to the search result ("topics" is another name for the "taxonomies" discussed with respect to FIG. 40). Each of the sources/themes/topics shown at the bottom of FIG. 41 is user selectable, to cause the web browser to navigate to a presentation of multiple search results that are also assigned to the user selected source/theme/topic.

Figure 42:
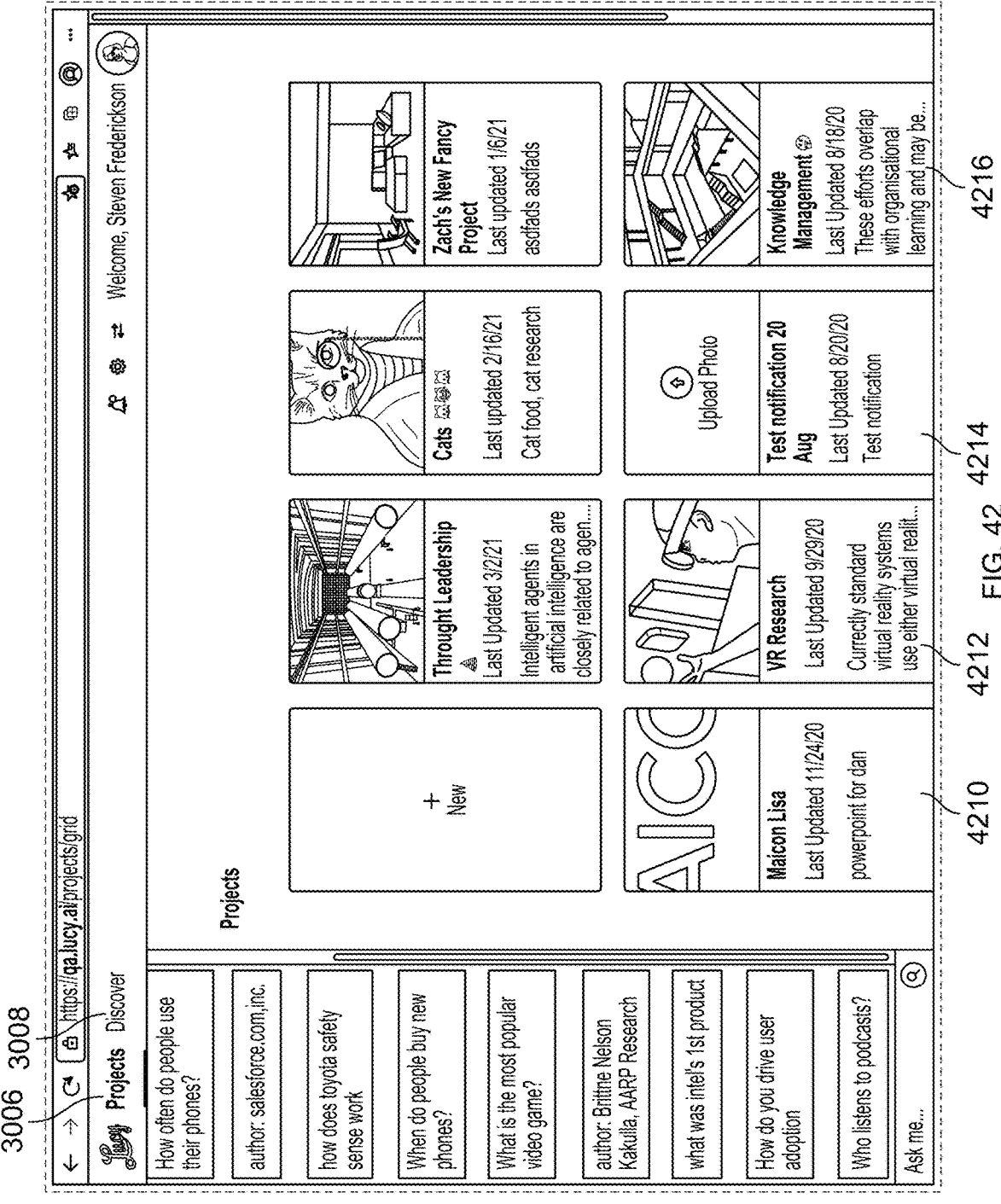
FIG. 42 shows a list of projects.

FIG. 42 shows a user interface that presents a list of existing projects 4202-4216. A computing device may present this user interface in response to user selection of the "Projects" interface element 3006, for example, when the computing device is presenting the user interface shown in FIG. 30. Each of the projects 4202-4216 may have been created/named by a user account and can represent a collection of search results saved by one or more user accounts to the project. A user can create a new project by selecting the new project interface element 4218. The Projects user interface shown in FIG. 42 is an alternative to the Projects user interface shown in FIG. 13, and the discussion with respect to FIG. 13 and following pages of how the computing system provides the list of projects also applies here, where not inconsistent.

Figure 43:
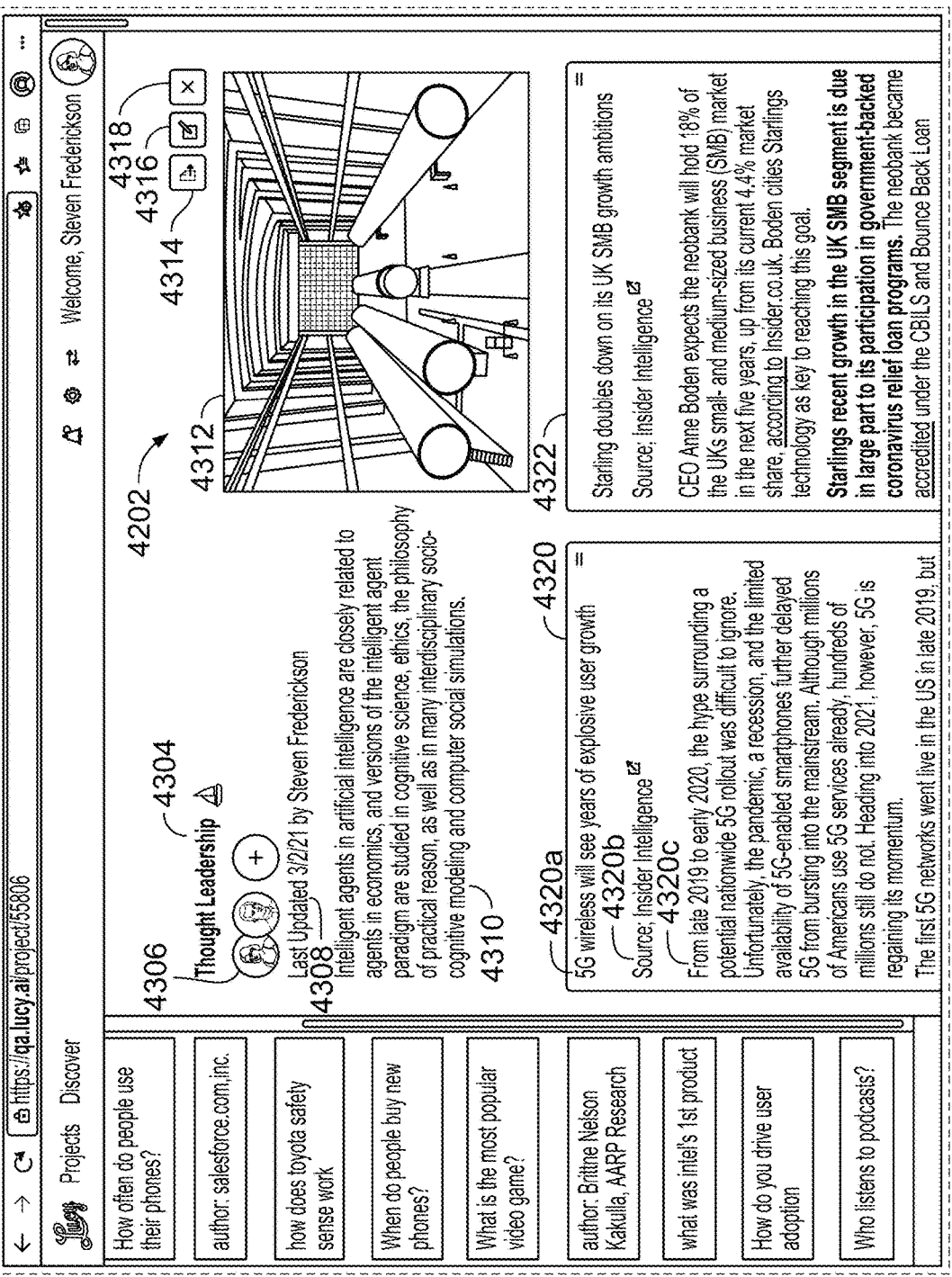
FIG. 43 shows a project page titled "Thought Leadership."

FIG. 43 shows a user interface presented by the computing device responsive to user input selecting the "Thought Leadership" project 4202 in the FIG. 42 user interface. This "Thought Leadership" project page includes a title 4304, indications of contributing users 4306 that have access to the project, an indication 4308 of the time and person that last updated the project (e.g., by adding a search result to the project), a description of the project 4310, a graphic 4312, a share selectable interface element 4314 that enables a user to share the project with another user (e.g., by inviting that user to be a contributing user), an edit button 4316 to edit various characteristics of the project, and a close selectable interface element 4318 to return to the "all projects" page shown in FIG. 42.

The "Thought Leadership" project page of FIG. 43 includes multiple search results that have each been added by a user to the project, with FIG. 43 showing search results 4320 and 4322. Each search result includes a title (e.g., title 4320*a*), an indication of the source/dataset from which the search result was retrieved (e.g., source indication 4320*b*), and a summary of the search result (e.g., summary 4320*c*). The FIG. 43 project page is an alternative presentation of the project page shown in FIGS. 14A-B.

Figure 44:
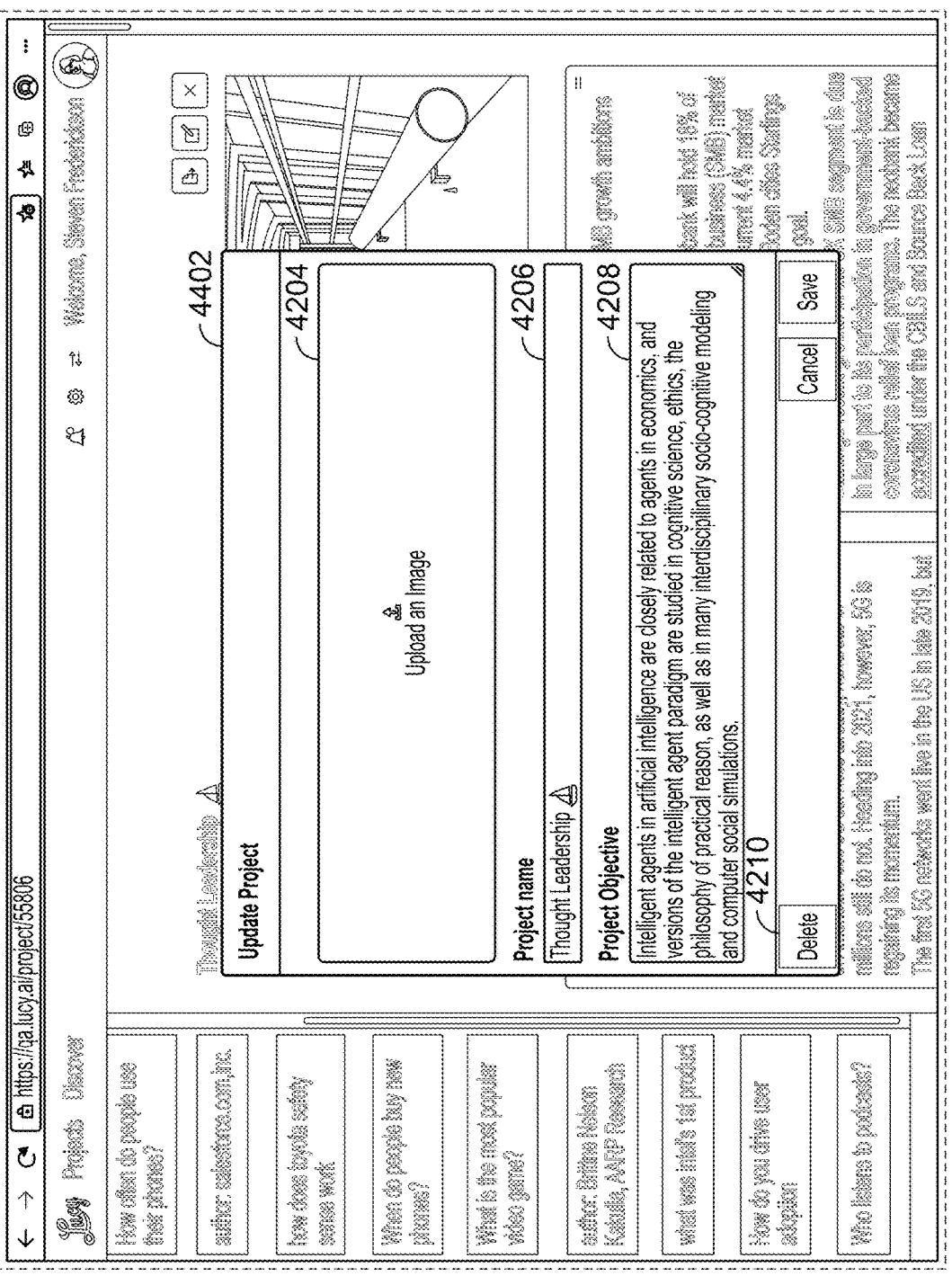
FIG. 44 shows a dialog box to edit project features.

User selection of the edit button 4316 causes the user interface to present an "Update Project" box 4402, as shown in FIG. 44. User input at the computing device can interact with this update project box 4402 to upload an image through interaction with the "Upload an image" icon, change the project name through user interaction with text field 4206, change the project description/objective through user interaction with text field 4208, or delete the project by user interaction with delete button 4210.

Figure 45:
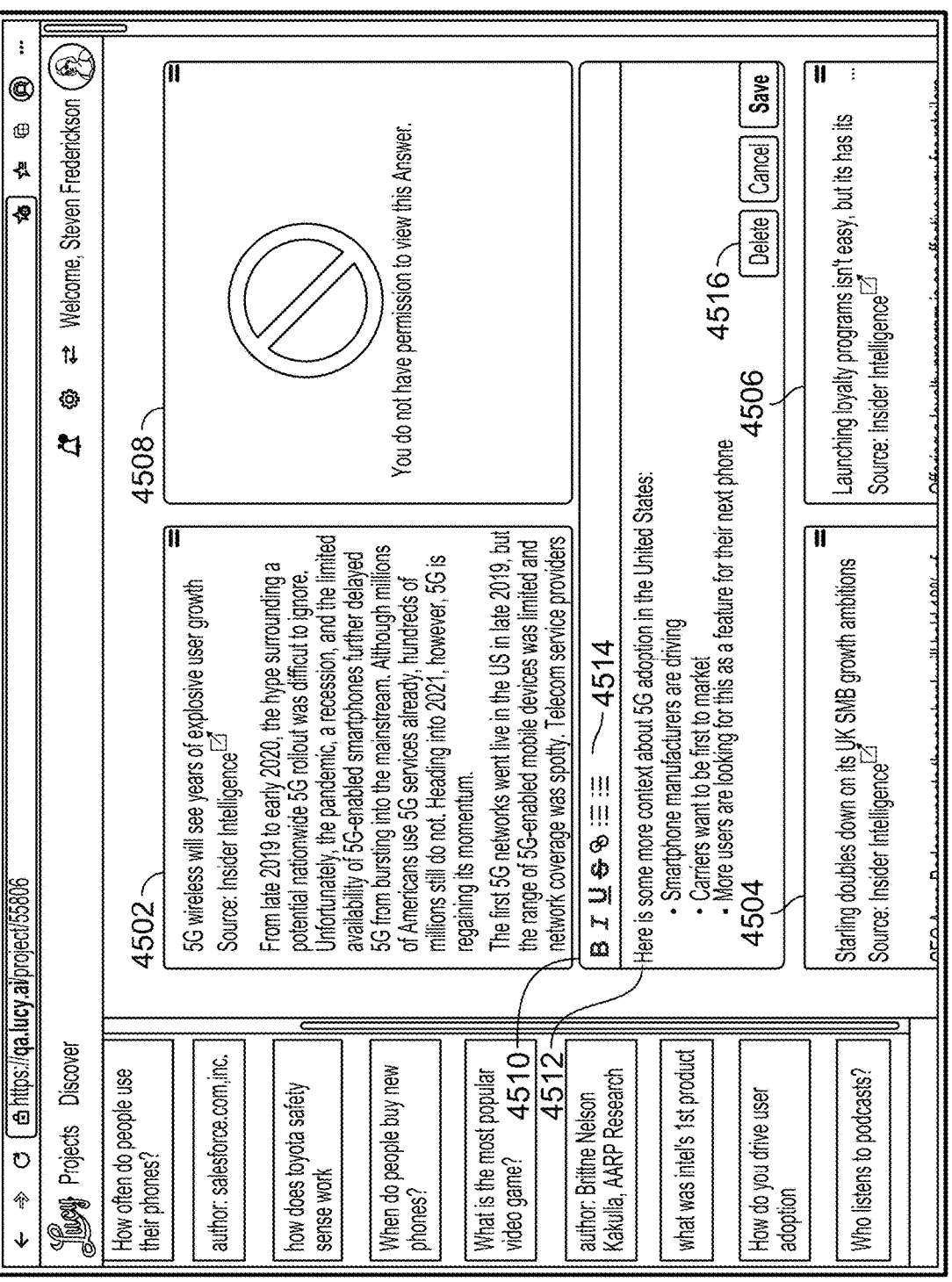
FIG. 45 shows a dialog box to add a note to a project.

FIG. 45 shows the same project page, scrolled down past the graphic to show multiple search results 4502-4506 added to the project. In this illustration (but not in FIG. 43), the project page includes an indication 4508 of a search result that is added to the project page, but to which the user account accessing the project page does not have access. This may be, for example, because the search result may be from a dataset to which the viewing user account does not have a license. As such, the FIGS. 43 and 45 user interfaces illustrate how different users may view the same project page (with result 4322 being present in FIG. 43, but not shown in FIG. 45).

The FIG. 45 user interface also shows an "add note" interface box 4510 in the middle of the search results 4502-4506. The "add note" interface box 4510 may appear responsive to user input clicking between the search results 4502-4506. The "add note" interface box 4510 may include a text field 4512 into which user input may type a note. Style buttons 4514 may be selected by user input to add emphasis, a link, or bullet points, to content in the text field 4512, as examples. A user may interact with buttons 4516 to delete the note, cancel changes made to the note, or to save the note.

Figure 46:
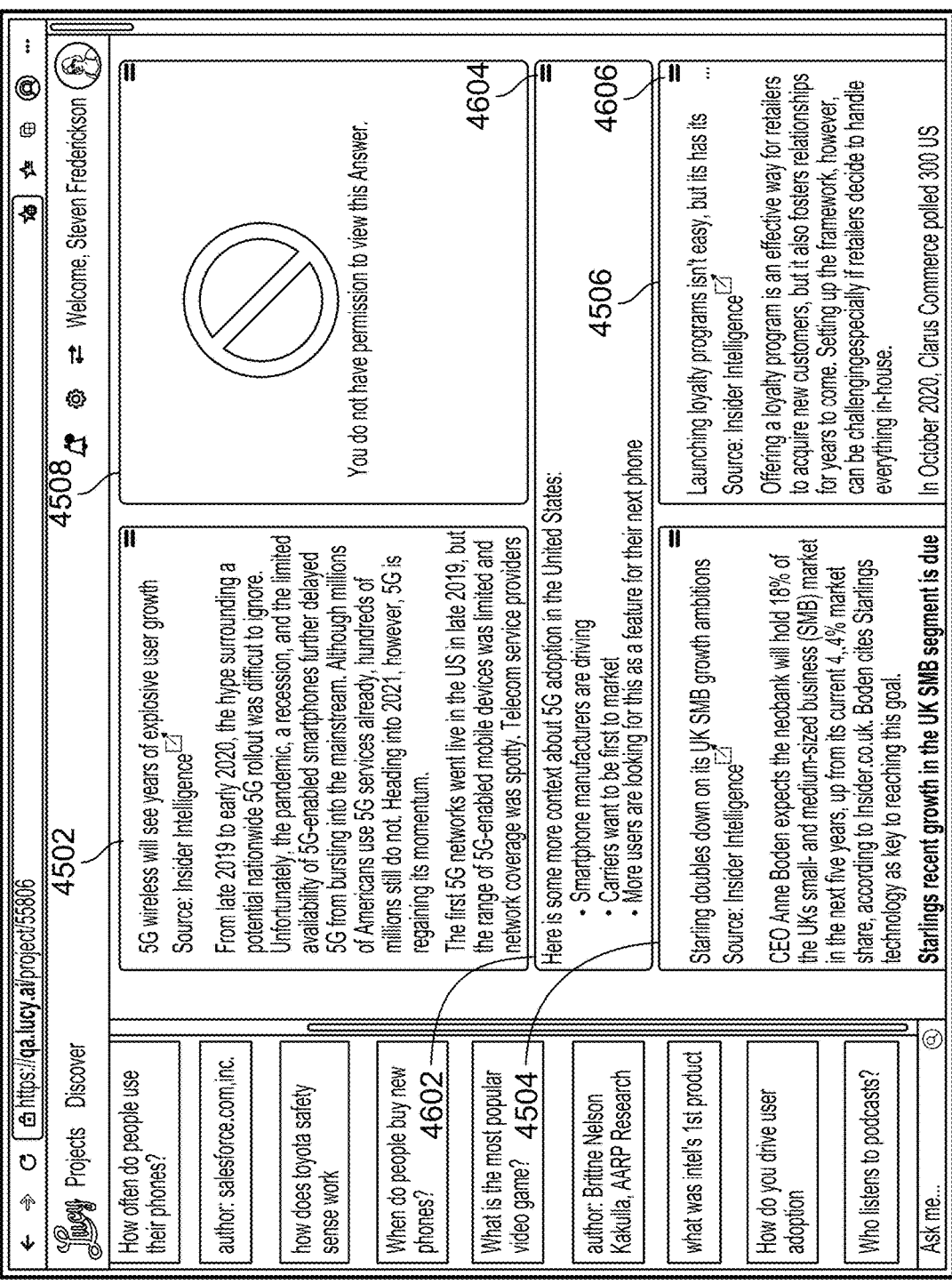
FIG. 46 shows a project page with a note included therein.

FIG. 46 shows the user interface after user input has selected the "save" button, causing the project page to present note 4602 between search results 4502-4506. The main elements of the project page can be reordered by user input, for example, by user input dragging and dropping an element to another location. For example, user input could select dragging element 4604 and move the note to be located above search result 4502, or below search results 4504-4506. The search results 4502-4506 and the indication 4508 can also be reordered.

Figure 47:
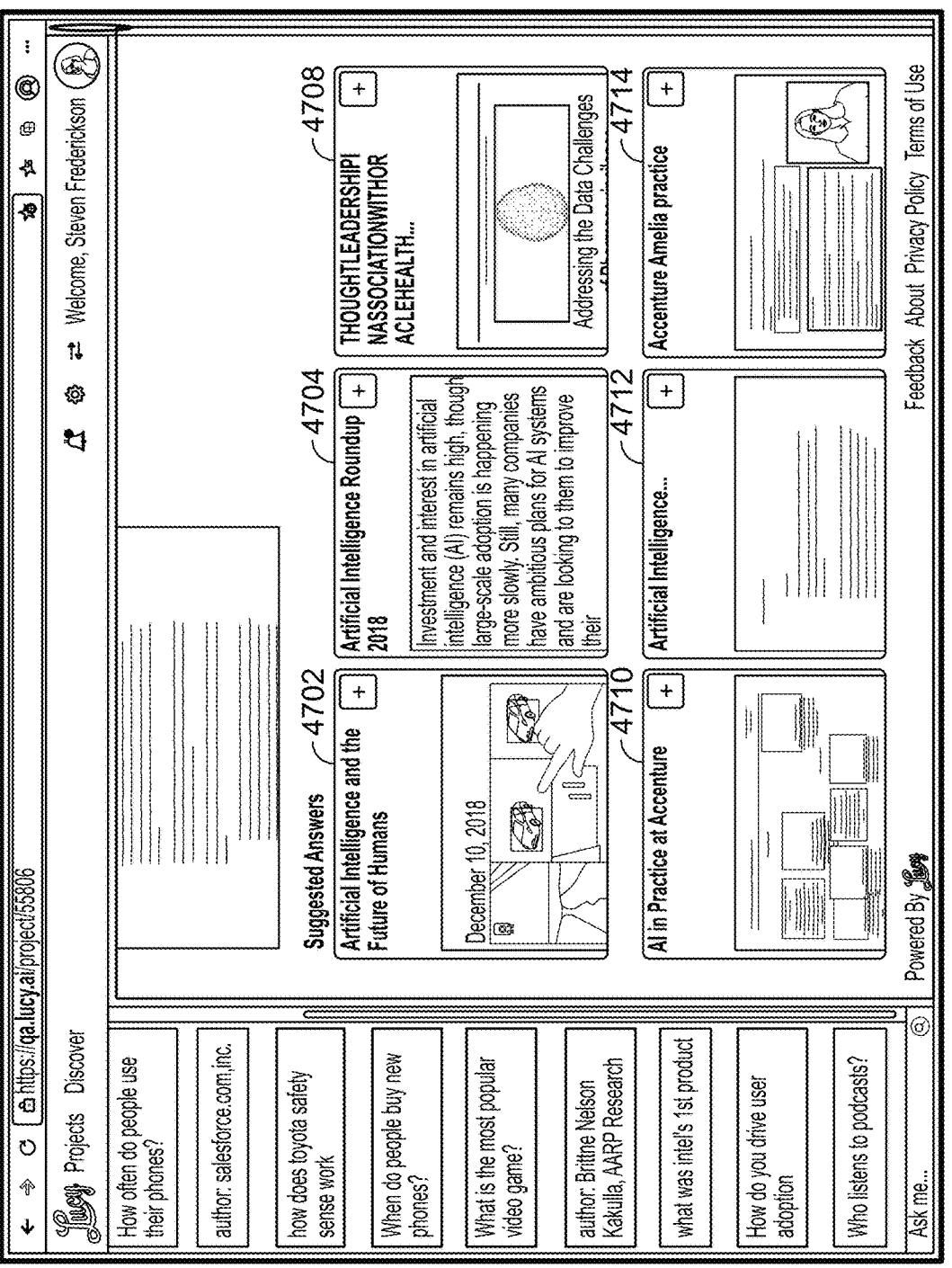
FIG. 47 shows multiple suggested results at a bottom of a project page.

FIG. 47 shows the bottom of a project page, and specifically how the bottom of the project page includes multiple suggested answers 4702-4714 (also referred to as suggested search results). Each of the suggested search results may be a search result that is potentially responsive to one or more queries. The suggested search results at the bottom of a project page may be presented based on an automatically generated and submitted query. The query may be generated by the computing system based on the user-specified title and description at the top of the project page (e.g., title 4304 and 4308 in FIG. 43). For example, the computing system may perform keyword extraction of the title and description, and generate a query based on extracted keywords, weighting keywords from the title more than keywords from the description. In some implementations, the query may alternatively or additionally be generated based on content of search results saved to the project and/or the user interest model described above.

Figure 48:
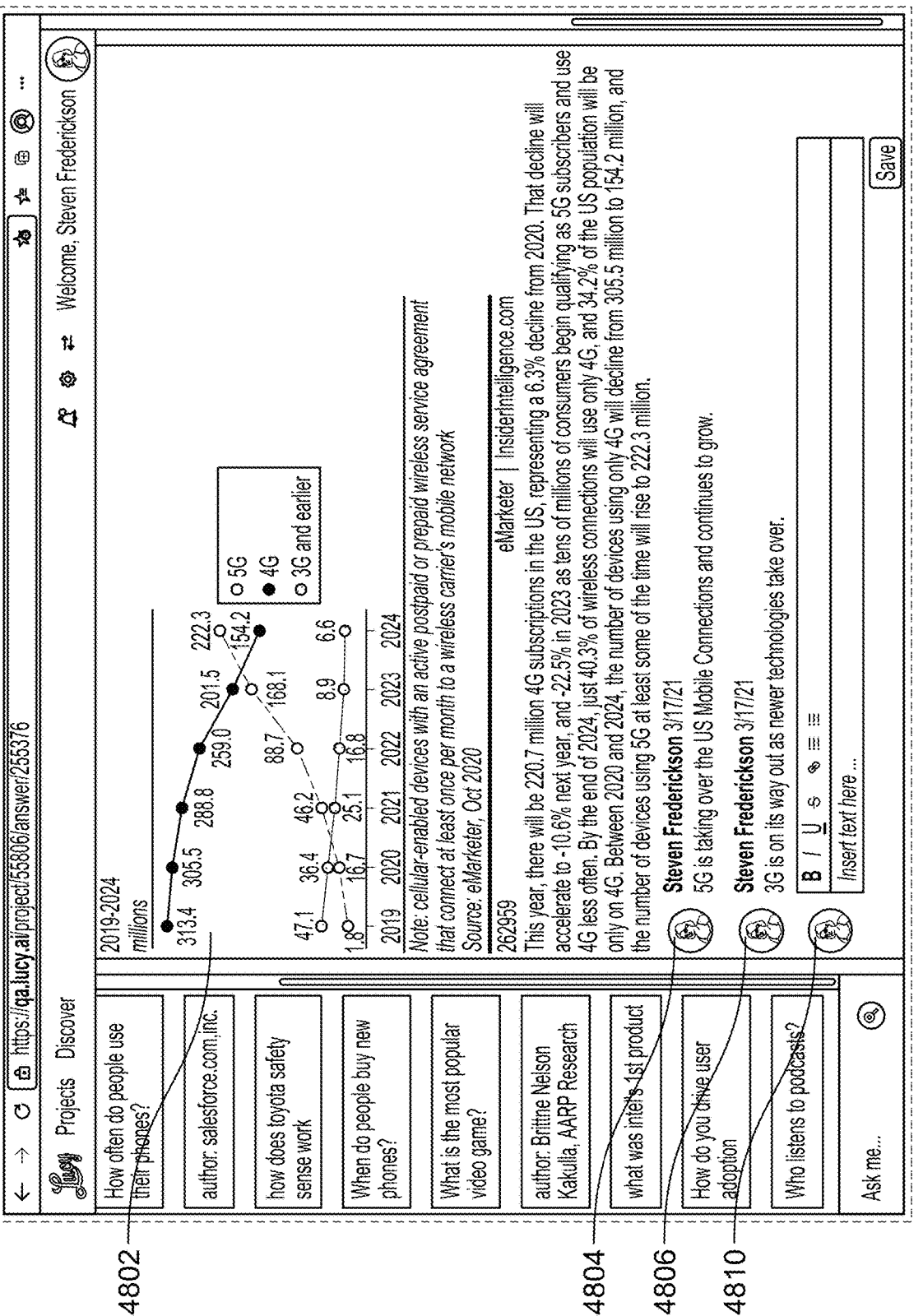
FIG. 48 shows a search result with multiple comments added thereto.
Figure 49B:
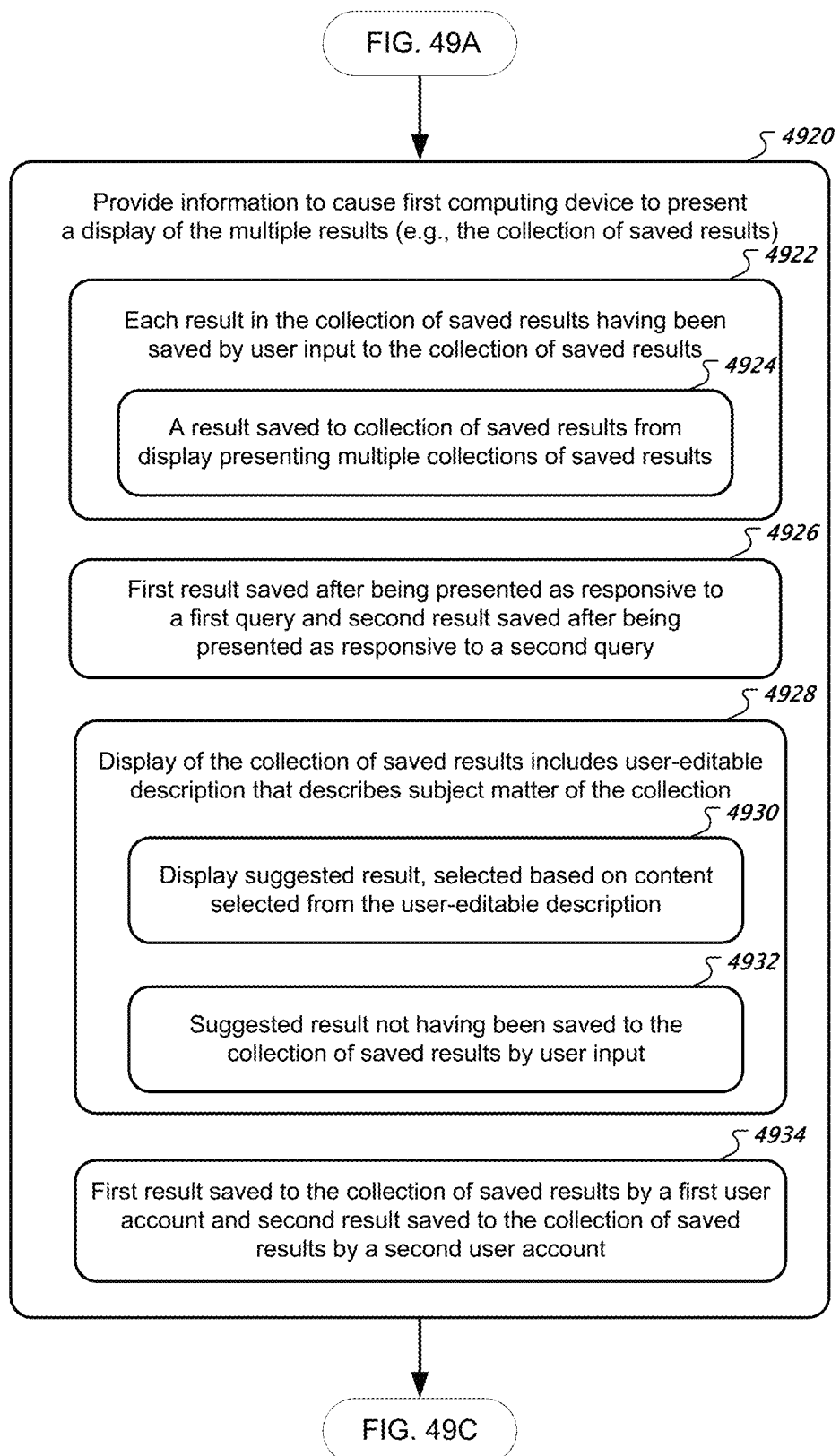
Figure 49C:
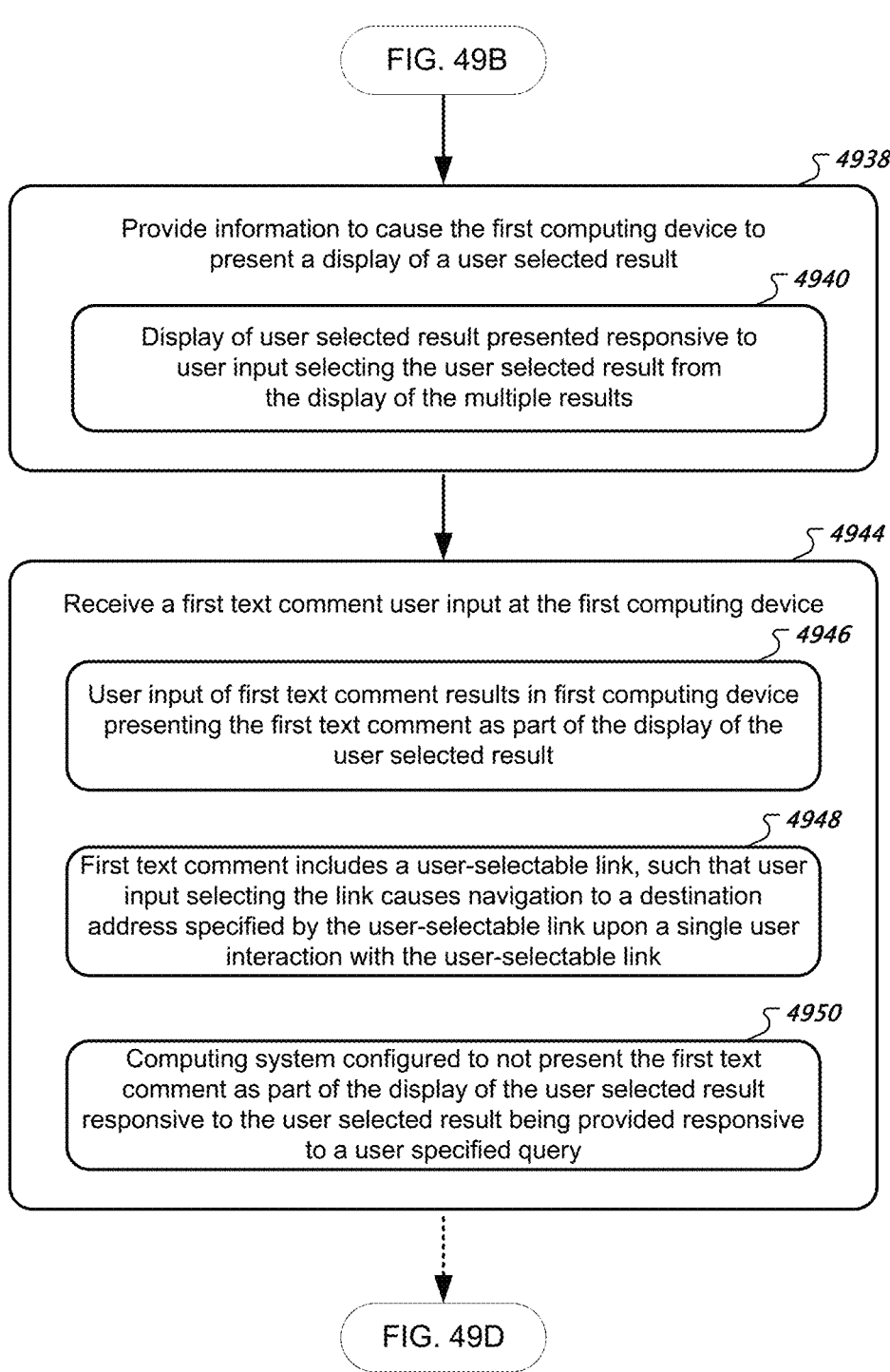
Figure 49E:
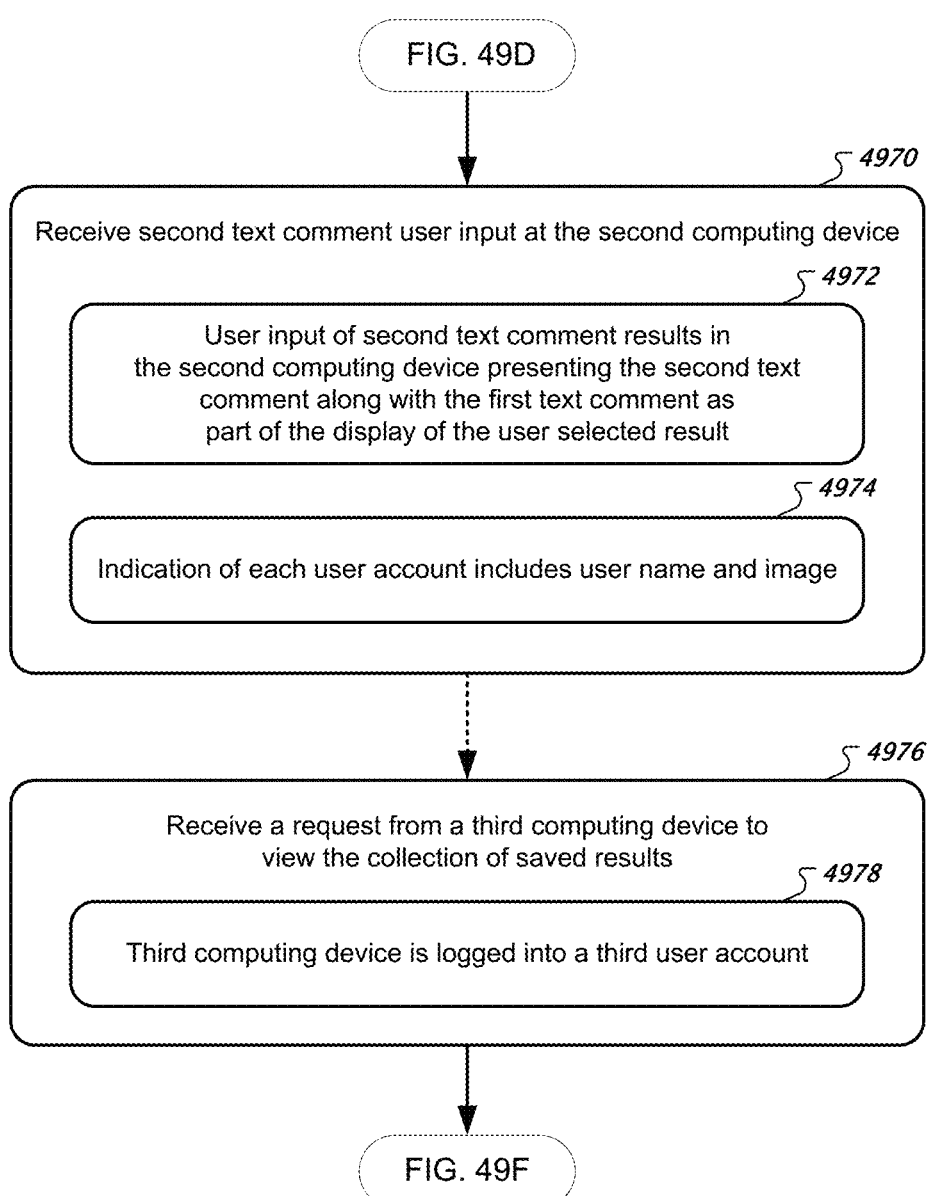
Figure 49F:
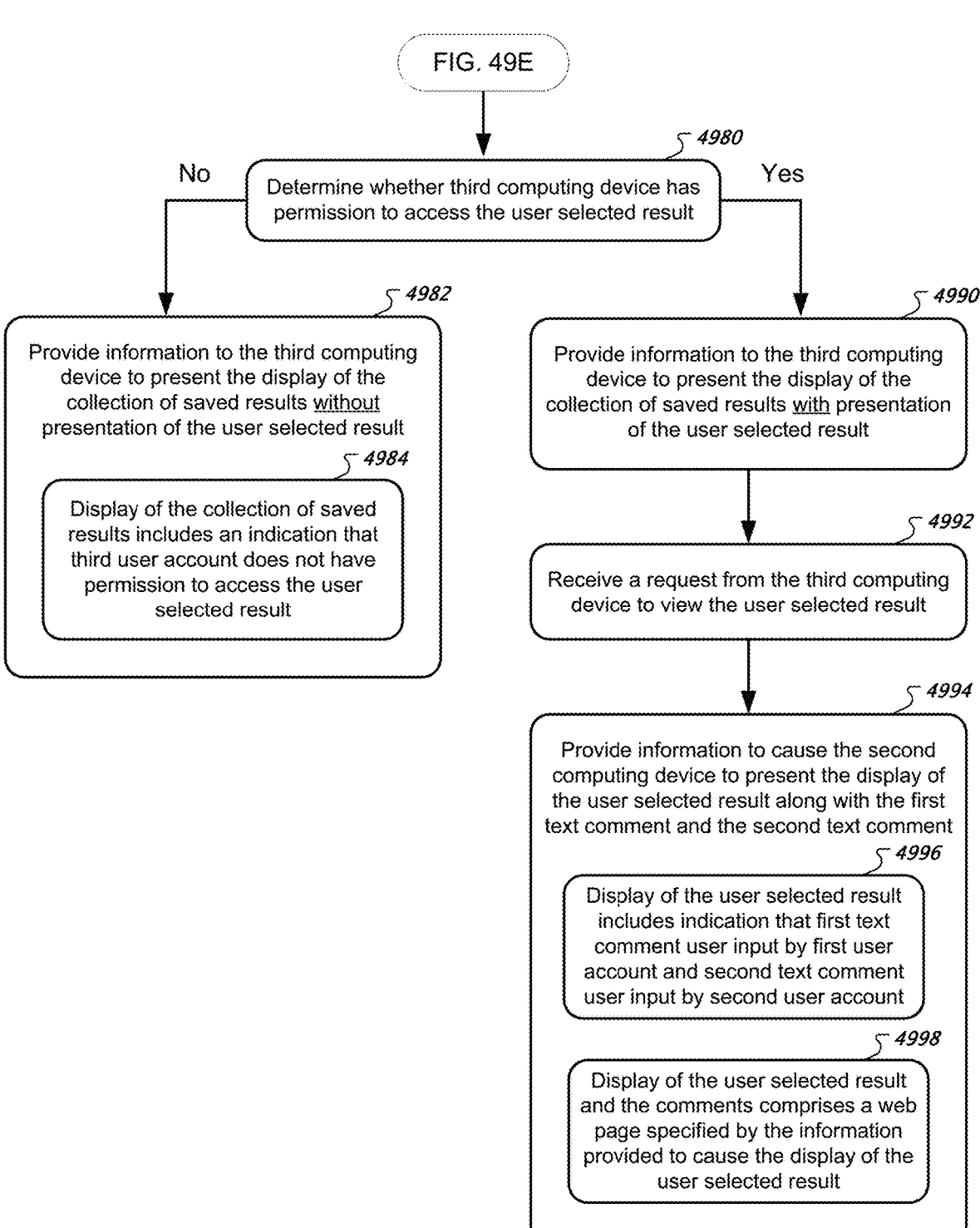

FIG. 48 shows a search result after a user has selected a search result from a project page (e.g., as a result of user selection of search result 4502 in FIG. 46). Below a main content region 4802, the search result includes multiple user comments 4804 and 4806. Each user comment includes a user picture, a user name, a date the comment was added, and text content. User input may interact with new comment interface elements 4810, which include a text input field, and elements to add emphasis to the text, add a link, and add bullets, for example.

In some implementations, user comments are unique to a project for which a search result is included. For example, a user viewing the same search result as responsive to a query may not see any user comments. To view the comments on a search result saved to a project, users that have access to the project can view the project page, select the search result with the comments, and view the comments specific to that search result. Multiple different users can comment on a single search result and see each other's time-ordered comments. As such, a single search result may have many different sets of comments, each set specific to a project page.

In some implementations, comments may be added to search results accessed after users have submitted queries. As such, the comments may not be isolated to project pages. In such implementations, comments to a specific search result may be only shown to users within a same user group (e.g., a same organization).

The content of comments may be specified by information provided by the computing system that receives queries, provides lists of search results, provides the project pages, and provides the display shown in FIG. 48. In other words, the comments are not imposed onto the web page by a widget or other third party commenting application. Rather, they are specified by the HTML file that is provided by the computing system and rendered by the computing device to provide the web page shown in FIG. 38.

FIGS. 49A-F show a flowchart of a process for commenting on a search result.

Figure 37A:
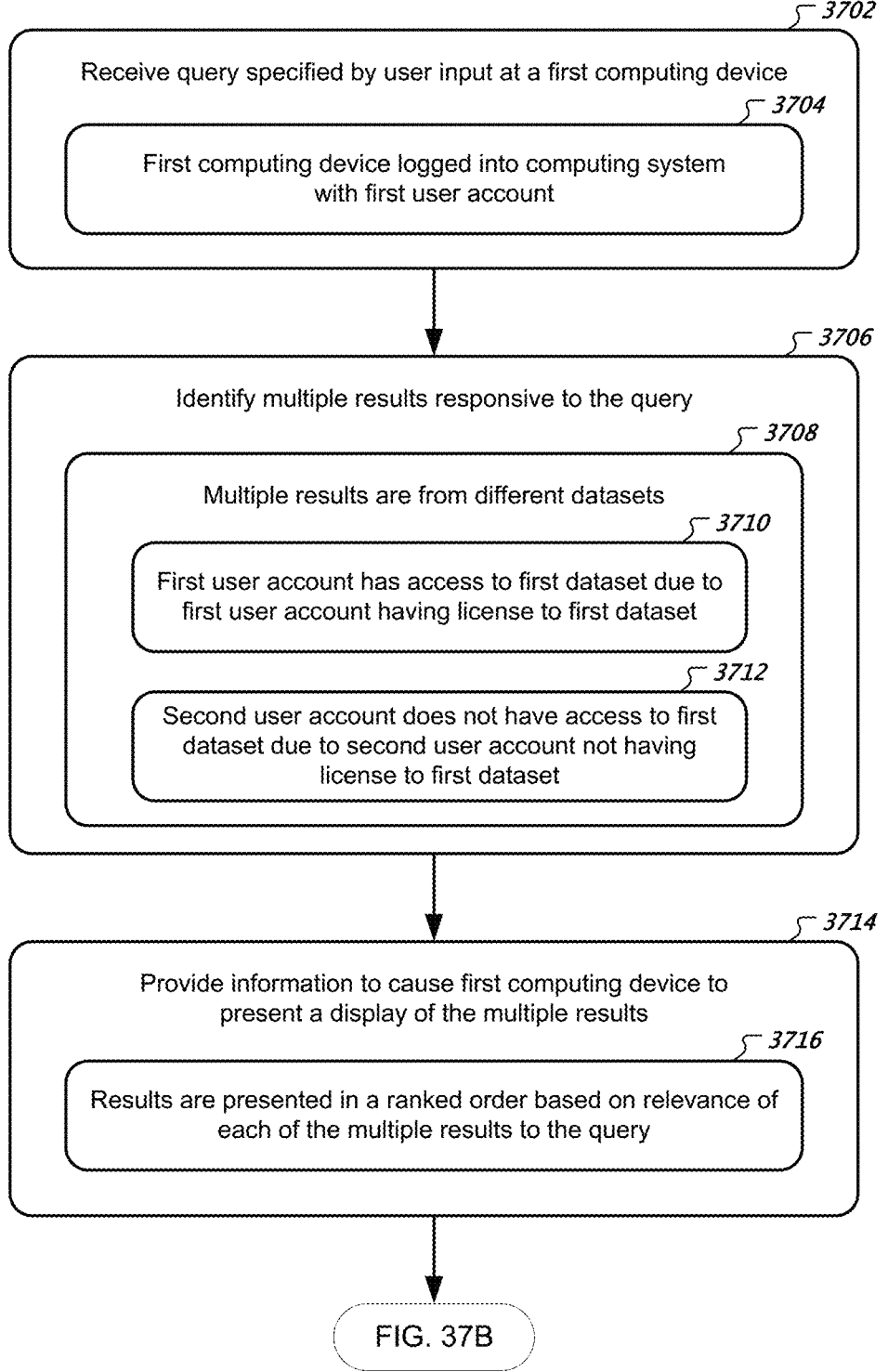
Figure 37D:
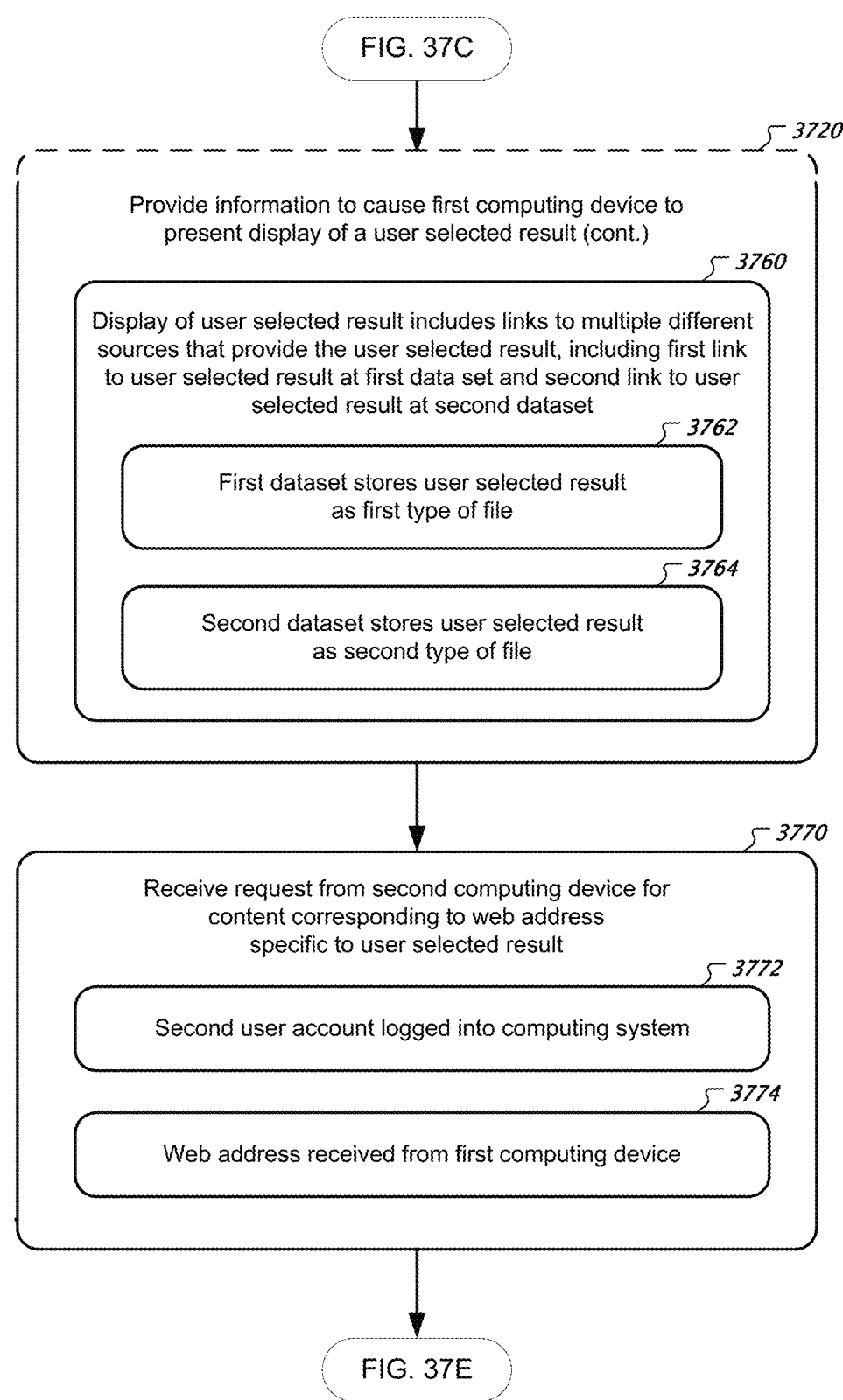
Figure 37E:
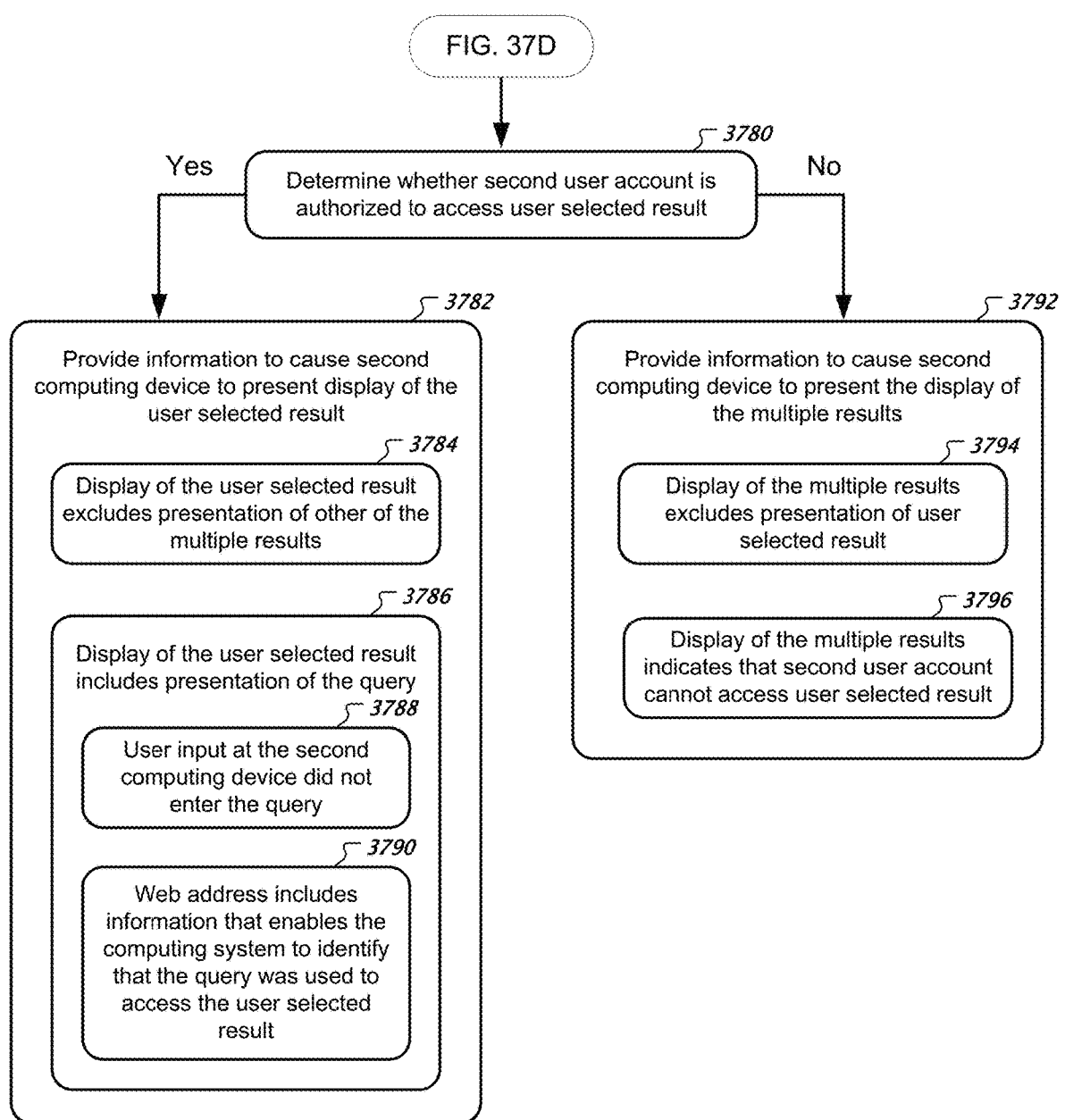

At box 4902, the computing system receives a query specified by user input at a first computing device. The operations of box 4902 may be the same or similar to the operations of box 3702 (FIG. 37A). For example, user input may type a query into the search input field 3002 (FIG. 30).

At box 4904, the computing system identifies a plurality of results responsive to the query. The operations of box 4904 may be the same as or similar to the operations of box 3706 (FIG. 37A).

At box 4906, the computing system provides information to cause the first computing device to present a display of the plurality of results. The operations of box 4906 may be the same as or similar to the operations of box 3714 (FIG. 37A).

At box 4910, the computing system receives an indication that user input at the first computing device provided user input to save a user selected result to a collection of saved results. For example, user input may interact with element 3118 (FIG. 31) to save search result 3104 to a project. Responsive to user selection of element 3118, a dialog box may appear that enables a user of the first computing device to select a project to which the search result is to be saved. For example, dialog box 1202 (FIG. 12) may appear, allowing a user to select one of multiple existing projects, or to create a new project, to which the search result is to be saved.

At box 4912, the computing system receives a request from the first computing device to view multiple results. The first computing device may be logged into a first user account with the computing system when the first computing device provides the request (box 4914).

At box 4916, the multiple results are the collection of saved results, and the request is to view the collection of saved results. For example, at some point in time after a user saved a search result to a collection of saved results, the user may interact with the first computing device to view the collection of saved results. For example, the first computing device may be presenting the user interface shown in FIG. 42, which shows multiple projects to which users have saved search results, and user input at the first computing device may select the "Thought Leadership" project 4202. In response, the first computing device may send a request to the computing system to view the "Thought Leadership" collection of saved results 4202.

At box 4918, the multiple results are presented by the first computing device responsive to submission of a search query. For example, the multiple results discussed with respect to the flowchart of FIGS. 49A-F may be results presented responsive to a search query instead of results presented as part of a project.

At box 4920, the computing system provides information to cause the first computing device to present a display of the multiple results (e.g., the collection of saved results). For example, the computing system may provide information (e.g., an HTML file) to the first computing device to cause the first computing device to present the user interface shown in FIG. 43, responsive to user input at the first computing device selecting the "Thought Leadership" project 4202 in FIG. 42.

At box 4922, each result in the collection of saved results was saved by user input to the collection of saved results. For example, each saved result shown as part of the FIG. 43 user interface (and those present when the web page is scrolled down) may have been saved to the "Thought Leadership" project responsive to user input saving the respective search result to the project.

At box 4924, at least one result was saved to the collection of saved results from a display presenting multiple collections of saved results to which the result could have been saved. For example, user input may interact with a dialog box (e.g., dialog box 1202 in FIG. 12) to save a search result to the "Thought Leadership" project from among multiple different projects to which user input is able to save the result.

At box 4926, a first result is saved to the project after being presented as responsive to a first query, and a second result is saved to the project after being presented as responsive to a second query that is different from the first query. For example, user input may have saved search result 4320 to the "Thought Leadership" project responsive to viewing search result 4320 as responsive to a first query, while user input may have saved search result 4322 to the "Thought Leadership" project responsive to viewing search result 4322 as responsive to a different query.

At box 4928, the display of the collection of saved results by the first computing device includes a user-editable description that describes a subject matter of the collection. For example, the user interface shown in FIG. 43 includes description 4308, which is user editable, as shown in FIG. 44.

At box 4930, the first computing device displays a suggested result, with the suggested result having been selected (e.g., by the computing system) based on content selected from the user-editable description. For example, one or more of the suggested search results 4702-4714 shown in FIG. 47 may have been displayed based on a query generated by the computing system based on content from the user-editable description 4308. The suggested results may not have been saved to the collection of saved results by user input (box 4932). For example, the suggested results 4702-4714 may have been presented because they were responsive to a query automatically generated by the computing system, rather than user input adding those results to the "Thought Leadership" project.

At box 4934, a first result was saved to the collection of saved results by a first user account and a second result was saved to the collection of saved results by a second user account. For example, the "Thought Leadership" project has multiple participants, as indicated by the graphical indications of contributing users 4306 (FIG. 43), and a first user may have added search result 4320 to the project, while a second user may have added search result 4322 to the project. As such, the project may be a shared interface with which multiple different users are able to collaborate and save results.

At box 4938, the computing system provides information to cause the first computing device to present a display of a user selected result. For example, the computing system may provide at least an HTML file to cause the first computing device to present a display of the search result, as shown in FIG. 48 (which may show a single search result). The display of the user selected result may be presented responsive to user input selecting the user selected result from the display of the multiple results. For example, a computing device may display the user interface shown in FIG. 48 responsive to user selection of a search result among a display of search results that comprise a project.

At box 4944, the computing system receives a first text comment user input at the first computing device. For example, user input may interact with the text input box provided as part of the new comment interface elements 4810 (FIG. 48), type a comment, and select the "Save" button. In response, the first computing device may send the typed comment to the computing system.

At box 4946, the user input of the first text comment results in the first computing device presenting the first text comment as part of the display of the user selected result. For example, responsive to user input typing the comment and selecting the "Save" button in FIG. 48, the typed information may appear as a comment on the display of the user selected result (e.g., as comments 4804 and 4806 appear in FIG. 48).

At box 4948, the first text comment includes a user-selectable link, such that user input selecting the link causes navigation to a destination address specified by the user-selectable link upon a single user interaction with the user-selectable link. For example, user input may interact with the "link" button that is part of the new comment interface elements 4810, to include a link as part of the comment. Once the comment is added to the display of the user selected result, the comment may include a link that can be selected by a single user input tap (touchscreen) or click (mouse selection).

At box 4950, the computing system is configured to not present the first text comment as part of the display of the user selected result, responsive to the user selected result being provided responsive to a user specified query. For example, should a user submit a query to the computing system and receive a list of search results in response (one of which is the selected search result shown in FIG. 48) and select the selected search result, the user may be presented with a display similar to that shown in FIG. 48 but without presentation of the comments 4804-4806 and without presentation of the new comment interface elements 4810. Accordingly, the comments 4804-4806 may be specific to a project, and may only be viewed when a user accesses the search result from the project.

In some implementations, a user may view comments and the new comment interface elements 4810, but the comments may be different because the user did not access the search result through a project. In such implementations, users may see comments submitted on a search result by users within a same user group (e.g., a same organization).

At box 4954, the computing system receives a request from a second computing device to view the collection of saved results. For example, a different user that has used the second computing device to log into the computing system with a second user account may select the "Thought Leadership" project 4202 in the user interface of FIG. 42.

At box 4956, the computing system provides information to cause the second computing device to present a display of the collection of saved results. For example, the computing system may send an HTML file and other resources to the second computing device to cause the second computing to present the project page shown in FIG. 43.

At box 4958, the computing system receives an indication that user input at the second computing device reordered a displayed order of the collection of saved results. For example, user input may click on dragging element 4606, drag search result 4506 to a different location, and drop that search result at the different location to change an order in which search results are displayed in the user interface shown in FIG. 46.

At box 4962, the computing system receives a request from the second computing device to view the user selected result (continuing the nomenclature "the user selected result", based on the result having been selected at the first user account). For example, user input at the second computing device may select search result 4502, and in response, second computing device may send to the computing system a request for a web page that presents search result 4502. At box 4964, the second computing device may be logged into the second user account when sending the request for the selected search result.

At box 4966, the computing system provides information to cause the second computing device to present the display of the user selected result, along with the first text comment. For example, the computing system may provide an HTML file and other resources to the second computing device to cause the second computing device to present the user interface shown in FIG. 48, which includes multiple comments 4804-4806.

At box 4970, the computing system receives a second text comment based on user input at the second computing device. For example, user input at the second computing device may specify a comment using the new comment interface elements 4810 (although showing a picture for the second user account rather than for the "Steve Frederickson" user account), select the "Save" button, and in response the second computing device may send the second text comment to the computing system. Responsive to selecting the "Save" button, the newly-added user comment may be added to the user interface shown in FIG. 48 below comments 4804 and 4806 (box 4972).

At box 4974, each comment may include an indication of the user account that provided the comment, including a user name and an image. For example, the first two comments in FIG. 48 may each display the name "Steven Frederickson" and an image uploaded by the user account "Steven Frederickson".

At box 4976, the computing system receives a request from a third computing device to view the collection of saved results. For example, a third computing device that is logged into a third user account with the computing system (box 4976) may select the "Thought Leadership" project 4202 shown in the FIG. 42 user interface. In response, the third computing device may send a request to the computing system.

At box 4980, the computing system determines whether the third computing device has permission to access the user selected result (here again, the "user selected result" being nomenclature for the result selected at the first computing device). For example, the computing system may determine whether the third user account has access to view search result 4322 (FIG. 43). Determining whether the third computing device has access to the search result can include determining whether the third user account is able to access the data source (e.g., dataset) from which the computing system retrieved the search result 4322.

If the third computing device has permission to access the search result, the computing system (at box 4990) provides information to the third computing device to present the display of the collection of saved results with presentation of the user selected result.

At box 4992, the computing system may receive a request from the third computing device to view the user selected result. For example, user input at the third computing device may select the search result 4332 (FIG. 43), and in response provide a request to the computing system.

At box 4994, the computing system provides information to cause the computing device to present the display of the user selected result along with the first text comment and the second text comment. For example, the computing system may send an HTML file and other resources to the third computing device to cause the third computing device to present a user interface similar to that shown in FIG. 48, except specific to content from search result 4332 and including comments from both the first and second user accounts (the FIG. 48 user interface shows only comments from a single user account).

At box 4996, the display of the user selected result includes an indication that the first comment was user input by the first user account and an indication that the second text comment was user input by the second user account. For example, a first comment on the page may include a name and picture for the first user account (e.g., "Steven Frederickson"), and a second comment on the page may include a name and picture for the second user account (e.g., "Dan Mallin").

At box 4998, the display of the user selected result and the comments are presented by a web page specified by the information provided by the computing system. As such, the HTML file may specify the comments.

If the third computing device does not have permission to access the search result, the computing system (at box 4982) provides information to the third computing device to present the display of the collection of saved results without presentation of the user selected result. For example, the computing system may send an HTML file and resources to cause the third computing device to present the user interface of FIG. 45, which does not include a presentation of search result 4322 (see FIG. 53).

At box 4984, the display of the collection of saved results includes an indication that the third user account does not have permission to access the user selected result. For example, the user interface shown in FIG. 45 includes an indication 4508 that the viewing user account does not have access to a search result that is part of the project.

Figure 50:
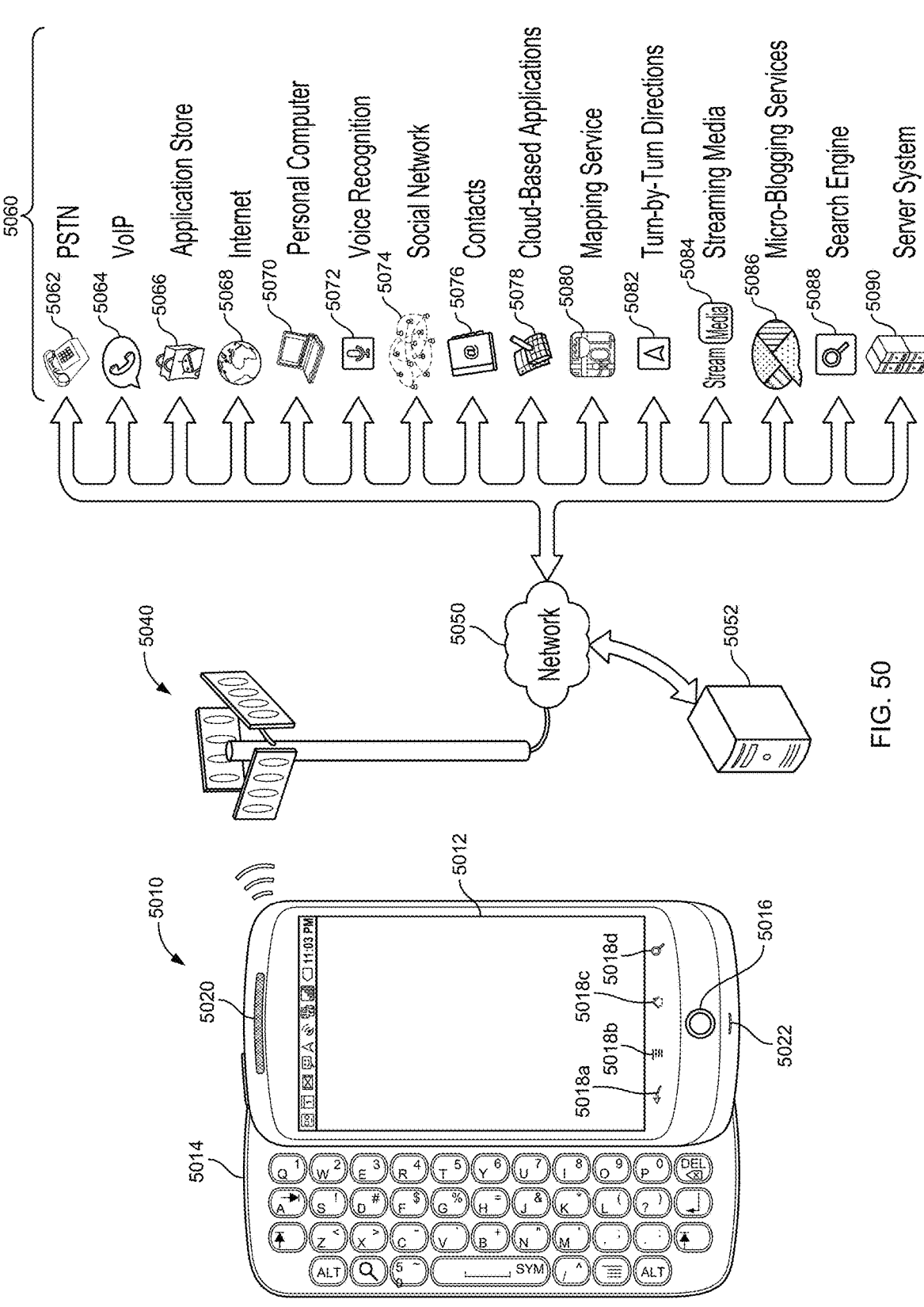
FIG. 50 is a conceptual diagram of a system that may be used to implement the systems and methods described in this document.

Referring now to FIG. 50, a conceptual diagram of a system that may be used to implement the systems and methods described in this document is illustrated. In the system, mobile computing device 5010 can wirelessly communicate with base station 5040, which can provide the mobile computing device wireless access to numerous hosted services 5060 through a network 5050.

In this illustration, the mobile computing device 5010 is depicted as a handheld mobile telephone (e.g., a smartphone, or an application telephone) that includes a touchscreen display device 5012 for presenting content to a user of the mobile computing device 5010 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 5014, physical buttons, trackballs, accelerometers, gyroscopes, and magnetometers).

Example visual output mechanism in the form of display device 5012 may take the form of a display with resistive or capacitive touch capabilities. The display device may be for displaying video, graphics, images, and text, and for coordinating user touch input locations with the location of displayed information so that the device 5010 can associate user contact at a location of a displayed item with the item. The mobile computing device 5010 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 5014, which may be a full qwerty keyboard or a traditional keypad that includes keys for the digits '0-9', '*', and '#.' The keyboard 5014 receives input when a user physically contacts or depresses a keyboard key. User manipulation of a trackball 5016 or interaction with a track pad enables the user to supply directional and rate of movement information to the mobile computing device 5010 (e.g., to manipulate a position of a cursor on the display device 5012).

The mobile computing device 5010 may be able to determine a position of physical contact with the touchscreen display device 5012 (e.g., a position of contact by a finger or a stylus). Using the touchscreen 5012, various "virtual" input mechanisms may be produced, where a user interacts with a graphical user interface element depicted on the touchscreen 5012 by contacting the graphical user interface element. An example of a "virtual" input mechanism is a "software keyboard," where a keyboard is displayed on the touchscreen and a user selects keys by pressing a region of the touchscreen 5012 that corresponds to each key.

The mobile computing device 5010 may include mechanical or touch sensitive buttons 5018*a-d*. Additionally, the mobile computing device may include buttons for adjusting volume output by the one or more speakers 5020, and a button for turning the mobile computing device on or off. A microphone 5022 allows the mobile computing device 5010 to convert audible sounds into an electrical signal that may be digitally encoded and stored in computer-readable memory, or transmitted to another computing device. The mobile computing device 5010 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 5010 may present a graphical user interface with the touchscreen 5012. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 5004. User-selection of the button may invoke the pre-defined action.

In some examples, the operating system provides a "desktop" graphical user interface that is displayed after turning on the mobile computing device 5010, after activating the mobile computing device 5010 from a sleep state, after "unlocking" the mobile computing device 5010, or after receiving user-selection of the "home" button 5018*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 5010 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 5012 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 5010 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 5010 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 5010. The mobile device 5010 may include a digital camera sensor, and corresponding image and video capture and editing software. An internet browser may enable the user to view content from a web page by typing in an addresses corresponding to the web page or selecting a link to the web page.

The mobile computing device 5010 may include an antenna to wirelessly communicate information with the base station 5040. The base station 5040 may be one of many base stations in a collection of base stations (e.g., a mobile telephone cellular network) that enables the mobile computing device 5010 to maintain communication with a network 5050 as the mobile computing device is geographically moved. The computing device 5010 may alternatively or additionally communicate with the network 5050 through a Wi-Fi router or a wired connection (e.g., ETHERNET, USB, or FIREWIRE). The computing device 5010 may also wirelessly communicate with other computing devices using BLUETOOTH protocols, or may employ an ad-hoc wireless network.

A service provider that operates the network of base stations may connect the mobile computing device 5010 to the network 5050 to enable communication between the mobile computing device 5010 and other computing systems that provide services 5060. Although the services 5060 may be provided over different networks (e.g., the service provider's internal network, the Public Switched Telephone Network, and the Internet), network 5050 is illustrated as a single network. The service provider may operate a server system 5052 that routes information packets and voice data between the mobile computing device 5010 and computing systems associated with the services 5060.

The network 5050 may connect the mobile computing device 5010 to the Public Switched Telephone Network (PSTN) 5062 in order to establish voice or fax communication between the mobile computing device 5010 and another computing device. For example, the service provider server system 5052 may receive an indication from the PSTN 5062 of an incoming call for the mobile computing device 5010. Conversely, the mobile computing device 5010 may send a communication to the service provider server system 5052 initiating a telephone call using a telephone number that is associated with a device accessible through the PSTN 5062.

The network 5050 may connect the mobile computing device 5010 with a Voice over Internet Protocol (VOIP) service 5064 that routes voice communications over an IP network, as opposed to the PSTN. For example, a user of the mobile computing device 5010 may invoke a VoIP application and initiate a call using the program. The service provider server system 5052 may forward voice data from the call to a VoIP service, which may route the call over the internet to a corresponding computing device, potentially using the PSTN for a final leg of the connection.

An application store 5066 may provide a user of the mobile computing device 5010 the ability to browse a list of remotely stored application programs that the user may download over the network 5050 and install on the mobile computing device 5010. The application store 5066 may serve as a repository of applications developed by third-party application developers. An application program that is installed on the mobile computing device 5010 may be able to communicate over the network 5050 with server systems that are designated for the application program. For example, a VoIP application program may be downloaded from the Application Store 5066, enabling the user to communicate with the VoIP service 5064.

The mobile computing device 5010 may access content on the internet 5068 through network 5050. For example, a user of the mobile computing device 5010 may invoke a web browser application that requests data from remote computing devices that are accessible at designated universal resource locations. In various examples, some of the services 5060 are accessible over the internet.

The mobile computing device may communicate with a personal computer 5070. For example, the personal computer 5070 may be the home computer for a user of the mobile computing device 5010. Thus, the user may be able to stream media from his personal computer 5070. The user may also view the file structure of his personal computer 5070, and transmit selected documents between the computerized devices.

A voice recognition service 5072 may receive voice communication data recorded with the mobile computing device's microphone 5022, and translate the voice communication into corresponding textual data. In some examples, the translated text is provided to a search engine as a web query, and responsive search engine search results are transmitted to the mobile computing device 5010.

The mobile computing device 5010 may communicate with a social network 5074. The social network may include numerous members, some of which have agreed to be related as acquaintances. Application programs on the mobile computing device 5010 may access the social network 5074 to retrieve information based on the acquaintances of the user of the mobile computing device. For example, an "address book" application program may retrieve telephone numbers for the user's acquaintances. In various examples, content may be delivered to the mobile computing device 5010 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 5010 may access a personal set of contacts 5076 through network 5050. Each contact may identify an individual and include information about that individual (e.g., a phone number, an email address, and a birthday). Because the set of contacts is hosted remotely to the mobile computing device 5010, the user may access and maintain the contacts 5076 across several devices as a common set of contacts.

The mobile computing device 5010 may access cloud-based application programs 5078. Cloud-computing provides application programs (e.g., a word processor or an email program) that are hosted remotely from the mobile computing device 5010, and may be accessed by the device 5010 using a web browser or a dedicated program. Example cloud-based application programs include GOOGLE DOCS word processor and spreadsheet service, GOOGLE GMAIL webmail service, and PICASA picture manager.

Mapping service 5080 can provide the mobile computing device 5010 with street maps, route planning information, and satellite images. An example mapping service is GOOGLE MAPS. The mapping service 5080 may also receive queries and return location-specific results. For example, the mobile computing device 5010 may send an estimated location of the mobile computing device and a user-entered query for "pizza places" to the mapping service 5080. The mapping service 5080 may return a street map with "markers" superimposed on the map that identify geographical locations of nearby "pizza places."

Turn-by-turn service 5082 may provide the mobile computing device 5010 with turn-by-turn directions to a user-supplied destination. For example, the turn-by-turn service 5082 may stream to device 5010 a street-level view of an estimated location of the device, along with data for providing audio commands and superimposing arrows that direct a user of the device 5010 to the destination.

Various forms of streaming media 5084 may be requested by the mobile computing device 5010. For example, computing device 5010 may request a stream for a pre-recorded video file, a live television program, or a live radio program. Example services that provide streaming media include YOUTUBE and PANDORA.

A micro-blogging service 5086 may receive from the mobile computing device 5010 a user-input post that does not identify recipients of the post. The micro-blogging service 5086 may disseminate the post to other members of the micro-blogging service 5086 that agreed to subscribe to the user.

A search engine 5088 may receive user-entered textual or verbal queries from the mobile computing device 5010, determine a set of internet-accessible documents that are responsive to the query, and provide to the device 5010 information to display a list of search results for the responsive documents. In examples where a verbal query is received, the voice recognition service 5072 may translate the received audio into a textual query that is sent to the search engine.

These and other services may be implemented in a server system 5090. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 51:
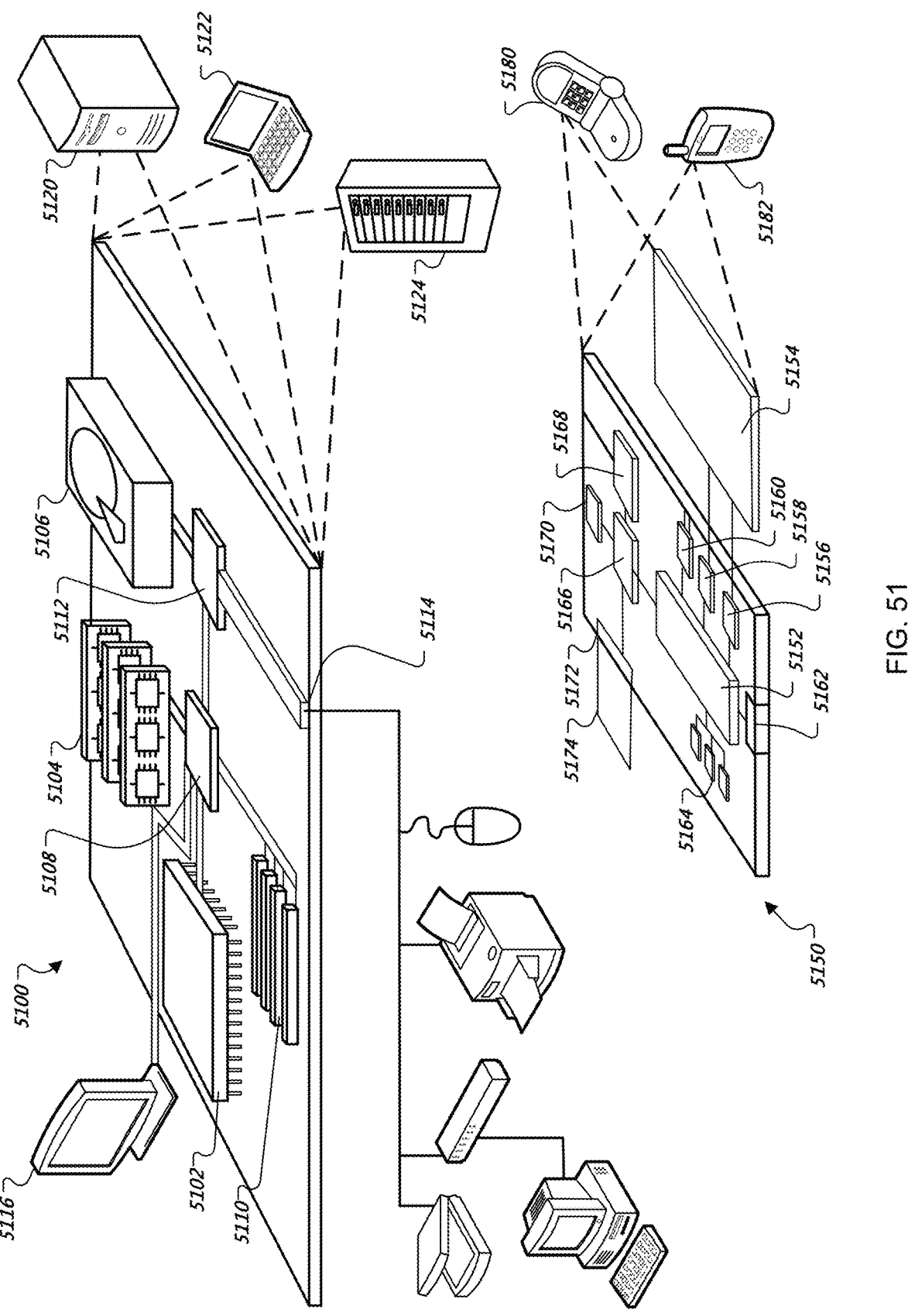
FIG. 51 is a block diagram of computing devices that may be used to implement the systems and methods described in this document, as either a client or as a server or plurality of servers.

FIG. 51 is a block diagram of computing devices 5100, 5150 that may be used to implement the systems and methods described in this document, as either a client or as a server or plurality of servers. Computing device 5100 is intended to represent various forms of digital computers, such as laptops, desktops, workstations, personal digital assistants, servers, blade servers, mainframes, and other appropriate computers. Computing device 5150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 5100 includes a processor 5102, memory 5104, a storage device 5106, a high-speed interface 5108 connecting to memory 5104 and high-speed expansion ports 5110, and a low speed interface 5112 connecting to low speed bus 5114 and storage device 5106. Each of the components 5102, 5104, 5106, 5108, 5110, and 5112, are interconnected using various busses, and may be mounted on a common motherboard or in other manners as appropriate. The processor 5102 can process instructions for execution within the computing device 5100, including instructions stored in the memory 5104 or on the storage device 5106 to display graphical information for a GUI on an external input/output device, such as display 5116 coupled to high-speed interface 5108. In other implementations, multiple processors and/or multiple buses may be used, as appropriate, along with multiple memories and types of memory. Also, multiple computing devices 5100 may be connected, with each device providing portions of the necessary operations (e.g., as a server bank, a group of blade servers, or a multi-processor system).

The memory 5104 stores information within the computing device 5100. In one implementation, the memory 5104 is a volatile memory unit or units. In another implementation, the memory 5104 is a non-volatile memory unit or units. The memory 5104 may also be another form of computer-readable medium, such as a magnetic or optical disk.

The storage device 5106 is capable of providing mass storage for the computing device 5100. In one implementation, the storage device 5106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 5104, the storage device 5106, or memory on processor 5102.

The high-speed controller 5108 manages bandwidth-intensive operations for the computing device 5100, while the low speed controller 5112 manages lower bandwidth-intensive operations. Such allocation of functions is an example only. In one implementation, the high-speed controller 5108 is coupled to memory 5104, display 5116 (e.g., through a graphics processor or accelerator), and to high-speed expansion ports 5110, which may accept various expansion cards (not shown). In the implementation, low-speed controller 5112 is coupled to storage device 5106 and low-speed expansion port 5114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 5100 may be implemented in a number of different forms, as shown in the figure. For example, it may be implemented as a standard server 5120, or multiple times in a group of such servers. It may also be implemented as part of a rack server system 5124. In addition, it may be implemented in a personal computer such as a laptop computer 5122. Alternatively, components from computing device 5100 may be combined with other components in a mobile device (not shown), such as device 5150. Each of such devices may contain one or more of computing device 5100, 5150, and an entire system may be made up of multiple computing devices 5100, 5150 communicating with each other.

Computing device 5150 includes a processor 5152, memory 5164, an input/output device such as a display 5154, a communication interface 5166, and a transceiver 5168, among other components. The device 5150 may also be provided with a storage device, such as a microdrive or other device, to provide additional storage. Each of the components 5150, 5152, 5164, 5154, 5166, and 5168, are interconnected using various buses, and several of the components may be mounted on a common motherboard or in other manners as appropriate.

The processor 5152 can execute instructions within the computing device 5150, including instructions stored in the memory 5164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 5150, such as control of user interfaces, applications run by device 5150, and wireless communication by device 5150.

Processor 5152 may communicate with a user through control interface 5158 and display interface 5156 coupled to a display 5154. The display 5154 may be, for example, a TFT (Thin-Film-Transistor Liquid Crystal Display) display or an OLED (Organic Light Emitting Diode) display, or other appropriate display technology. The display interface 5156 may comprise appropriate circuitry for driving the display 5154 to present graphical and other information to a user. The control interface 5158 may receive commands from a user and convert them for submission to the processor 5152. In addition, an external interface 5162 may be provided in communication with processor 5152, so as to enable near area communication of device 5150 with other devices. External interface 5162 may provide, for example, for wired communication in some implementations, or for wireless communication in other implementations, and multiple interfaces may also be used.

The memory 5164 stores information within the computing device 5150. The memory 5164 can be implemented as one or more of a computer-readable medium or media, a volatile memory unit or units, or a non-volatile memory unit or units. Expansion memory 5174 may also be provided and connected to device 5150 through expansion interface 5172, which may include, for example, a SIMM (Single In Line Memory Module) card interface. Such expansion memory 5174 may provide extra storage space for device 5150, or may also store applications or other information for device 5150. Specifically, expansion memory 5174 may include instructions to carry out or supplement the processes described above, and may include secure information also. Thus, for example, expansion memory 5174 may be provided as a security module for device 5150, and may be programmed with instructions that permit secure use of device 5150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 5164, expansion memory 5174, or memory on processor 5152 that may be received, for example, over transceiver 5168 or external interface 5162.

Device 5150 may communicate wirelessly through communication interface 5166, which may include digital signal processing circuitry where necessary. Communication interface 5166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 5168. In addition, short-range communication may occur, such as using a Bluetooth, WiFi, or other such transceiver (not shown). In addition, GPS (Global Positioning System) receiver module 5170 may provide additional navigation- and location-related wireless data to device 5150, which may be used as appropriate by applications running on device 5150.

Device 5150 may also communicate audibly using audio codec 5160, which may receive spoken information from a user and convert it to usable digital information. Audio codec 5160 may likewise generate audible sound for a user, such as through a speaker, e.g., in a handset of device 5150.

Such sound may include sound from voice telephone calls, may include recorded sound (e.g., voice messages, music files, etc.) and may also include sound generated by applications operating on device 5150.

The computing device 5150 may be implemented in a number of different forms, as shown in the figure. For example, it may be implemented as a cellular telephone 5180. It may also be implemented as part of a smartphone 5182, personal digital assistant, or other similar mobile device.

Additionally, computing device 5100 or 5150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

As additional description to the embodiments described above, the present disclosure describes the following embodiments.

Routing to One of Two Datasets

Embodiment 1 is a computer-implemented method. The method comprises receiving, by a computing system, a first query that was specified by user input at a computing device, wherein the computing system has access to one or more datasets of structured data and one or more datasets of unstructured data. The method comprises identifying, by the computing system, whether the one or more datasets of structured data have data for answering the first query. The method comprises requesting, by the computing system and as a result of having determined that the one or more datasets of structured data do not have data for answering the first query, a search of the one or more datasets of unstructured data that is based on the first query. The method comprises receiving, by the computing system, multiple results to the search of the one or more datasets of unstructured data, wherein the multiple results are each associated with a query relevance score that indicates a relevance to the first query. The method comprises providing, by the computing system, the multiple results for presentation by the computing device as responsive to the first query, in a ranked order that is based on the query relevance score for each of the multiple results.

Embodiment 2 is the computer-implemented method of embodiment 1, wherein identifying whether the one or more datasets of structured data have data for answering the first query includes: (i) requesting, by the computing system, that a process identify any one or more entities in the first query, (ii) receiving, by the computing system, an indication of one or more recognized entities in the first query, and (iii) determining, by the computing system, whether the one or more datasets of structured data store information for the one or more recognized entities, wherein a determination that the one or more datasets of structured data store information for the one or more recognized entities results in an identification that the one or more datasets of structured data have data for answering the first query, and wherein a determination that the one or more datasets of structured data do not store information for the one or more recognized entities results in an identification that the one or more datasets of structured data do not have data for answering the first query.

Embodiment 3 is the computer-implemented method of embodiments 1 or 2. The method comprises receiving, by the computing system, a second query that was specified by user input at the computing device. The method comprises identifying, by the computing system, whether the one or more datasets of structured data have data for answering the second query. The method comprises requesting, by the computing system and as a result of having determined that the one or more datasets of structured data have data for answering the second query, that a database query be performed on the one or more datasets of structured data. The method comprises receiving, by the computing system, a result to the database query that was performed on the one or more datasets of structured data. The method comprises providing, by the computing system, the result to the database query for presentation by the computing device as a sole result to the second query.

Embodiment 4 is the computer-implemented method of embodiment 3. The method further comprises identifying, by the computing system, a relevance score for the result to the database query. The method further comprises determining, by the computing system, whether the relevance score for the result to the database query satisfies a threshold value. The method further comprises providing, by the computing system as a result of determining that the relevance score for the result to the database query does not satisfy the threshold value, multiple suggested queries for presentation by the computing device along with the sole result to the second query, wherein the computing system is configured to not send the multiple suggested queries for presentation by the computing device as a result of a determination that the relevance score for the result to the database query satisfies the threshold value.

Embodiment 5 is the method of embodiment 4. The method further comprises identifying, by the computing system and for each of the multiple suggested queries, a query relevance score that identifies a relevance of the respective suggested query to the second query, wherein providing the multiple suggested queries for presentation by the computing device along with the sole result to the second query includes providing the multiple suggested queries in a ranked order based on the query relevance score for each of the multiple suggested queries.

Embodiment 6 is the method of any one of embodiments 1 through 6. The method further comprises determining, by the computing system, whether a query relevance score for a highest-ranked of the multiple results satisfies a threshold value. As a result of having determined that the query relevance score for the highest-ranked of the multiple results satisfies the threshold value, the computing system is configured to provide the multiple results for presentation by the computing device with the highest-ranking of the multiple results expanded and a remainder of the multiple results collapsed but user-expandable. As a result of having determined that the query relevance score for the highest-ranking of the multiple results does not satisfy the threshold value, the computing system is configured to provide the multiple results for presentation by the computing device with all of the multiple results collapsed but user-expandable.

Embodiment 7 is directed to one or more computer-readable device having instructions stored thereon, that when executed by one or more processors, cause the performance of actions according to the method of any one of embodiments 1 through 6.

Searching Multiple Datasets

Embodiment 1 is directed to a computer-implemented method. The method comprises receiving, by a computing system, a query that was specified by user input at a computing device. The method comprises identifying, by the computing system, multiple datasets that are available to be queried. The method comprises identifying, by the computing system, a ranking of the multiple datasets. The method comprises requesting, by the computing system, a search of a highest-ranked of the multiple datasets, based on the query. The method comprises determining, by the computing system, that the search of the highest-ranked of the multiple datasets did not yield a result. The method comprises requesting, by the computing system, a search of a lower-ranked of the multiple data sets in response to having determined that the search of the highest-ranked of the multiple datasets did not yield the result. The method comprises receiving, by the computing system, a result to the search of the lower-ranked of the multiple datasets. The method comprises providing, by the computing system, the result to the search of the lower-ranked of the multiple datasets for presentation by the computing device as responsive to the query that was specified by user input at the computing device.

Embodiment 2 is directed to the computer-implemented method of embodiment 1. The method comprises receiving, by the computing system, data that ranks the multiple datasets and that was specified by user input at the computing device.

Embodiment 3 is directed to the computer-implemented method of embodiment 1. The method comprises receiving, by the computing system, data that ranks the multiple datasets and that was specified by user input at another computing device while the another computing device was logged into a first user account. The method comprises determining, by the computing system, that the query that was specified by user input at the computing device occurred while the computing device was logged into a second user account. The method comprises associating, by the computing system, the ranking of the multiple data sets that was specified by the user input at the another computing device with the second user account, as a result of the first user account and the second user account being identified by the computing system as being associated with a same organization.

Embodiment 4 is directed to the computer-implemented method of embodiment 1, wherein the computing system is configured to query no additional dataset in the multiple data sets as a result of having received the result to the search of the lower-ranked of the multiple datasets, even though the multiple datasets include one or more datasets that are ranked lower than the lower-ranked of the multiple datasets.

Embodiment 5 is directed to the computer-implemented method of embodiment 1, wherein the computing system is configured to request searches of the multiple data sets in order based on the ranking of the multiple datasets until a result to one of the searches is received, at which point the computing system is configured to query no additional datasets of the multiple data sets.

Embodiment 6 is directed to the computer-implemented method of embodiment 1. The method comprises determining, by the computing system, that searches of each of the multiple datasets did not yield a result, wherein each of the multiple datasets is a dataset of structured data. The method comprises requesting, by the computing system and as a result of having determined that the searches of each of the multiple datasets did not yield a result, a search of one or more datasets of unstructured data that is based on the query. The method comprises receiving, by the computing system, multiple results to the search of the one or more datasets of unstructured data. The method comprises providing, by the computing system, the multiple results for presentation by the computing device as responsive to the query.

Embodiment 7 is the computer-implemented method of embodiment 1, wherein identifying, by the computing system, multiple datasets that are available to be queried includes: identifying, by the computing system, one or more entities in the query, and determining, by the computing system, the multiple datasets as being a subset of a plurality of datasets that are identified as storing information on the one or more recognized entities.

Embodiment 8 is directed to one or more computer-readable device having instructions stored thereon, that when executed by one or more processors, cause the performance of actions according to the method of any one of embodiments 1 through 7.

Selecting Datasets

Embodiment 1 is a computer-implemented method. The method comprises receiving, by a computing system, a query that was specified by user input at a computing device, wherein the query was specified by the user input while the computing device was logged into a particular user account. The method comprises identifying, by the computing system, a default set of multiple datasets that are available for searching. The method comprises identifying, by the computing system, one or more permissions associated with the particular user account. The method comprises identifying, by the computing system, one or more additional datasets that are available for searching due to the one or more permissions indicating that the particular user account has access to the one or more additional datasets. The method comprises requesting, by the computing system, a search of the default set of multiple datasets and the one or more additional datasets that is based on the query. The method comprises receiving, by the computing system, one or more results to the search of the default set of the multiple datasets and the one or more additional datasets. The method comprises providing, by the computing system, the one or more results for presentation by the computing device.

Embodiment 2 is the computer-implemented method of embodiment 1, wherein the permissions that are associated with the user account indicate that an organization with which the particular user account is affiliated has paid a license to access the one or more additional datasets.

Embodiment 3 is the computer-implemented method of embodiment 2, wherein the computing system stores: (i) second permissions associated with a second user account, and which indicate that a second organization with which the second user account is affiliated has paid a license to access the one or more additional datasets, wherein the computing system is configured to search the one or more additional datasets in response to receiving a query affiliated with the second user account, and (ii) third permissions associated with a third user account, and which indicate that a third organization with which the third user account is affiliated has not paid a license to access the one or more additional datasets, wherein the computing system is configured to not search the one or more additional datasets in response to receiving a query affiliated with the third user account.

Embodiment 4 is the computer-implemented method of embodiment 1. The method comprises receiving, by the computing system, a first portion of the one or more additional datasets from a different organization that is distinct from an organization that operates the computing system. The method comprises receiving, by the computing system, an indication from the different organization that the particular user account has paid for a license to access the first portion of the one or more additional datasets. The method comprises setting, by the computing system and as a result of having received the indication from the different organization, at least part of the one or more permissions associated with the particular user account to indicate that the first portion of the one or more additional datasets are available for searching by the particular user account.

Embodiment 5 is the computer-implemented method of embodiment 4. The method further comprises receiving, by the computing system, a second portion of the one or more additional datasets from another computing device while the another computing device was logged into another user account. The method comprises receiving, by the computing system, an indication from the another computing device, while the another computing device was logged into another user account, that the particular user account is affiliated with a same organization as the another user account. The method comprises setting, by the computing system and as a result of having received the second portion of the one or more additional datasets from the another computing device and having received the indication that the particular user account is affiliated with the same organization as the another user account, at least part of the permissions associated with the particular user account, in order to specify that the second portion of the one or more additional datasets are available for searching by the particular user account.

Embodiment 6 is the computer-implemented method of embodiment 5, wherein the one or more results provided for presentation by the computing device include: (i) at least one result from the default set of multiple datasets, (ii) at least one result from the first portion of the one or more additional datasets, and (iii) at least one result from the second portion of the one or more additional datasets.

Embodiment 7 is directed to one or more computer-readable device having instructions stored thereon, that when executed by one or more processors, cause the performance of actions according to the method of any one of embodiments 1 through 6.

Saving Answers

Embodiment 1 is a computer-implemented method. The method comprises receiving, by a computing system, a query that was specified by user input at a computing device. The method comprises identifying, by the computing system, one or more results to the query. The method comprises providing, by the computing system, the one or more results for presentation by the computing device. The method comprises receiving, by the computing system, an indication that user input at the computing device provided input to save a user-selected result, of the one or more results, for later presentation. The method comprises receiving, by the computing system, a request to present the computing device with a display of saved results to search queries. The method comprises providing, by the computing system, data that is for receipt by the computing device and that is configured to cause the computing device to present the display of saved results to search queries, including a presentation of the user-selected result and a second user-selected result.

Embodiment 2 is the computer-implemented method of embodiment 1, wherein the data that is provided for receipt by the computing device is configured to cause the computing device to present: (i) the user-selected result along with the query that was specified by user input at the computing device, and (ii) the second user-selected result along with a second query for which the second result was identified as a result.

Embodiment 3 is the computer-implemented method of embodiment 2. The method comprises receiving, by the computing device, the second query as having been specified by user input at a second computing device, wherein the second query is different from the first query. The method comprises identifying, by the computing system, one or more second results to the second query. The method comprises providing, by the computing system, the one or more second results for presentation by the second computing device. The method comprises receiving, by the computing system, an indication that user input at the computing device provided input to save the second user-selected result, of the one or more second results, for later presentation.

Embodiment 4 is the computer-implemented method of embodiment 3. The method comprises identifying, by the computing system, that the user-selected result was selected by user input at the computing device while the computing device was logged into a first user account. The method comprises identifying, by the computing system, that the second user-selected result was selected by user input at the second computing device while the second computing device was logged into a second user account. The method comprises determining, by the computing system, that the first user account and the second user account are assigned to a same group profile of multiple user accounts. The method comprises selecting, by the computing system as a result of the computing system having determined that the first user account and the second user account are assigned to the same group profile, the user selected result and the second user-selected result for presentation by the computing device in the display of saved results to search queries, while the computing device is logged into the first user account, to the exclusion of results that were selected by user input at other computing devices while those computing device were logged into user accounts that are not assigned to the same group profile.

Embodiment 5 is the computer-implemented method of embodiment 4, wherein: the display of saved results includes an indication that the user-selected result was selected through use of the first user account; and the display of saved results includes an indication that the second user-selected result was selected through use of the second user account.

Embodiment 6 is the computer-implemented method of any one of embodiments 1 through 5. The method comprises receiving, by the computing system, an indication that user input at the computing device selected a particular saved-results screen, from among multiple saved-results screens, to which the user-selected result was to be saved. The method comprises receiving, by the computing system, an indication that user input at the computing device selected the particular saved-results screen to view, from among the multiple saved-results screens, wherein the computing system provides the data that is configured to cause the computing device to present the display of the saved results to search queries in response to having received the indication that the user input at the computing device selected the particular saved-results screen to view.

Embodiment 7 is directed to one or more computer-readable device having instructions stored thereon, that when executed by one or more processors, cause the performance of actions according to the method of any one of embodiments 1 through 6.

Recommending Questions.

Embodiment 1 is a computer-implemented method. The method comprises receiving, by a computing system, a request to provide a computing device with a list of suggested queries. The method comprises identifying, by the computing system, that a particular term has occurred frequently in documents that have published within a recent time period. The method comprises selecting, by the computing system as a result of having identified that the particular term has occurred frequently in documents that have published within the recent time period, a particular query to include in the list of suggested queries, from among a list of queries that have been previously submitted to the computing system, based on the computing system determining that the particular query includes the particular term. The method comprises providing, by the computing system, data for receipt by the computing device that is configured to cause the computing device to present the list of suggested queries, which includes the particular query. The method comprises receiving, by the computing system, an indication that user input at the computing device selected the particular query from the presented list of suggested queries. The method comprises identifying, by the computing system, one or more results to the particular query. The method comprises providing, by the computing system, the one or more results to the particular query for receipt and presentation by the computing device.

Embodiment 2 is the computer-implemented method of embodiment 1, wherein selecting the particular query to include in the list of suggested queries, based on the computing system determining that the particular query includes the particular term includes: assigning a score to the particular query that is more relevantly-weighted as a result of the particular query including the particular term than if the particular query did not include the particular term; and selecting queries to include in the list of suggested queries, including the particular query, based on scores of the queries.

Embodiment 3 is the computer-implemented method of embodiment 1, wherein the data that is provided for receipt by the computing device is configured to cause the computing device to present the list of suggested queries concurrently with a display of a text entry field with which user input is able to specify a query to which the computing system is able to identify a responsive result.

Embodiment 4 is the computer-implemented method of embodiment 1, wherein identifying, by the computing system, that the particular term has occurred frequently in documents that have published within the recent time period includes identifying that that the particular term has occurred more frequently in the documents that have published within the recent time period than in documents that were published within a time period that pre-dates the recent time period.

Embodiment 5 is the computer-implemented method of embodiment 1, wherein: the particular term is a name of an organization; and the documents that have published within the recent time period includes news articles that have published within at least the last day.

Embodiment 6 is the computer-implemented method of embodiment 1, wherein: the data that is configured to cause the computing device to present the list of suggested queries is provided to the computing device while the computing device is logged into a particular user account and is provided due to the computing device being logged into the particular user account. The method comprises identifying, by the computing system a collection of queries that have been submitted through use of user accounts that are assigned to a same group profile as the particular user account. The method comprises identifying, by the computing system, a second term that has occurred frequently in the collection of queries. The method comprises selecting, by the computing system as a result of having identified that the particular term has occurred frequently in the collection of queries, a second query to include in the list of suggested queries, from the collection of queries, based on the computing system determining that the second query includes the second term.

Embodiment 7 is the method of embodiment 6, wherein identifying the second term that has occurred frequently in the collection of queries includes identifying that the second term has occurred frequently over a second recent time period in the collection of queries.

Embodiment 8 is directed to one or more computer-readable device having instructions stored thereon, that when executed by one or more processors, cause the performance of actions according to the method of any one of embodiments 1 through 7.

Mapping Target to Channel.

Embodiment is a computer-implemented method. The method comprises receiving, by a computing system, a query that was specified by user input at a computing device, wherein the query specifies a keyword. The method comprises requesting, by the computing system, that a search be performed to identify a plurality of social network messages that were authored by multiple authors and that include the keyword. The method comprises requesting, by the computing system, an analysis of the identified plurality of social network messages to identify an aggregate profile of the group that specifies: (i) a first value for a first personality attribute of the group, and (ii) a first value for a second personality attribute of the group. The method comprises receiving, by the computing system, an indication that user input at the computing device selected a first type of publication from among multiple types of publications. The method comprises identifying, by the computing system, a publication profile for a publication of the first type of publication that was generated based on analysis of content contained in multiple instances of the publication of the first type of publication, the profile specifying: (i) a second value for a first personality attribute of the publication, and (ii) a second value for the second personality attribute of the publication. The method comprises determining, by the computing system, an alignment between the aggregate profile of the group and the publication profile by determining: (i) a first difference between the first value for the first personality attribute and the second value for the first personality attribute, and (ii) a second difference between the first value for the second personality attribute and the second value for the second personality attribute. The method comprises providing, by the computing system, information for receipt by the computing device that is configured to cause the computing device to present a graphical illustration of: (i) the first difference between the first value for the first personality attribute and the second value for the first personality attribute, and (ii) the second difference between the first value for the second personality attribute and the second value for the second personality attribute.

Embodiment 2 is the computer-implemented implemented method of embodiment 1, wherein: the query specifies a gender; and requesting that the search be performed includes requesting that the search identify social network messages that were authored by individuals of the gender.

Embodiment 3 is the computer-implemented implemented method of embodiment 1, wherein: the query specifies a date range; and requesting that the search be performed includes requesting that the search identify social network messages that were authored within the date range.

Embodiment 4 is the computer-implemented method of embodiment 1, wherein the multiple types of publications include newspapers, magazines, and digital media.

Embodiment 5 is the computer-implemented method of embodiment 1, wherein graphical illustration of the first difference and the second difference includes a first shape inside of a second shape, wherein the computing system is configured to generate the graphical illustration so that a correspondence between the first shape and the second shape illustrates a level of differences between personality attributes of the aggregate profile and the publication profile.

Embodiment 6 is directed to one or more computer-readable device having instructions stored thereon, that when executed by one or more processors, cause the performance of actions according to the method of any one of embodiments 1 through 5.

Linking to a Search Result

Embodiment 1 is a computer-implemented method. The method comprises receiving, by a computing system, a query that was specified by user input at a first computing device at which a first user account has logged into the computing system. The method comprises identifying, by the computing system, multiple results that are responsive to the query. The method comprises providing, by the computing system for receipt by the first computing device, information to cause the first computing device to present a display of the multiple results that are responsive to the query. The method comprises providing, by the computing system for receipt by the first computing device, information to cause the first computing device to present a display of a user selected result from among the multiple results, wherein the first computing device presents the display of the user selected result responsive to user input at the first computing device selecting the user selected result from the display of the multiple results. The method comprises providing, by the computing system for receipt by the first computing device, information that identifies a web address specific to the user selected result of the multiple results, the web address being sharable by user input with other user accounts of the computing system other than the first user account. The method comprises receiving, by the computing system and from a second computing device at which a second user account has logged into the computing system, a request for content corresponding to the web address that is specific to the user selected result, as a result of the second computing device having received the web address from the first computing device. The method comprises determining, by the computing system, whether the second user account is authorized to access the user selected result. The method comprises providing, by the computing system for receipt by the second computing device, responsive to having received the request for content corresponding to the web address that is specific to the user selected result and having determined that the second user account is not authorized to access the user selected result, information to cause the second computing device to present the display of the multiple results that are responsive to the query. The computing system is configured to provide, for receipt by the second computing device, had the computing system determined that the second user account is authorized to access the user selected result, information to cause the second computing device to present a display of the user selected result, excluding presentation of other of the multiple results.

Embodiment 2 is the computer-implemented method of embodiment 1, wherein the computing system provides the information that identifies the web address specific to the user selected result responsive to the computing system receiving from the first computing device a request for the web address that is specific to the user selected result.

Embodiment 3 is the computer-implemented method of embodiment 1, wherein the display of the user selected result includes a user-selectable interface element that, when selected, facilitates sharing of the web address specific to the user selected result.

Embodiment 4 is the computer-implemented method of embodiment 3, wherein user selection of the user-selectable interface element at the first computing device causes the first computing device to (i) copy the web address specific to the user selected result, or (ii) present a field that displays the web address specific to the user selected result to facilitate user copying of the web address specific to the user selected result.

Embodiment 5 is the computer-implemented method of embodiment 3, wherein: the display of the user selected result is a web page that displays the user selected result; the user-selectable interface element is part of the display of the user selected result; and the user-selectable interface element is defined by the information provided by the computing system to cause the first computing device to present the display of the user selected result.

Embodiment 6 is the computer-implemented method of embodiment 3, wherein the display of the user selected result by the first computing device excludes presentation of other of the multiple results.

Embodiment 7 is the computer-implemented method of embodiment 1, wherein the display of the multiple results by the first computing device presents the multiple results in a ranked order that is based on a relevance of each of the multiple results to the query.

Embodiment 8 is the computer-implemented method of embodiment 1, wherein the display of the multiple results by the second computing device excludes presentation of the user selected result as a consequence of the computing system having determined that the second computing device is not authorized to access the user selected result.

Embodiment 9 is the computer-implemented method of embodiment 8, wherein the multiple results are identified as being responsive to the query from multiple different datasets, the user selected result being from a first dataset of the multiple datasets to which the first user account has access and the second user account does not have access.

Embodiment 10 is the computer-implemented method of embodiment 9, wherein: the first user account has access to the first dataset due to the first user account having a license to the first dataset; and the second user account does not have access to the first dataset due to the second user account not having a license to the first dataset.

Embodiment 11 is the computer-implemented method of embodiment 1, wherein: the user selected result represents a single page from a presentation of multiple pages; the user selected result does not represent a first page of the presentation, such that the user selected result represents a page from the presentation in a middle of the presentation; and the information provided by the computing system to the first computing device that is configured to cause the first computing device to present the display of the multiple results is configured to cause the first computing device to navigate directly to the user selected result, without presentation of the first page of the presentation, responsive to user input selecting the user selected result from among the multiple results.

Embodiment 12 is the computer-implemented method of embodiment 11, wherein the user selected result is an only result that is from the presentation, from among the multiple results presented by the display of the multiple results.

Embodiment 13 is the computer-implemented method of embodiment 11, comprising providing, by the computing device for receipt by the first computing device, information to cause the first computing device to present a display of a next page from the presentation of multiple pages, wherein the first computing device presents the display of the next page from the presentation responsive to user input interacting with a selectable user interface element that is presented by the display of the user selected result and that is configured to cause navigation to a next page from the presentation.

Embodiment 14 is the computer-implemented method of embodiment 11, comprising: providing, by the computing device for receipt by the first computing device, information to cause the first computing device to present a concurrent display of a plurality of pages from the presentation of multiple pages, wherein the first computing device presents the concurrent display of the plurality of pages from the presentation responsive to user input interacting with a selectable user interface element that is presented by the display of the user selected result and that is configured to cause navigation to the display of the plurality of pages from the presentation.

Embodiment 15 is the computer-implemented method of embodiment 1, wherein the display of the user selected result includes links to multiple different sources that provide the user selected result, including a first link to a first dataset that provides the user selected result and a second link to a second dataset that provides the user selected result.

Embodiment 16 is the computer-implemented method of embodiment 15, wherein: the first dataset stores a copy of the user selected result as a first type of file that has a first type of file extension; and the second dataset stores a copy of the user selected result as a second type of file that is different from the first type of file and that has a second type of file extension that is different from the first type of file extension.

Embodiment 17 is the computer-implemented embodiment 1, wherein the display of the multiple results by the second computing device includes a presentation of the query.

Embodiment 18 is the computer-implemented method of embodiment 17, wherein: user input at the second computing device did not enter the query; the query is presented as part of the display of the multiple results by the second computing device as a result of the second computing device having provided the request for content corresponding to the web address that is specific to the user selected result; and the web address includes information that enables the computing system to identify that the query was used to access the user selected result.

Embodiment 19 is directed to a computing system that includes: one or more processors; and one or more computer-readable devices having instructions stored thereon, that when executed by the one or more processors, cause the performance of actions according to the method of any one of embodiments 1 through 18.

Commenting on a Search Result

Embodiment 1 is a computer-implemented method. The method comprises receiving, by a computing system, a request from a first computing device to view multiple results able to be accessed by submitting search queries. The method comprises providing, by the computing system for receipt by the first computing device, information to cause the first computing device to present a display of the multiple results. The method comprises providing, by the computing system for receipt by the first computing device, information to cause the first computing device to present a display of a user selected result from among the multiple results, wherein the first computing device presents the display of the user selected result responsive to user input at the first computing device selecting the user selected result from the display of the multiple results. The method comprises receiving, by the computing system from the first computing device, a first text comment that was user input at the first computing device, the user input of the first text comment at the first computing device resulting in the first computing device presenting the first text comment as part of the display of the user selected result. The method comprises receiving, by the computing system, a request from a second computing device to view the user selected result. The method comprises providing, by the computing system for receipt by the second computing device, information to cause the second computing device to present the display of the user selected result along with the first text comment that was user input at the first computing device as part of the display of the user selected result.

Embodiment 2 is the computer-implemented method of embodiment 1, comprising receiving, by the computing system from the second computing device, a second text comment that was user input at the second computing device, the user input of the second text comment at the second computing device resulting in the second computing device presenting the second text comment along with the first text comment as part of the display of the user selected result by the second computing device.

Embodiment 3 is the computer-implemented method of embodiment 2, comprising: receiving, by the computing system after the second text comment has been user input at the second computing device, a request from a third computing device to view the user selected result; and providing, by the computing system for receipt by the third computing device responsive to the computing system having received the request from the third computing device to view the user selected result, information to cause the third computing device to present the display of a user selected result along with the first text comment and the second text comment as part of the display of the user selected result.

Embodiment 4 is the computer-implemented method of embodiment 3, wherein: the first computing device was logged into a first user account of the computing system when the first text comment was user input at first computing device; the second computing device was logged into a second user account of the computing system when the second text comment was user input at the second computing device; the display of the user select result presented by the third computing device includes: (i) an indication that the first text comment was user input by the first user account; and (ii) an indication that the second text comment was user input by the second user account.

Embodiment 5 is the computer-implemented method of embodiment 4, wherein: the indication that the first text comment was user input by the first user account includes a first user name identifying the first user account and a first image identifying the first user account; and the indication that the second text comment was user input by the second user account includes a second user name identifying the second user account and a second image identifying the second user account.

Embodiment 6 is the computer-implemented method of embodiment 4, wherein the display of the user select result presented by the third computing device includes: (i) an indication of a first date at which the first text comment was user input at the first computing device; and (ii) an indication of a second date at which the second text comment was user input at the second computing device.

Embodiment 7 is the computer-implemented method of embodiment 6, wherein the first text comment includes a user-selectable link, such that user input at the second computing device is able to navigate to a destination address specified by the user-selectable link upon a single user interaction with the user-selectable link.

Embodiment 8 is the computer-implemented method of embodiment 3, wherein the display of the user selected result presented by the third computing device comprises a web page that presents the user selected result along with the first text comment and the second text comment.

Embodiment 9 is the computer-implemented method of embodiment 8, wherein the display of the user selected result presented by the first computing device comprises a web page that presents the user selected result along with a text box with which the user input of the first text comment interacted.

Embodiment 10 is the computer-implemented method of embodiment 1, comprising: receiving, by the computing system, a query that was specified by user input at the first computing device; identifying, by the computing system, a plurality of results that are responsive to the query; providing, by the computing system for receipt by the first computing device, information to cause the first computing device to present a display of the plurality of results that are responsive to the query, the user selected result being one of the plurality of results that are responsive to the query; and receiving, by the computing system, an indication that user input at the first computing device provided user input to save the user selected result to a collection of saved results, wherein the multiple results are saved results from the collection of saved results, and wherein the request received by the computing system from the first computing device to view the multiple results comprises a request to view the first collection of saved results, which includes the multiple results that are saved results from the collection of saved results.

Embodiment 11 is the computer-implemented method of embodiment 10, comprising: receiving, by the computing system, a request from the second computing device to view the collection of saved results; and providing, by the computing system and for receipt by the second computing device, information to cause the second computing device to present a display of the collection of saved results, the first collection of saved results including the user selected result, each result in the collection of saved results having been saved by user input to the collection of saved results, a first result of the collection of saved results having been saved by user input after being presented as responsive to a first query, a second result of the collection of saved results having been saved by user input after being presented as responsive to a second query that is different from the first query.

Embodiment 12 is the computer-implemented method of embodiment 11, comprising: receiving, by the computing system, an indication that user input at the second computing device reordered a displayed order in which saved results in the collection of saved results are ordered, by dragging a dropping a first saved result from the collection of saved results from a first location within the displayed order to a different location within the displayed order.

Embodiment 13 is the computer-implemented method of embodiment 11, wherein the display of the collection of saved results includes a user-editable description that describes a subject matter of the collection of saved results and that is user editable by selecting a user interface element presented as part of the display of the collection of saved results.

Embodiment 14 is the computer-implemented method of embodiment 13, comprising determining, by the computing system, a suggested result based on content selected from the user-editable description, the suggested result not being part of the collection of saved results due to the suggested result not having been saved to the collection of saved results by user input, wherein the display of the collection of saved results includes a presentation of the suggested result.

Embodiment 15 is the computer-implemented method of embodiment 11, wherein: a first result of the collection of saved results was saved to the collection of saved results by a first user account; and a second result of the collection of saved results was saved to the collection of saved results by a second user account.

Embodiment 16 is the computer-implemented method of embodiment 10, wherein the computing system is configured to not present the first text comment as part of the display of the user selected result responsive to the user selected result being provided responsive to a user-specified query, in distinction to the computing system being configured to present the first text comment as part of the display of the user selected result responsive to the user selected result being provided responsive to presentation of the collection of saved results.

Embodiment 17 is the computer-implemented method of embodiment 10, wherein receiving the indication that user input at the first computing device provided user input to save the user selected result to the collection of saved results includes user input at the computing device selecting to save the user selected result to the collection of saved results from a display that presents multiple collections of saved results to which the user selected result is able to be saved.

Embodiment 18 is the computer-implemented method of embodiment 10, wherein: the first computing device is logged into a first user account when the first computing device displayed the user selected result; the second computing device is logged into a second user account when the second computing device displayed the user selected result; the first user account and the second user account have permission to access the user selected result; and the method comprises: receiving, by the computing system, a request from a third computing device logged into a third user account to view the collection of saved results; providing, by the computing system for receipt by the third computing device, information to cause the third computing device to present the display of the collection of saved results without displaying the user selected result, as a consequence of the third user account not having permission to access the user selected result.

Embodiment 19 is the computer-implemented method of embodiment 18, wherein the third computing device presenting the display of the collection of saved results without displaying the user selected result includes displaying, along with the collection of saved results, an indication that the third user account does not have permission to access the user selected result.

Embodiment 20 is directed to a computing system that includes: one or more processors; and one or more computer-readable devices having instructions stored thereon, that when executed by the one or more processors, cause the performance of actions according to the method of any one of embodiments 1 through 19.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:

receiving, by a computing system, a request from a first computing device to view multiple results able to be accessed by submitting search queries;

providing, by the computing system for receipt by the first computing device, information to cause the first computing device to present a display of the multiple results;

providing, by the computing system for receipt by the first computing device, information to cause the first computing device to present a display of a user selected result from among the multiple results, wherein the first computing device presents the display of the user selected result responsive to user input at the first computing device selecting the user selected result from the display of the multiple results;

receiving, by the computing system from the first computing device, a first text comment that was user input at the first computing device, the user input of the first text comment at the first computing device resulting in the first computing device presenting the first text comment as part of the display of the user selected result, wherein the display of the user selected result presented by the first computing device comprises a web page that presents the user selected result along with a text box with which the user input of the first text comment interacted;

receiving, by the computing system, a request from a second computing device to view the user selected result;

providing, by the computing system for receipt by the second computing device, information to cause the second computing device to present the display of the user selected result along with the first text comment that was user input at the first computing device as part of the display of the user selected result;

receiving, by the computing system from the second computing device, a second text comment that was user input at the second computing device, the user input of the second text comment at the second computing device resulting in the second computing device presenting the second text comment along with the first text comment as part of the display of the user selected result by the second computing device;

receiving, by the computing system after the second text comment has been user input at the second computing device, a request from a third computing device to view the user selected result; and providing, by the computing system for receipt by the third computing device responsive to the computing system having received the request from the third computing device to view the user selected result, information to cause the third computing device to present the display of the user selected result along with the first text comment and the second text comment as part of the display of the user selected result, wherein the display of the user selected result presented by the third computing device comprises a web page that presents the user selected result along with the first text comment and the second text comment.

2. The computer-implemented method of claim 1, wherein:

the first computing device was logged into a first user account of the computing system when the first text comment was user input at the first computing device;

the second computing device was logged into a second user account of the computing system when the second text comment was user input at the second computing device; and the display of the user select result presented by the third computing device includes:

(i) an indication that the first text comment was user input by the first user account; and (ii) an indication that the second text comment was user input by the second user account.

3. The computer-implemented method of claim 2, wherein:

the indication that the first text comment was user input by the first user account includes a first user name identifying the first user account and a first image identifying the first user account; and the indication that the second text comment was user input by the second user account includes a second user name identifying the second user account and a second image identifying the second user account.

4. The computer-implemented method of claim 2, wherein the display of the user selected result presented by the third computing device includes:

(i) an indication of a first date at which the first text comment was user input at the first computing device; and (ii) an indication of a second date at which the second text comment was user input at the second computing device.

5. The computer-implemented method of claim 4, wherein the first text comment includes a user-selectable link, such that user input at the second computing device is able to navigate to a destination address specified by the user-selectable link upon a single user interaction with the user-selectable link.

6. The computer-implemented method of claim 1, comprising:

receiving, by the computing system, a query that was specified by user input at the first computing device;

identifying, by the computing system, a plurality of results that are responsive to the query;

providing, by the computing system for receipt by the first computing device, information to cause the first computing device to present a display of the plurality of results that are responsive to the query, the user selected result being one of the plurality of results that are responsive to the query; and receiving, by the computing system, an indication that user input at the first computing device provided user input to save the user selected result to a collection of saved results, wherein the multiple results are saved results from the collection of saved results, and wherein the request received by the computing system from the first computing device to view the multiple results comprises a request to view the collection of saved results, which includes the multiple results that are saved results from the collection of saved results.

7. The computer-implemented method of claim 6, wherein the computing system is configured to not present the first text comment as part of the display of the user selected result responsive to the user selected result being provided responsive to a user-specified query, in distinction to the computing system being configured to present the first text comment as part of the display of the user selected result responsive to the user selected result being provided responsive to presentation of the collection of saved results.

8. The computer-implemented method of claim 6, wherein receiving the indication that user input at the first computing device provided user input to save the user selected result to the collection of saved results includes user input at the computing device selecting to save the user selected result to the collection of saved results from a display that presents multiple collections of saved results to which the user selected result is able to be saved.

9. A computer-implemented method, comprising:

receiving, by a computing system, a query that was specified by user input at a first computing device;

identifying, by the computing system, a plurality of results that are responsive to the query;

providing, by the computing system for receipt by the first computing device, information to cause the first computing device to present a display of the plurality of results that are responsive to the query;

receiving, by the computing system, an indication that user input at the first computing device provided user input to save a user selected result to a collection of saved results, the user selected result being one of the plurality of results that are responsive to the query;

receiving, by the computing system, a request from the first computing device to view the collection of saved results, which includes multiple results that are saved results from the collection of saved results;

providing, by the computing system for receipt by the first computing device, information to cause the first computing device to present a display of the multiple results;

providing, by the computing system for receipt by the first computing device, information to cause the first computing device to present a display of the user selected result, wherein the first computing device presents the display of the user selected result responsive to user input at the first computing device selecting the user selected result from the display of the multiple results;

receiving, by the computing system from the first computing device, a first text comment that was user input at the first computing device, the user input of the first text comment at the first computing device resulting in the first computing device presenting the first text comment as part of the display of the user selected result;

receiving, by the computing system, a request from a second computing device to view the collection of saved results;

providing, by the computing system and for receipt by the second computing device, information to cause the second computing device to present a display of the collection of saved results, the collection of saved results including the user selected result, each result in the collection of saved results having been saved by user input to the collection of saved results, a first result of the collection of saved results having been saved by user input after being presented as responsive to a first query, a second result of the collection of saved results having been saved by user input after being presented as responsive to a second query that is different from the first query;

receiving, by the computing system, a request from the second computing device to view the user selected result; and providing, by the computing system for receipt by the second computing device, information to cause the second computing device to present the display of the user selected result along with the first text comment that was user input at the first computing device as part of the display of the user selected result.

10. The computer-implemented method of claim 9, comprising:

receiving, by the computing system, an indication that user input at the second computing device reordered a displayed order in which saved results in the collection of saved results are ordered, by dragging and dropping a first saved result from the collection of saved results from a first location within the displayed order to a different location within the displayed order.

11. The computer-implemented method of claim 9, wherein the display of the collection of saved results includes a user-editable description that describes a subject matter of the collection of saved results and that is user editable by selecting a user interface element presented as part of the display of the collection of saved results.

12. The computer-implemented method of claim 11, comprising:

determining, by the computing system, a suggested result based on content selected from the user-editable description, the suggested result not being part of the collection of saved results due to the suggested result not having been saved to the collection of saved results by user input, wherein the display of the collection of saved results includes a presentation of the suggested result.

13. The computer-implemented method of claim 9, wherein:

the first result of the collection of saved results was saved to the collection of saved results by a first user account; and the second result of the collection of saved results was saved to the collection of saved results by a second user account.

14. A computer-implemented method, comprising:

receiving, by a computing system, a query that was specified by user input at a first computing device;

identifying, by the computing system, a plurality of results that are responsive to the query;

providing, by the computing system for receipt by the first computing device, information to cause the first computing device to present a display of the plurality of results that are responsive to the query;

receiving, by the computing system, an indication that user input at the first computing device provided user input to save a user selected result to a collection of saved results, the user selected result being one of the plurality of results that are responsive to the query;

receiving, by the computing system, a request from the first computing device to view the collection of saved results, which includes multiple results that are saved results from the collection of saved results;

providing, by the computing system for receipt by the first computing device, information to cause the first computing device to present a display of the multiple results;

providing, by the computing system for receipt by the first computing device, information to cause the first computing device to present a display of the user selected result, wherein the first computing device presents the display of the user selected result responsive to user input at the first computing device selecting the user selected result from the display of the multiple results, wherein the first computing device is logged into a first user account when the first computing device displayed the user selected result;

receiving, by the computing system from the first computing device, a first text comment that was user input at the first computing device, the user input of the first text comment at the first computing device resulting in the first computing device presenting the first text comment as part of the display of the user selected result;

receiving, by the computing system, a request from a second computing device to view the user selected result; and providing, by the computing system for receipt by the second computing device, information to cause the second computing device to present the display of the user selected result along with the first text comment that was user input at the first computing device as part of the display of the user selected result, wherein the second computing device is logged into a second user account when the second computing device displayed the user selected result, and the first user account and the second user account have permission to access the user selected result;

receiving, by the computing system, a request from a third computing device logged into a third user account to view the collection of saved results; and providing, by the computing system for receipt by the third computing device, information to cause the third computing device to present the display of the collection of saved results without displaying the user selected result, as a consequence of the third user account not having permission to access the user selected result.

15. The computer-implemented method of claim 14, wherein the third computing device presenting the display of the collection of saved results without displaying the user selected result includes displaying, along with the collection of saved results, an indication that the third user account does not have permission to access the user selected result.

16. One or more non-transitory computer-readable devices, comprising instructions that when executed by one or more processors cause a computing system to perform operations, including:

receiving, by the computing system, a request from a first computing device to view multiple results able to be accessed by submitting search queries;

providing, by the computing system for receipt by the first computing device, information to cause the first computing device to present a display of the multiple results;

providing, by the computing system for receipt by the first computing device, information to cause the first computing device to present a display of a user selected result from among the multiple results, wherein the first computing device presents the display of the user selected result responsive to user input at the first computing device selecting the user selected result from the display of the multiple results;

receiving, by the computing system from the first computing device, a first text comment that was user input at the first computing device, the user input of the first text comment at the first computing device resulting in the first computing device presenting the first text comment as part of the display of the user selected result, wherein the display of the user selected result presented by the first computing device comprises a web page that presents the user selected result along with a text box with which the user input of the first text comment interacted;

receiving, by the computing system, a request from a second computing device to view the user selected result;

providing, by the computing system for receipt by the second computing device, information to cause the second computing device to present the display of the user selected result along with the first text comment that was user input at the first computing device as part of the display of the user selected result;

receiving, by the computing system from the second computing device, a second text comment that was user input at the second computing device, the user input of the second text comment at the second computing device resulting in the second computing device presenting the second text comment along with the first text comment as part of the display of the user selected result by the second computing device;

receiving, by the computing system after the second text comment has been user input at the second computing device, a request from a third computing device to view the user selected result; and providing, by the computing system for receipt by the third computing device responsive to the computing system having received the request from the third computing device to view the user selected result, information to cause the third computing device to present the display of the user selected result along with the first text comment and the second text comment as part of the display of the user selected result, wherein the display of the user selected result presented by the third computing device comprises a web page that presents the user selected result along with the first text comment and the second text comment.

17. One or more non-transitory computer-readable devices, comprising instructions that when executed by one or more processors cause a computing system to perform operations, including:

receiving, by the computing system, a query that was specified by user input at a first computing device;

identifying, by the computing system, a plurality of results that are responsive to the query;

providing, by the computing system for receipt by the first computing device, information to cause the first computing device to present a display of the plurality of results that are responsive to the query;

receiving, by the computing system, an indication that user input at the first computing device provided user input to save a user selected result to a collection of saved results, the user selected result being one of the plurality of results that are responsive to the query;

receiving, by the computing system, a request from the first computing device to view the collection of saved results, which includes multiple results that are saved results from the collection of saved results;

providing, by the computing system for receipt by the first computing device, information to cause the first computing device to present a display of the multiple results;

providing, by the computing system for receipt by the first computing device, information to cause the first computing device to present a display of the user selected result, wherein the first computing device presents the display of the user selected result responsive to user input at the first computing device selecting the user selected result from the display of the multiple results;

receiving, by the computing system from the first computing device, a first text comment that was user input at the first computing device, the user input of the first text comment at the first computing device resulting in the first computing device presenting the first text comment as part of the display of the user selected result;

receiving, by the computing system, a request from a second computing device to view the collection of saved results;

providing, by the computing system and for receipt by the second computing device, information to cause the second computing device to present a display of the collection of saved results, the collection of saved results including the user selected result, each result in the collection of saved results having been saved by user input to the collection of saved results, a first result of the collection of saved results having been saved by user input after being presented as responsive to a first query, a second result of the collection of saved results having been saved by user input after being presented as responsive to a second query that is different from the first query;

receiving, by the computing system, a request from the second computing device to view the user selected result; and providing, by the computing system for receipt by the second computing device, information to cause the second computing device to present the display of the user selected result along with the first text comment that was user input at the first computing device as part of the display of the user selected result.

18. One or more non-transitory computer-readable devices, comprising instructions that when executed by one or more processors cause a computing system to perform operations, including:

receiving, by the computing system, a query that was specified by user input at a first computing device;

identifying, by the computing system, a plurality of results that are responsive to the query;

providing, by the computing system for receipt by the first computing device, information to cause the first computing device to present a display of the plurality of results that are responsive to the query;

receiving, by the computing system, an indication that user input at the first computing device provided user input to save a user selected result to a collection of saved results, the user selected result being one of the plurality of results that are responsive to the query;

receiving, by the computing system, a request from the first computing device to view the collection of saved results, which includes multiple results that are saved results from the collection of saved results;

providing, by the computing system for receipt by the first computing device, information to cause the first computing device to present a display of the multiple results;

providing, by the computing system for receipt by the first computing device, information to cause the first computing device to present a display of the user selected result, wherein the first computing device presents the display of the user selected result responsive to user input at the first computing device selecting the user selected result from the display of the multiple results, wherein the first computing device is logged into a first user account when the first computing device displayed the user selected result;

receiving, by the computing system from the first computing device, a first text comment that was user input at the first computing device, the user input of the first text comment at the first computing device resulting in the first computing device presenting the first text comment as part of the display of the user selected result;

receiving, by the computing system, a request from a second computing device to view the user selected result; and providing, by the computing system for receipt by the second computing device, information to cause the second computing device to present the display of the user selected result along with the first text comment that was user input at the first computing device as part of the display of the user selected result, wherein the second computing device is logged into a second user account when the second computing device displayed the user selected result, and the first user account and the second user account have permission to access the user selected result;

receiving, by the computing system, a request from a third computing device logged into a third user account to view the collection of saved results; and providing, by the computing system for receipt by the third computing device, information to cause the third computing device to present the display of the collection of saved results without displaying the user selected result, as a consequence of the third user account not having permission to access the user selected result.

* * * * *